US012779359B2

(12) United States Patent
Trivelli et al.

(10) Patent No.: US 12,779,359 B2
(45) Date of Patent: Nov. 3, 2026

(54) WATER DISTILLATION DEVICE

(71) Applicant: 77 VISION WAY LTD, Belfast (GB)

(72) Inventors: Gianpaolo Trivelli, Pavia (IT); Gianluigi Trivelli, Pavia (IT); Mauro Gazzelli, Lugano-Aldesago (CH); Claudio Raggi, Terni (IT)

(73) Assignee: 77 Vision Way Ltd, Belfast (GB)

( * ) Notice: Subject to any disclaimer, the term of this patent is extended or adjusted under 35 U.S.C. 154(b) by 146 days.

(21) Appl. No.: 18/563,463

(22) PCT Filed: May 23, 2022

(86) PCT No.: PCT/IB2022/054781
§ 371 (c)(1),
(2) Date: Nov. 22, 2023

(87) PCT Pub. No.: WO2022/249015
PCT Pub. Date: Dec. 1, 2022

(65) Prior Publication Data
US 2024/0252948 A1 Aug. 1, 2024

(30) Foreign Application Priority Data
May 25, 2021 (IT) ........................ 102021000013583

(51) Int. Cl.
*B01D 3/10* (2006.01)
*B01D 1/02* (2006.01)
(Continued)

(52) U.S. Cl.
CPC ................. *B01D 3/10* (2013.01); *B01D 1/02* (2013.01); *B01D 3/007* (2013.01); *B01D 3/02* (2013.01);
(Continued)

(58) Field of Classification Search
CPC ............ B01D 3/10; B01D 3/007; B01D 3/02; B01D 5/0003; B01D 5/006; B01D 5/009; B01D 1/02; B01D 5/0006; B01D 5/0039
See application file for complete search history.

(56) References Cited

U.S. PATENT DOCUMENTS 3,248,305 A 4/1966 Williamson
3,736,234 A 5/1973 Miyamoto
(Continued)

FOREIGN PATENT DOCUMENTS

DE 10321188 A1 3/2004
EP 0426929 A1 * 5/1991 ............... B01D 3/08

OTHER PUBLICATIONS

European Patent Office, International Search Report for PCT/IB2022/054781, Jul. 26, 2022, EPO, P.B. 5818 Patentlaan 2, NL—2280 HV Rijswijk. (Uploaded to USPTO on Nov. 22, 2023.).
European Patent Office, Written Opinion of the International Searching Authority for PCT/IB2022/054781, Jul. 26, 2022, EPO, P.B. 5818 Patentlaan 2, NL—2280 HV Rijswijk. (Uploaded to USPTO on Nov. 22, 2023.).
(Continued)

*Primary Examiner* — Renee Robinson
(74) *Attorney, Agent, or Firm* — Underwood & Associates, LLC

(57) ABSTRACT

A water distillation device includes a body having a lateral wall and defining a cavity suitable for permitting the distillation of an amount of water to distill, wherein in the cavity are defined a distillation chamber and a condensation chamber, at least a heater configured to heat the amount of water to distill, an intermediate or separating element positioned in an intermediate position of the cavity of the body, and having at least a portion of junction with the lateral wall. The intermediate or separating element is configured to divide the cavity, including the distillation chamber and the condensation chamber. The intermediate or separating element
(Continued)

includes at least a through hole configured to permit the passage of at least a distillation steam from the distillation chamber to the condensation chamber. The intermediate or separating element includes at least a collection portion of distilled water.

19 Claims, 7 Drawing Sheets

(51) Int. Cl.

| | |
|---|---|
| ***B01D 3/00*** | (2006.01) |
| ***B01D 3/02*** | (2006.01) |
| ***B01D 3/42*** | (2006.01) |
| ***B01D 5/00*** | (2006.01) |

(52) U.S. Cl.

CPC ............. *B01D 3/42* (2013.01); *B01D 5/0003* (2013.01); *B01D 5/0006* (2013.01); *B01D 5/006* (2013.01); *B01D 5/009* (2013.01)

(56) References Cited

U.S. PATENT DOCUMENTS

| | | | |
|---|---|---|---|
| 3,825,491 A | 7/1974 | Sanchez | |
| 4,770,748 A | 9/1988 | Cellini et al. | |
| 5,439,560 A | 8/1995 | Kurematsu et al. | |
| 5,772,850 A | 6/1998 | Morris | |
| 6,303,006 B1 | 10/2001 | Chang et al. | |
| 2014/0034475 A1 * | 2/2014 | Kamen .................. | C02F 1/048 202/185.1 |

OTHER PUBLICATIONS

European Patent Office, Search Strategy of the International Searching Authority for PCT/IB2022/054781, Jul. 26, 2022, EPO, P.B. 5818 Patentlaan 2, NL—2280 HV Rijswijk. (Uploaded to USPTO on Nov. 22, 2023.).

* cited by examiner

FIG.4
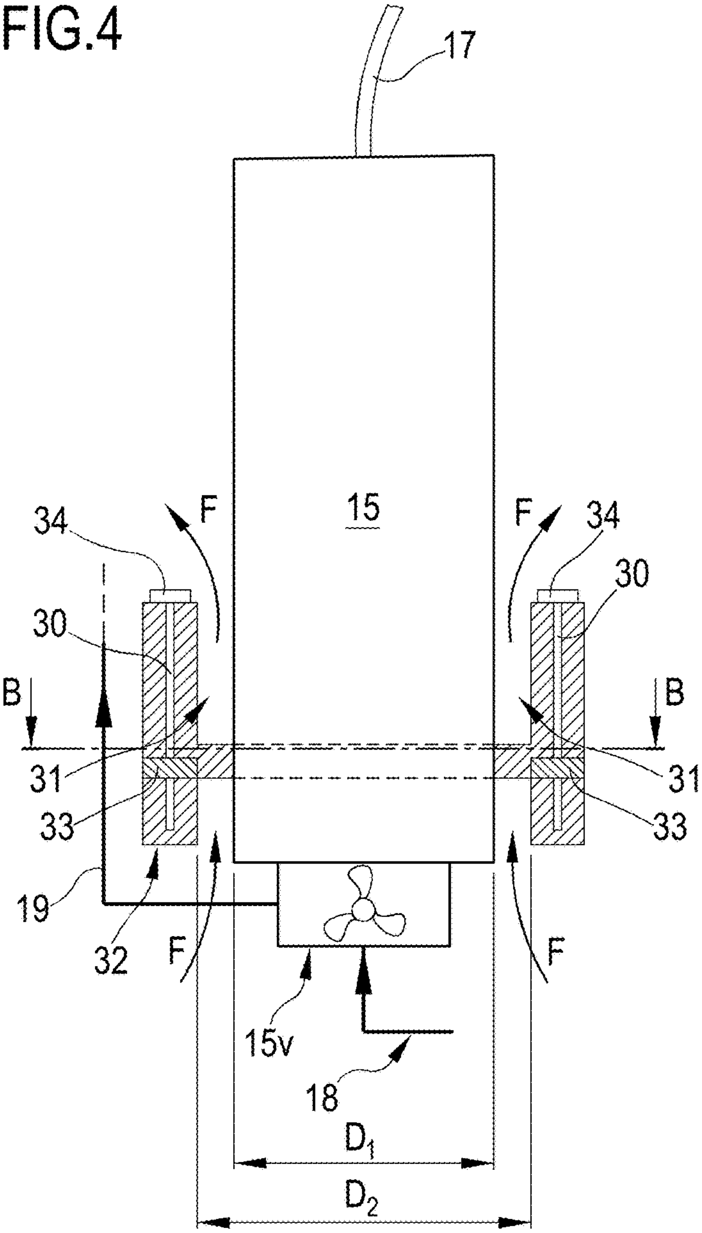
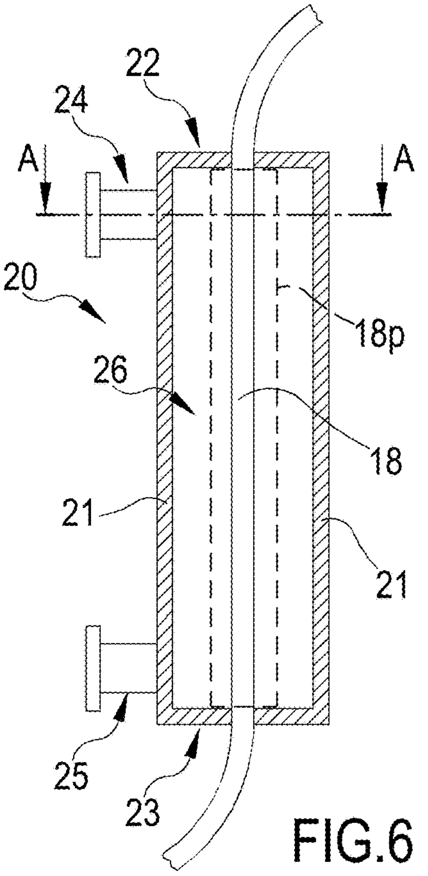
FIG.6
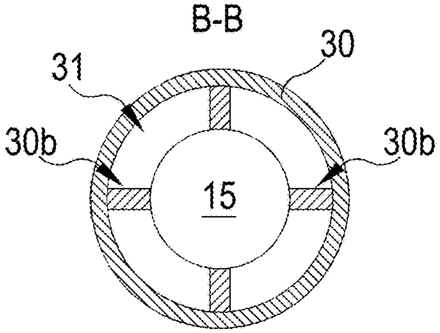
FIG.5
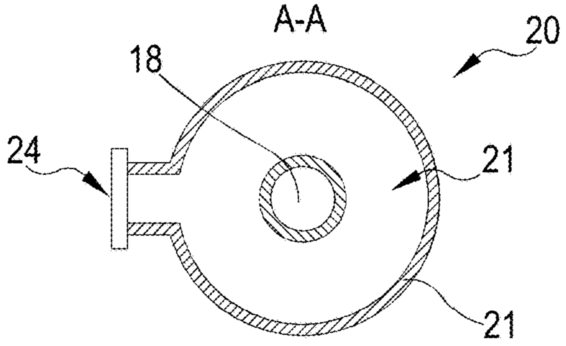
FIG.7

FIG.12
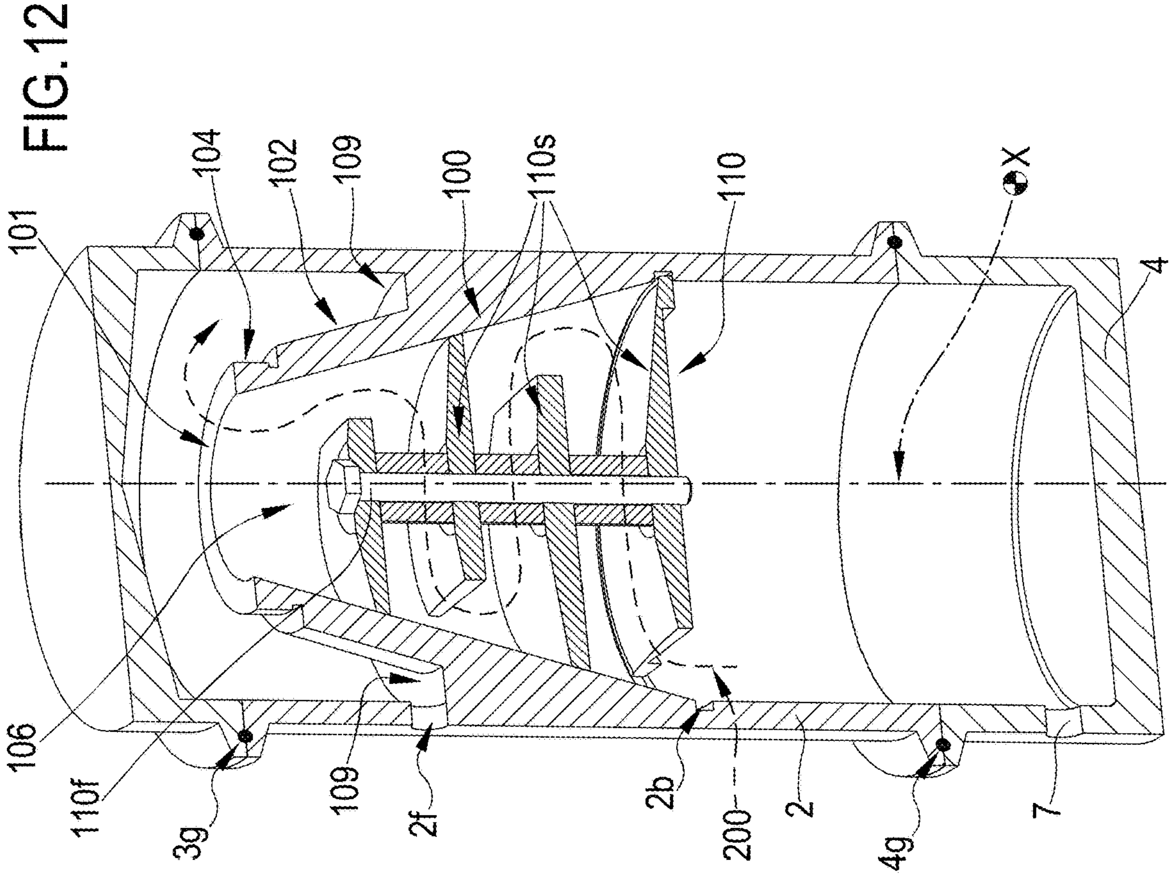
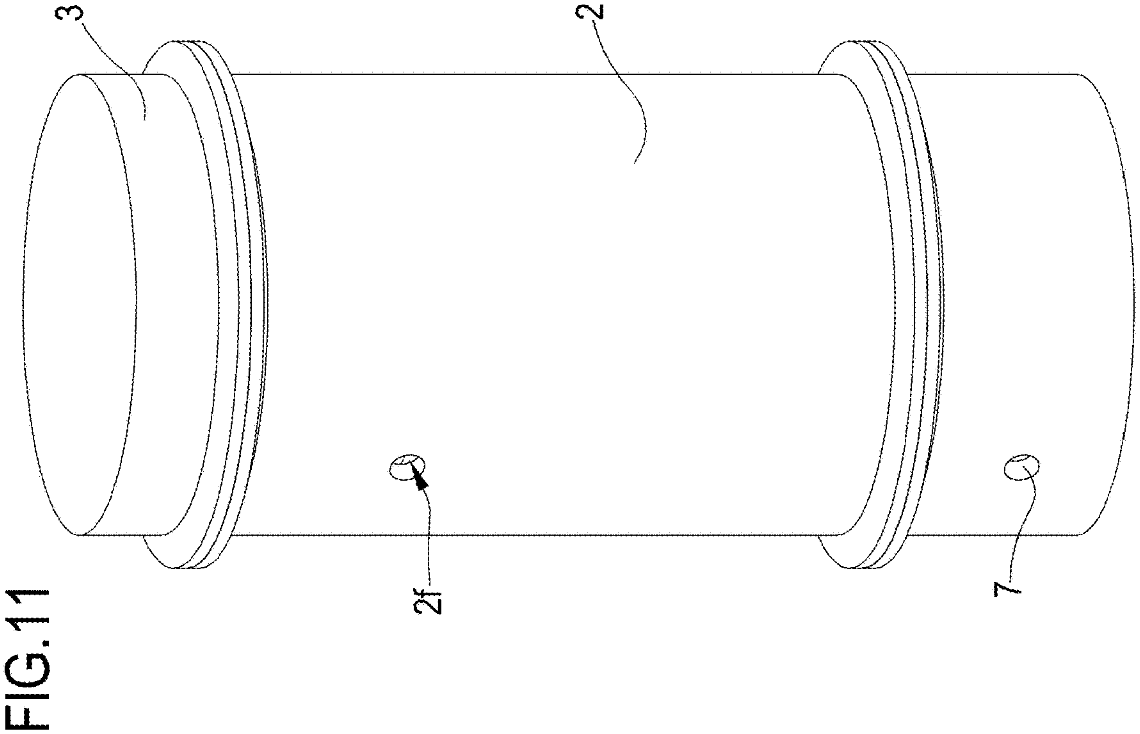
FIG.11

WATER DISTILLATION DEVICE

TECHNICAL FIELD

The present disclosure refers to the field of distillation devices, and in detail concerns a water distillation device.

BACKGROUND ART

Water distillation devices configured to produce distilled water from mineralized water are known.

The distilled water is used in a wide variety of applications in the medical and/or industrial field. For example, the distilled water is used for the preparation of pharmaceuticals and is also used for the production of high-purity chemical fluids and/or for the production of automotive batteries.

The water distillation devices of known type comprise a body having a cavity which defines a distillation chamber and a condensation chamber. In the distillation chamber, a heater provides for heating water to a temperature sufficient to cause the boiling of it, resulting in the production of a distillation steam. In the condensation chamber, the distillation steam condenses and produces distilled water in a liquid state.

Although in past, and for some laboratory applications even today, water distillation devices used the heat produced by a flame as a heat source for heating the water in the distillation chamber, today water distillation devices typically employ electric heaters.

The distillation process carried out by distillation devices of known type is energy-consuming, which causes the distillation of large quantities of water to cause large costs. The Applicant notes that small-scale distillation processes are also affected by the same efficiency drawbacks.

As the request for distilled water from the medical field and/or the industrial field continues to be high, there is a strong request for distillation devices that enable the efficient production of distilled water.

Objects

An object of the present disclosure is to describe a water distillation device that can solve the drawbacks described above and, in particular, achieve high energy efficiency in the distillation process.

Another object of the present disclosure is to describe a water distillation device that is easy to realize.

Another object of the present disclosure is to describe a water distillation device that is compact.

Another object of the present disclosure is to describe a water distillation device that allows to recover and/or save the thermal energy used to heat the water to be distilled.

SUMMARY

The object of the present disclosure will now be described herein in some of its main aspects, which are combinable with each other. The aspects hereinafter presented are also combinable with certain portions of the detailed description and with one or more of the attached claims.

According to the present disclosure is herein described a water distillation device (1), comprising:

a body having a lateral wall (2) and defining a cavity (2*c*, 2*d*) suitable for allowing the distillation of an amount of water (201) to distill, wherein in the cavity (2*c*, 2*d*) are defined a distillation chamber (2*d*) and a condensation chamber (2*c*), at least a heater (15*c*), configured to heat the amount of water (201) to distill, an intermediate or separating element (100), positioned in an intermediate position of the cavity (2*c*, 2*d*) of the body, and having at least a portion of junction (103) with the lateral wall (2), said intermediate or separating element (100) being configured to divide said cavity (2*c*, 2*d*) realizing the distillation chamber (2*d*) and the condensation chamber (2*c*), said intermediate or separating element (100) comprising at least a through hole (105) configured to allow the passage of at least a distillation steam from the distillation chamber to the condensation chamber, said intermediate or separating element (100) comprising at least a collection portion (109) of distilled water (300).

According to another non-limiting aspect, the heater (15*c*) is configured to heat the amount of water (201) to distill within the condensation chamber (2*c*) so that at least part of the water (201) to distill can be converted into steam.

According to another non-limiting aspect, the intermediate or separating element (100) comprises a lateral wall of collection (102) joined or confining with said portion of junction (103).

According to another non-limiting aspect, the portion of junction (103) comprises, optionally is, a sealing wall in substantial contact with the lateral wall (2) of the body.

According to another non-limiting aspect, the collection portion (109) of distilled water is comprised between the lateral wall (2) and the lateral wall of collection (102).

According to another non-limiting aspect, said intermediate position is a predefined and/or fixed position and/or is an intermediate fixed position.

According to another non-limiting aspect, the body comprises a head portion (3) and a bottom portion (4), wherein the head portion delimits at the top said body and wherein the bottom portion delimits at the bottom said body.

According to another non-limiting aspect, at least one between said head portion (3) and said bottom portion (4) comprises a removable closing element of the cavity (2*c*, 2*d*), configured to allow the access of an operator and/or tool inside the cavity (2*c*, 2*d*), in particular inside at least the distillation chamber (2*d*) and/or the condensation chamber (2*c*).

According to another non-limiting aspect, the body is realized in one piece and/or the lateral wall (2) extends uninterruptedly to define the distillation chamber (2*d*) and condensation chamber (2*c*).

According to another non-limiting aspect, the body is realized in a first and a second piece, said first and said second piece being removably connectable and being configurable in a first jointed, or use, configuration wherein the first and second pieces together define overall said lateral wall (2).

According to another non-limiting aspect, the intermediate or separating element (100) comprises a head portion (101) comprising an upper wall substantially orthogonal to the main axis (X).

According to another non-limiting aspect, the intermediate or separating element (100) comprises a head portion (101) comprising a lateral wall (104).

According to another non-limiting aspect, the intermediate or separating element (100) is positioned in a predefined and/or fixed position with respect to the lateral wall (2) and/or within said cavity (2*c*, 2*d*).

According to another non-limiting aspect, the head portion (101) lies at a higher height with respect to the height at which the portion of junction (103) lies.

According to another non-limiting aspect, the head portion (101) is positioned in a central position of the intermediate or separating element and defines a cross-section area smaller than the cross-section area of the portion of junction (103).

According to another non-limiting aspect, the head portion (101) is joined to said portion of junction (103), optionally being joined uninterruptedly to said portion of junction (103).

According to another non-limiting aspect, the intermediate or separating element (100) is integral and/or is realized in a single piece.

According to another non-limiting aspect, the lateral wall (104) is joined with the upper wall in substantial correspondence of an upper end portion thereof.

According to another non-limiting aspect, the lateral wall (104) of the head portion (101) is aligned to the main axis (X) and/or extends along a direction parallel to the direction along which the portion of junction (103) extends.

According to another non-limiting aspect, the at least a through hole (105) is positioned on said lateral wall (104).

According to another non-limiting aspect, the at least a through hole (105) is positioned in correspondence of the head portion (101).

According to another non-limiting aspect, the at least a through hole (105) has an axis inclined with respect to the main axis (X), optionally having a substantially orthogonal axis with respect to the main axis (X).

According to another non-limiting aspect, the intermediate or separating element (100) is configured to determine, by means of the at least a through hole (105), a vaporization and condensation path (200) substantially curved and at least partially misaligned with respect to said main axis (X).

According to another non-limiting aspect, the collection portion (109) of distilled water (300) lies at a height lower than said head portion (101).

According to another non-limiting aspect, the lateral wall (2) is substantially tubular and develops along an own main axis (X) and said cavity (2*c*, 2*d*) develops along said main axis (X).

According to another non-limiting aspect, the main axis (X) is, in use, substantially vertical.

According to another non-limiting aspect, the lateral wall of collection (102) is substantially inclined with respect to said portion of junction (103) and lies, in use, at least partially, optionally integrally, at a height higher than the portion of junction (103).

According to another non-limiting aspect, the lateral wall of collection (102) is substantially inclined with respect to said seal wall (103) and lies, in use, at least partially, optionally integrally, at a height higher than the seal wall (103).

According to another non-limiting aspect, the lateral wall of collection (102) is substantially inclined outwards and/or towards said lateral wall (2).

According to another non-limiting aspect, the lateral wall of collection (102) is inclined inwards and/or is leaning against or is in substantial contact with said lateral wall (2).

According to another non-limiting aspect, the collection portion (109) of distilled water (300) has a substantially annular shape.

According to another non-limiting aspect, the collection portion (109) of distilled water (300) lies in a radially central position of said intermediate or separating element (100).

According to another non-limiting aspect, the condensation chamber lies at a height higher than the height at which the distillation chamber lies.

According to another non-limiting aspect, the water distillation device (1) comprises a cooler (15*e*) configured to cause a condensation of distillation steam.

According to another non-limiting aspect, the cooler (15*e*) is configured to determine a collection of condensed distillation steam in substantial correspondence of the collection portion (109).

According to another non-limiting aspect, the cooler (15*e*) comprises at least a Peltier cell.

According to another non-limiting aspect, the cooler (15*e*) comprises a fluid or gas cooler, in particular a refrigerator evaporator.

According to another non-limiting aspect, the cooler (15*e*) is substantially realized in the shape of a coil.

According to another non-limiting aspect, the cooler (15*e*) is positioned in substantial correspondence of the condensation chamber.

According to another non-limiting aspect, the water distillation device (1) comprises an auxiliary heater (500), positioned in substantial correspondence of the distillation chamber.

According to another non-limiting aspect, the auxiliary heater (500) comprises an electrical resistance.

According to another non-limiting aspect, the auxiliary heater (500) lies at a height substantially equal to the height in correspondence of which the heater (15*c*) lies.

According to another non-limiting aspect, the heater (15*c*) assumes a spiral or coil shape.

According to another non-limiting aspect, the auxiliary heater (500) assumes a spiral or coil shape.

According to another non-limiting aspect, the auxiliary heater (500) is placed within said spiral or coil realized by the heater (15*c*).

According to another non-limiting aspect, the auxiliary heater (500) comprises portions placed, in particular substantially positioned, in correspondence of portions of space vertically present between one turn and the next turn of the spiral or coil realized by the heater (15*c*), and results substantially vertically aligned with said heater (15*c*).

According to another non-limiting aspect, the intermediate or separating element (100) comprises at least a first seal ring (108) configured to enter into substantial contact with said lateral wall (2), in particular determining a substantial insulation and/or separation of the distillation chamber (2*d*) from the condensation chamber (2*c*).

According to another non-limiting aspect, the intermediate or separating element (100) comprises at least a first and a second seal ring (108), said first and said second seal ring (108) being each one configured to enter into substantial contact with said lateral wall (2), in particular determining a substantial insulation and/or separation of the distillation chamber (2*d*) from the condensation chamber (2*c*).

According to another non-limiting aspect, the first seal ring (108) is positioned in substantial correspondence of the portion of junction (103).

According to another non-limiting aspect, the second seal ring (108) is positioned in substantial correspondence of the portion of junction (103).

According to another non-limiting aspect, the first seal ring and the second seal ring (108) are positioned in substantial correspondence of the seal wall (103).

According to another non-limiting aspect, the second seal ring (108) is positioned in substantial correspondence of the seal wall (103).

According to another non-limiting aspect, the seal wall (103) extends substantially parallel to the main axis (X).

According to another non-limiting aspect, the seal wall (103) comprises at least a first recess (107), optionally annular, configured to house at least part of the seal ring (108).

According to another non-limiting aspect, the seal wall (103) comprises at least a first recess and a second recess (107), said first and said second recess being optionally annular, said first and said second recess (107) being configured, each one, to house at least part respectively of the first seal ring (108) and of the second seal ring (108).

According to another non-limiting aspect, the head portion (101) comprises an upper wall substantially orthogonal with respect to the main axis (X).

According to another non-limiting aspect, the collection portion (109) has an annularly tapered bottom and, in particular, has a bottom zone and an upper zone, the bottom zone having an acute point with a cross-section smaller with respect to the cross-section of the upper zone.

According to another non-limiting aspect, the collection portion (109) comprises a bottom portion substantially planar and/or developing along a plane substantially orthogonal with respect to the main axis (X).

According to another non-limiting aspect, the intermediate or separating element (100) comprises a filtering membrane, configured to allow the passage of water steam and configured to retain solid residuals deriving from the water distillation process and prevent the passage of significant quantities of water in liquid form, in particular in drops or bubbles.

According to another non-limiting aspect, the filtering membrane comprises a plurality of substantially open passages or holes, configured to allow a passage of molecules of a size smaller than a predetermined size and, also, to determine an impairment to the passage of molecules of a size greater than or equal to that predetermined size.

According to another non-limiting aspect, the filtering membrane is positioned into the cavity (106) of the intermediate or separating element (100) and/or is positioned substantially in correspondence of the distillation chamber.

According to another non-limiting aspect, the filtering membrane is removably connected to the body of the intermediate or separating element.

According to another non-limiting aspect, the filtering membrane is realized in a non-hygroscopic material, optionally said non-hygroscopic material being a polymer material, in particular perfluorocarbon (PFC), more in particular polytetrafluoroethylene (PTFE), even more in particular expanded polytetrafluoroethylene (ePTFE) or expanded polyethylene (ePE) such as Gore-Tex®.

According to another non-limiting aspect, the cavity (106) of the intermediate or separating element (100) comprises a labyrinth of distribution of the distillation steam that communicates with the at least one through hole (105).

According to another non-limiting aspect, the lateral wall (2) comprises an outlet through hole (2*f*), configured to allow an outflow of the distilled water (300) from the collection portion (109).

According to another non-limiting aspect, the outlet through hole (2*f*) is positioned at a height substantially corresponding with the collection portion (109), optionally with the bottom zone of the collection portion (109), and/or substantially corresponding with an upper edge of the portion of junction (103).

According to another non-limiting aspect, the water distillation device (1) is a vacuum distillation device.

According to another non-limiting aspect, the water distillation device (1) is configured to carry out the distillation of the water (201) to distill at a pressure lower with respect to the atmospheric pressure.

According to another non-limiting aspect, the cooler (15*e*) is a refrigerator evaporator.

According to another non-limiting aspect, the heater (15*c*) is a refrigerator condenser.

According to another non-limiting aspect, the water distillation device (1) comprises a refrigerator compressor (15) connected to the refrigerator evaporator and to the refrigerator condenser, said cooling compressor (15) being configured to compress a gas directed into said refrigerator condenser determining, in use, a heating of the latter sufficient to cause a boiling of the water (201) to distill, said refrigerator evaporator being configured to allow an expansion of the gas previously compressed by the cooling compressor (15) determining, in use, a cooling of the distillation steam sufficient to cause a condensation of the distilled water (300) in the collection portion (109).

According to another non-limiting aspect, said gas is propane, in particular Kryon® 290 and/or is R134a.

According to another non-limiting aspect, said gas comprises at least partially one of the following gases: propane or R 134a.

According to another non-limiting aspect, the refrigerator condenser is positioned in substantial correspondence of the distillation chamber.

According to another non-limiting aspect, the refrigerator condenser is positioned within the distillation chamber, in particular lying substantially in correspondence of a bottom portion of the distillation chamber and/or is positioned outside of the distillation chamber and at least part of the lateral wall (2) in substantial correspondence of the distillation chamber is characterized by a high thermal conductivity.

According to another non-limiting aspect, the cooler (15*e*) is positioned within the cavity (2*c*, 2*d*) in substantial correspondence of the condensation chamber, optionally at a height not lower than the height at which the intermediate or separating element (100) lies.

According to another non-limiting aspect, the cooler (15*e*), in particular the refrigerator evaporator, is positioned in substantial correspondence of the lateral wall (104).

According to another non-limiting aspect, the cooler (15*e*) is positioned at least partially in substantial axial alignment with the at least a through hole (105).

According to another non-limiting aspect, the cooler (15*e*) is positioned at least partially in substantial axial alignment with the plurality of through holes (105) in correspondence of a portion of the condensation chamber annularly defined between the intermediate or separating element (100) and the lateral wall (2).

According to another non-limiting aspect, the refrigerator evaporator (15*e*) is positioned at least partially in substantial axial alignment with the at least a through hole (105).

According to another non-limiting aspect, the refrigerator evaporator (15*e*) is positioned at least partially in substantial axial alignment with the at least a through hole (105) in correspondence of a portion of the condensation chamber annularly defined between the intermediate or separating element (100) and the lateral wall (2).

According to another non-limiting aspect, the refrigerator evaporator is positioned in substantial correspondence of the condensation chamber, and lies at a height at least partially substantially corresponding to the height at which lies the intermediate or separating element (100), lying in particular in correspondence of a portion of the condensation chamber annularly defined between the intermediate or separating element (100) and the lateral wall (2) and/or lying outside of the head portion (101) of the intermediate or separating element (100) and/or being at least partially in substantial axial alignment with the plurality of through holes (105).

According to another non-limiting aspect, the water distillation device (1) comprises an inlet duct (7) for the water (201) to distill, said inlet duct (7) being configured to supply water (201) to distill within the distillation chamber (**2*d***).

According to another non-limiting aspect, the water distillation device (1) comprises an inlet valve (8) connected with the inlet duct (7) and configured to control the inflow of the water (201) to distill within said distillation chamber (**2*d***).

According to another non-limiting aspect, the inlet valve (8) comprises at least an open configuration and a closed configuration.

According to another non-limiting aspect, the inlet valve (8) is an electro-actuated valve.

According to another non-limiting aspect, in the operating configuration of supply of distilled water, the inlet valve (8) is in closed configuration.

According to another non-limiting aspect, the water distillation device (1) comprises an outlet valve (12) configured to adjust the water outflow from the collection portion (109).

According to another non-limiting aspect, the water distillation device (1) comprises a data processing unit (119) configured at least to cause a vacuum maintenance within said cavity (**2*c*, 2*d*) between a first and a second threshold value (Thv1, Thv2**).

According to another non-limiting aspect, the data processing unit (119) is configured at least to store a first and a second vacuum threshold value (Thv1, Thv2).

According to another non-limiting aspect, the data processing unit (119) is configured at least to carry out a controlled opening of the inlet valve (8) where the vacuum present in the cavity (**2*c*, 2*d*), in particular inside the distillation chamber and the condensation chamber, is higher than a first threshold value (Thv1), so that the vacuum value falls again between the first and the second threshold value (Thv1, Thv2), and/or configured to carry out a controlled opening of the outlet valve (12), where the vacuum present in the cavity (2*c*, 2*d*), in particular inside the distillation chamber and the condensation chamber, is lower with respect to the second threshold value (Thv2), so that the vacuum value falls again between the first and the second threshold value (Thv1, Thv2**).

According to another non-limiting aspect, the water distillation device (1) further comprises a vacuum pump (13) connected with said cavity (**2*c*, 2*d*) and configured to create, in use, a predetermined vacuum within said cavity (2*c*, 2*d***).

According to another non-limiting aspect, the water distillation device (1) comprises an air extraction duct (14) connected to said vacuum pump (13).

According to another non-limiting aspect, the air extraction duct (14) is positioned in an upper portion of the body and/or in substantial correspondence of the condensation chamber (**2*c*), in particular in an upper portion of the condensation chamber (2*c***).

According to another non-limiting aspect, the data processing unit (119) is configured to activate the vacuum pump (13) connected with said cavity (**2*c*, 2*d*) in such a way said vacuum is automatically maintained between said first and said second threshold value (Thv1, Thv2**).

According to another non-limiting aspect, the device (1) further comprises a vacuum pump (13) connected with said cavity (**2*c*, 2*d*) and configured to create a predetermined vacuum within said cavity (2*c*, 2*d*), said vacuum being destined to cause a reduction of the boiling temperature of the water (201**) to distill.

According to another non-limiting aspect, the device (1) comprises a pressure sensor, configured to measure the pressure and/or the vacuum existing within said cavity (**2*c*, 2*d*), said pressure sensor being configured to transmit, in use, a pressure signal designed to cause an activation or a deactivation of said vacuum pump (13**).

According to another non-limiting aspect, the data processing unit (119) is operatively connected with the pressure sensor.

According to another non-limiting aspect, the water distillation device (1) has an operating configuration of supply of distilled water (300), within which the distilled water (300) collected in the collection portion (109) is made flow outside of said cavity (**2*c*, 2*d*), optionally in an outlet duct (10); said device (1) being configured to maintain within said cavity (2*c*, 2*d*) a predetermined vacuum level with respect to a predetermined threshold in the continuation of said operating configuration of supply of distilled water (300**).

According to another non-limiting aspect, the water distillation device (1) has an operating configuration of loading of water (201) to distill, in which the water (201) to distill is supplied into the distillation chamber through an inlet duct; said device (1) being configured to maintain within said cavity (**2*c*, 2*d*) a predetermined level of vacuum with respect to a predetermined threshold in the continuation of said operating configuration of loading water (201**) to distill.

According to another non-limiting aspect, the water distillation device (1) comprises a pre-heater (20) for the water (201) to distill, positioned outside of said cavity (**2*c*, 2*d*), said pre-heater (20) being configured to pre-heat the water (201) to distill before an its introduction in the distillation chamber (2*d***) and comprising:

- a containment vase (21, 22, 23) for the water to pre-heat,
- an inlet duct (24) configured to allow the introduction of the water to pre-heat within said containment vase (21, 22, 23),
- an outlet duct (25), connected with the cavity, in particular with the distillation chamber (**2*d*) and configured to make a pre-heated water flow from the containment vase (21, 22, 23) toward the cavity, in particular toward the distillation chamber (2*d***),
- a pre-heating element (**18*p*), at least partially introduced within said containment vase (21, 22, 23), configured to supply heat to the water to pre-heat contained, in use, in said containment vase (21, 22, 23**).

According to another non-limiting aspect, the pre-heater (20) is configured to bring said water to be pre-heated into contact with said pre-heating element (**18*p*), preferably to bring said water to be pre-heated into direct contact with said pre-heating element (18*p***).

According to another non-limiting aspect, the containment vase (21, 22, 23) is configured to contain a predefined volume of water and/or extends along a substantially vertical main extension direction.

According to another non-limiting aspect, the water distillation device (1) comprises a pre-cooling system for the gases coming out from the refrigerator condenser (**15*c*), configured to cool at least a part of the intermediate duct (18**).

According to another non-limiting aspect, said pre-cooling system comprises an active cooler configured to subtract heat from said at least a part of the intermediate duct (18).

According to the present disclosure it is further described a water distillation device (1), comprising:

a body having a lateral wall (2) and defining a cavity (2c, 2d) suitable for allowing the distillation of an amount of water (201) to distill, wherein in said cavity (2c, 2d) are defined a distillation chamber (2d) and a condensation chamber (2c), and wherein the condensation chamber (2c) comprises a collection portion (109) destined to collect at least temporarily distilled water (300), a heater, configured to heat the amount of water (201) to distill present, in use, in the distillation chamber (2d), a cooler, configured to cause a condensation of a distillation steam deriving from the heating of the water (201) to distill through the heater, wherein the cooler is a refrigerator evaporator (15e), the heater is a refrigerator condenser (15c) and wherein the water distillation device (1) comprises a refrigerator compressor (15) connected to the refrigerator evaporator and to the refrigerator condenser, said refrigerator compressor (15) being configured to compress a gas directed within said refrigerator condenser (15c) determining, in use, a heating of the latter sufficient to cause a boiling of the water (201) to distill, said refrigerator evaporator (15e) being configured to allow an expansion of the gas previously compressed by the refrigerator compressor (15) determining, in use, a cooling of the distillation steam sufficient to cause a condensation of the distilled water (300) in the collection portion (109), the water distillation device (1) comprising intermediate duct (18) connected in correspondence of an its own ending with the refrigerator condenser (15c) and in correspondence of an its own second ending with the refrigerator evaporator (15e), said intermediate duct (18) being configured and specifically destined to transport a fluid and/or gas outflowing from the refrigerator condenser (15c) toward the refrigerator evaporator (15e).

According to the present disclosure it is further described a water distillation device (1), comprising:

a body having a lateral wall (2) and defining a cavity (2c, 2d) suitable for allowing the distillation of an amount of water (201) to distill, wherein in said cavity (2c, 2d) are defined a distillation chamber (2d) and a condensation chamber (2c), wherein the condensation chamber (2c) comprises a collection portion (109) destined to collect at least temporarily distilled water (300), at least a heater (15c), configured to heat the amount of water (201) to distill present, in use, in the distillation chamber (2d), a cooler (15e), configured to determine a condensation of a distillation steam, a pre-heater (20) for the water (201) to distill, positioned outside of said cavity (2c, 2d), said pre-heater (20) being configured to pre-heat the water (201) to distill before an introduction thereof in the distillation chamber (2d) and comprising:

a containment vase (21, 22, 23) for the water to pre-heat, an inlet duct (24) configured to allow the introduction of the water to pre-heat within said containment vase (21, 22, 23), an outlet duct (25), connected with the cavity (2c, 2d), in particular with the distillation chamber (2d) and configured to make a pre-heated water flow from the containment vase (21, 22, 23) toward the cavity, in particular toward the distillation chamber (2d), a pre-heating element (18p), at least partially introduced within said containment vase (21, 22, 23), configured to supply heat to the water to pre-heat contained, in use, in said containment vase (21, 22, 23).

According to another non-limiting aspect, said pre-heating element (18p) comprises an intermediate duct (18), at least partially introduced within said containment vase (21, 22, 23) and having a first ending and a second ending, wherein said first ending is connected with the refrigerator condenser and wherein said second ending is connected with said refrigerator evaporator.

According to another non-limiting aspect, the containment vase comprises:

a lateral wall (21), an upper wall (22), a bottom wall (23).

According to another non-limiting aspect, the lateral wall (21) is optionally realized in metal or glass and is optionally covered by a thermally insulating material o is realized in a thermally insulating material.

According to another non-limiting aspect, the intermediate duct (18) extends in a substantially axial direction and parallel to the direction of maximum development of the pre-heater (20), and/or the pre-heating element (18p) assumes a coil shape, extending along a predominantly axial direction, and/or the intermediate duct (18) passes through the upper wall (22) and through the bottom wall (23) and in use extends along a substantially vertical direction.

According to another non-limiting aspect, the refrigerator condenser comprises an inlet (15c') directly supplied by the refrigerator compressor (15) and an outlet (15c"), and wherein the first ending of the intermediate duct is directly connected with the outlet (15c") of the refrigerator condenser.

According to another non-limiting aspect, the pre-heating element (18p) comprises an electric heater, optionally a resistance, configured to transfer heat by Joule effect or by thermal induction.

According to another non-limiting aspect, the pre-heater (20) presents a substantially axial development and the pre-heating element (18p) extends itself within the containment vase (21, 22, 23) along a mainly axial direction, in particular parallel to the substantially axial development direction of the pre-heating element (18p), optionally said substantially axial development being aligned to a sensibly vertical direction.

According to another non-limiting aspect, the water distillation device (1) comprises also an intermediate or separating element (100), positioned in an intermediate position of the cavity (2c, 2d) of the body of the water distillation device (1), and having at least a portion of junction (103) with the lateral wall (2), said intermediate or separating element (100) being configured to divide said cavity (2c, 2d) realizing the distillation chamber (2d) and the condensation chamber (2c), said intermediate or separating element (100) comprising at least a through hole (105) configured to allow the passage of at least a distillation steam from the distillation chamber (2d) to the condensation chamber (2c), said intermediate or separating element (100) comprising at least a collection portion (109) of distilled water (300).

According to the present disclosure it is further described a water distillation device (1), comprising:

a body having a lateral wall (2) and defining a cavity (2c, 2d) suitable for allowing the distillation of an amount of water (201) to distill, wherein in said cavity (2c, 2d) are defined a distillation chamber (2d) and a condensation chamber (2c), wherein the condensation chamber (2*c*) comprises a collection portion (109) destined to collect at least temporarily distilled water (300), at least a heater, configured to heat the amount of water (201) to distill present, in use, in the distillation chamber (2*d*), a cooler (15*e*), configured to determine a condensation of a distillation steam deriving from the heating of the water (201) to distill through the heater, wherein the cooler is a refrigerator evaporator (15*e*), the heater is a refrigerator condenser (15*c*) and wherein the water distillation device (1) comprises a refrigerator compressor (15) connected to the refrigerator evaporator and to the refrigerator condenser, said refrigerator compressor (15) being configured to compress a gas directed within said refrigerator condenser (15*c*) determining, in use, a heating of the latter sufficient to cause a boiling of the water, said refrigerator evaporator (15*e*) being configured to allow an expansion of the gas previously compressed by the refrigerator compressor (15) determining, in use, a cooling of the distillation steam sufficient to cause a condensation of the distillation steam (300) in the collection portion (109), the water distillation device (1) comprising an intermediate duct (18) connected in correspondence of an its own ending with the refrigerator condenser (15*c*) and in correspondence of an its own second ending with the refrigerator evaporator (15*e*), said intermediate duct (18) being configured and specifically destined to transport a fluid and/or gas outflowing from the refrigerator condenser (15*c*) toward the refrigerator evaporator (15*e*), the water distillation device (1) comprising a pre-cooling system for the gases outflowing from the refrigerator condenser (15*c*), configured to cool at least a part of the intermediate duct (18), said pre-cooling system comprising an active cooler configured to subtract heat from said at least a part of the intermediate duct (18).

According to another non-limiting aspect, the active cooler comprises at least a fan (15*v*) electrically fed and configured to convey an air flow on said at least a part of the intermediate duct (18), said air flow being configured to cause a subtraction of heat from said at least a part of the intermediate duct (18).

According to another non-limiting aspect, said fan (15*v*) is an axial fan.

According to another non-limiting aspect, said fan (15*v*) is an electric fan.

According to another non-limiting aspect, the pre-cooling system is installed in substantial correspondence of the refrigerator compressor (15) and is configured to cool at least part of the refrigerator compressor (15), in particular, in use, in substantial temporal simultaneity with the heat subtraction from said at least a part of the intermediate duct (18).

According to another non-limiting aspect, the water distillation device (1) comprises a support (30) for the refrigerator compressor (15), configured to house said pre-cooling system.

According to another non-limiting aspect, said support is configured substantially to house part of the refrigerator compressor (15) and/or to sustain the refrigerator compressor (15) at a predetermined height with respect to a bottom of the water distillation device (1).

According to another non-limiting aspect, the support comprises at least a lateral wall shaped such as to allow to house thereinto part of the refrigerator compressor (15) detecting and/or defining a channel (31) for the passage of cooling air.

According to another non-limiting aspect, the channel (31) is delimited:

in a radially inner zone, by the refrigerator compressor (15), and in a radially outer zone, at least partially by the lateral wall of the support (30).

According to another non-limiting aspect, the fan (15*v*) is configured to push air within said channel (31).

According to another non-limiting aspect, the fan (15*v*) is arranged in a predefined spatial configuration with respect to the support (30) such that, in use, an air flow (F) generated by said fan (15*v*) at first strikes said at least a part of said intermediate duct (18) and subsequently strikes at least part of the refrigerator compressor (15).

According to another non-limiting aspect, the fan (15*v*) is installed under said refrigerator compressor (15).

According to another non-limiting aspect, the water distillation device (1) comprises shock absorbing elements (33), optionally rubber buffers, interposed between the support (30) and the refrigerator compressor (15), said shock absorbing elements (33) being configured and specifically designed to reduce and/or absorb the vibrations generated by the refrigerator compressor (15) during its functioning, and wherein the refrigerator compressor (15) is installed in movable way with respect to said support (30) through said shock absorbing elements (33).

According to another non-limiting aspect, the water distillation device (1) comprises a data processing unit (119) configured to carry out a control of said active cooler, in particular of said fan (15*v*), said data processing unit (119) being configured to automatically adjust at least one between an activation of the active cooler, a deactivation of the active cooler, a cooling action intensity brought by the active cooler, according to one or more of the following parameters: a temperature of the refrigerator compressor (15), a temperature of the refrigerator condenser (15*c*), a temperature of the refrigerator evaporator (15*e*), a thermal differential between the temperature of the refrigerator condenser (15*c*) and the temperature of the refrigerator evaporator (15*e*), a temperature of the water (201) to distill within said distillation chamber (2*d*), a pressure present within said cavity (2*c*, 2*d*).

According to another non-limiting aspect, the support (30) comprises a flange (30*f*) provided with a plurality of holes for the passage of screws (34) configured to fix the refrigerator compressor (15), and wherein the lateral wall is fixed to said flange (30*f*).

According to another non-limiting aspect, the support (30) is realized at least partially in plastic material.

According to another non-limiting aspect, each of said shock absorbing elements (33) is configured to house at least part of a screw (34) to fasten the refrigerator compressor (15) to the flange (30*f*).

According to another non-limiting aspect, said fan (15*v*) is arranged in a predetermined spatial orientation such that it is configured to push air along a direction at least partially oriented along a vertical axis.

According to another non-limiting aspect, said fan (15*v*) is arranged in a predetermined spatial orientation such that it is configured to push air within said channel (31) along a direction at least partially oriented along a vertical axis and, optionally, with a curved path investing a bottom portion of said refrigerator compressor (15).

According to the present disclosure it is further described a water distillation device (1), comprising:

a body having a lateral wall (2) and defining a cavity (2*c*, 2*d*) suitable for allowing the distillation of an amount of water (201) to distill, wherein in said cavity (2*c*, 2*d*) are defined a distillation chamber (2*d*) and a condensation chamber (2*c*), wherein the condensation chamber (2*c*) comprises a collection portion (109) destined to collect at least temporarily distilled water (300), a heater, configured to heat the amount of water (201) to distill present, in use, in the distillation chamber (2*d*), a cooler, configured to determine a condensation of a distillation steam deriving from the heating of the water (201) to distill through the heater, wherein the condensation chamber (2*c*) comprises an outlet (2*f*) configured to allow an outflow of the distilled water (300) from the collection portion (109), wherein the water distillation device (1) is a vacuum distillation device, configured to carry out the distillation of the water (201) to distill at a pressure lower with respect to the atmospheric pressure, wherein the water distillation device (1) has an operating configuration of supply of distilled water (300), within which the distilled water (300) collected in the collection portion (109) is made flow outside of said cavity (2*c*, 2*d*), optionally in an outlet duct (10); said device (1) being configured to maintain within said cavity a predetermined vacuum level with respect to a predetermined threshold in the continuation of said operating configuration of supply of distilled water (300), the water distillation device (1) comprising an extraction pump (400) connected with said outlet (2*f*), said extraction pump (400) being configured to be activated during the operating configuration of supply for extracting the water from the collection portion (109) allowing to maintain the vacuum inside the cavity and/or preventing that the vacuum inside the cavity exceeds a predetermined threshold value, and/or preventing, during its operation, the access of the air inside said cavity (2*c*, 2*d*).

According to another non-limiting aspect, the outlet (2*f*) comprises a through hole bored on the lateral wall (2) and accessing other portions of collection.

According to another non-limiting aspect, said extraction pump (400) is an occlusive pump and/or a volumetric pump and/or is a double effect pump, and is configured to insulate the cavity (2*c*, 2*d*) from the outer environment during its operation and when stopped.

According to another non-limiting aspect, said extraction pump (400) is an electro-actuated pump and/or is a magnetically activated pump.

According to another non-limiting aspect, the extraction pump (400) comprises:

a body (403) that defines a first inlet (401) for the distilled water (300) to extract from the collection portion (109) and a first outlet (404) from which outflows the distilled water (300), a piston (402) configured to push the water from the first inlet (401) to the first outlet (404) defined on the body (403) of the extraction pump (400), wherein the body (403) defines a cylinder for the piston (402).

According to another non-limiting aspect, the piston (402) is axially movable within said body (403) and is configured to move, in use, between a first end stroke position and a second end stroke position.

According to another non-limiting aspect, the extraction pump (400) comprises a first compression chamber (411) for distilled water (300), optionally positioned in front of said piston (402), said compression chamber (411) being defined between said piston (402) and said body (403).

According to another non-limiting aspect, in correspondence of the first end stroke position, or for a first stroke portion comprising the first end stroke position, the first inlet (401) is placed in direct communication with the first compression chamber (411).

According to another non-limiting aspect, in correspondence of the second end stroke position, or for a second stroke portion comprising the second end stroke position, the first inlet (401) is insulated from the first compression chamber (411) by means of the piston (402).

According to another non-limiting aspect, the extraction pump (400) comprises a first unidirectional valve (405), positioned in substantial correspondence of the first compression chamber (411) and configured to allow the outflow of the distilled water (300) from the first compression chamber (411) to the outlet (404).

According to another non-limiting aspect, the body (403) defines a second inlet (401') for the distilled water (300) to extract from the collection portion (109) and a second outlet (404') from which outflows the distilled water (300), and the piston (402) is configured to push the water from the second inlet (401') to the second outlet (404') defined on the body (403) of the extraction pump (400).

According to another non-limiting aspect, the extraction pump (400) comprises a second compression chamber (411') for the distilled water (300), optionally positioned in front of said piston (402), said second compression chamber (411') being defined between said piston (402) and said body (403).

According to another non-limiting aspect, said second compression chamber (411') is opposed to said first compression chamber (411).

According to another non-limiting aspect, in said first end stroke position, or for a first stroke portion comprising the first end stroke position, the second inlet (401') is insulated from the second compression chamber (411'), and in correspondence of the second end stroke position, or for a second stroke portion comprising the second end stroke position, the second inlet (401') is placed in direct communication with the second compression chamber (411').

According to another non-limiting aspect, the water distillation device (1) comprises a data processing unit (119) configured at least to cause a maintenance of the vacuum within said cavity (2*c*, 2*d*) between a first and a second threshold value (Thv1, Thv2), wherein the data processing unit (119) is configured at least to carry out a controlled opening of the inlet valve (8) where the vacuum present in the cavity (2*c*, 2*d*), in particular inside the distillation chamber and the condensation chamber, is higher than a first threshold value (Thv1), in such a way that the vacuum value is again between the first and the second threshold value (Thv1, Thv2).

According to another non-limiting aspect, the data processing unit (119) is configured to control at least an activation or a deactivation of the extraction pump (400), in particular to cause a maintenance of the vacuum within said cavity between a first and a second threshold value (Thv1, Thv2).

According to another non-limiting aspect, the data processing unit (119) is configured to commute the opening or the closing of the inlet valve (8) in relation at least to the activation or deactivation, and/or in relation to the activation speed, of the extraction pump (400) such as to maintain the vacuum level within the cavity (2*c*, 2*d*) comprised between the first threshold value (Thv1) and the second threshold value (Thv2).

According to another non-limiting aspect, said extraction pump (400) is configured in such a way that, during the sliding between the first end stroke position and the second end stroke position, the piston (402) causes at first a partial occlusion of the first inlet (401) and subsequently a total occlusion of the first inlet (401) and, contemporarily, the piston (402) causes at first a partial opening of the second inlet (401') and subsequently a total opening of the second inlet (401') such as to determine that the first compression chamber (411) contains, in use, a determined volume of distilled water (300) being insulated from the inlet (401), whereas the second compression chamber (411') opens from its insulating condition with respect to the second inlet (401') resulting again fillable with distilled water (300) to extract from said collection portion (109).

According to another non-limiting aspect, the extraction pump (400) comprises a second unidirectional valve (405'), positioned in substantial correspondence of the second compression chamber (411') and configured to allow the outflow of the distilled water (300) from the second compression chamber (411') to the second outlet (404').

According to another non-limiting aspect, the first unidirectional valve (405) is configured to prevent the inflow of water or air from the respective first outlet (404) to the respective first compression chamber (411).

According to another non-limiting aspect, the second unidirectional valve (405') is configured to prevent the inflow of water or air from the respective second outlet (404') to the respective second compression chamber (411').

According to another non-limiting aspect, in at least one between the first and/or the second unidirectional valve is a respective ball (407, 407'') which is positioned in a seat of the body (403) in substantial correspondence of the first compression chamber (411) or the second compression chamber (411'), preferably in an axial position with the sliding of the piston (402) and is pushed towards said seat by a respective spring (406, 406').

According to another non-limiting aspect, said spring (406, 406') is a helicoidal spring.

According to the present disclosure it is further described a water distillation device (1), comprising:

- a body defining a cavity (2*c*, 2*d*) suitable for allowing the distillation of an amount of water (201) to distill, wherein in said cavity (2*c*, 2*d*) are defined a distillation chamber (2*d*) and a condensation chamber (2*c*), and wherein the condensation chamber (2*c*) comprises a collection portion (109) destined to collect at least temporarily distilled water (300),
- a heater, configured to heat the amount of water (201) to distill present, in use, in the distillation chamber (2*d*),
- a cooler, configured to cause a condensation of a distillation steam deriving from the heating of the water (201) to distill through the heater, wherein the body comprises a head portion (3) and a main portion (2*u*, 2*r*), said distillation chamber (2*d*) being realized in substantial correspondence of the main portion (2*u*, 2*r*), the water distillation device (1) comprising a junction portion (2*k*) angularly joining the head portion (3) with said main portion (2*u*, 2*r*), the head portion (3) comprising a three ways element (2*t*) in turn comprising a first way (2*t*'), a second way (2*t*'') and a third way (2*t*'''), wherein said first way (2*t*') faces on said junction portion (2*k*), and wherein said third way (2*t*''') houses said cooler and substantially defines the condensation chamber (2*c*) and a collection portion (109) for the distilled water (300).

According to another non-limiting aspect, the second way (2*t*'') and the third way (2*t*''') are aligned along a common direction.

According to another non-limiting aspect, said common direction is, in use, substantially vertical.

According to another non-limiting aspect, the collection portion (109) and/or the third way (2*t*''') is positioned at a height lower than the height at which lies at least one between the second way (2*t*'') and/or the first way (2*t*').

According to another non-limiting aspect, said cooler lies inside the condensation chamber (2*c*).

According to another non-limiting aspect, said cooler lies outside said condensation chamber (2*c*).

According to another non-limiting aspect, said first way (2*t*') extends transversally, in particular orthogonally, to the second way (2*t*'') and/or to the third way (2*t*''').

According to another non-limiting aspect, the junction portion (2*k*) is configured and specifically shaped for deviating the flow of the distillation steam from a direction substantially axial with the distillation chamber (2*d*) to a position, and along a direction, offset from said distillation chamber (2*d*).

According to another non-limiting aspect, the junction portion (2*k*) is configured and specifically shaped for deviating the flow of the distillation steam from a direction substantially axial with a main axis (X) of at least part of said cavity, to a position, and along a direction, offset from said distillation chamber (2*d*).

According to another non-limiting aspect, the junction portion (2*k*) detects, and/or extends itself for, an angle substantially higher than 45°, in particular higher than 60°, more in particular substantially equal to 90°.

According to another non-limiting aspect, said head portion (3) is the portion wherein, in use, takes place the condensation of said distillation steam.

According to another non-limiting aspect, the water distillation device (1) is configured to carry out the distillation of the water (201) to distill at a pressure lower with respect to the atmospheric pressure and further comprises a vacuum pump (13) connected with said cavity (2*c*, 2*d*) and configured to create, in use, a predetermined vacuum within said cavity (2*c*, 2*d*).

According to another non-limiting aspect, the head portion (3), in particular the second way (2*t*''), is connected to said vacuum pump (13), optionally through an air extraction duct (14).

According to another non-limiting aspect, the junction portion (2*k*) is integral to the main portion (2*f*, 2*r*) or the junction portion (2*k*) is integral to the three ways element (2*t*), or the three ways element (2*t*), the main portion (2*f*, 2*r*) and the junction portion (2*k*) are all realized as a unique piece and/or integral.

According to another non-limiting aspect, at least one of the portions of the assembly formed by the junction portion (2*k*), by the main portion (2*f*, 2*r*) and by the head portion (3) is removably connected to at least one of the remaining portions of said assembly.

According to another non-limiting aspect, the heater is substantially contained within said distillation chamber (2*d*), and/or the cooler is substantially positioned within said head portion (3), in particular within said third way (2*t*''') and/or within the, or in substantial correspondence of the, collection portion (109).

According to another non-limiting aspect, the three ways element (2*t*) comprises at least a lateral wall and the cooler is substantially contained within said lateral wall.

According to another non-limiting aspect, the third way (2*t*''') comprises at least a lateral wall and the cooler, optionally, the refrigerator evaporator (15*e*) is substantially contained within said lateral wall.

According to another non-limiting aspect, the three ways element (2*t*) comprises at least a lateral wall and the cooler is substantially positioned on, and/or in contact with, an external face of said lateral wall.

According to another non-limiting aspect, the third way (2*t*''') comprises at least a lateral wall and the cooler, optionally, the refrigerator evaporator (15*e*) is substantially positioned on, and/or in contact with, said lateral wall.

According to another non-limiting aspect, the heater is substantially positioned in substantial proximity of the distillation chamber (2*d*) and outside of said distillation chamber (2*d*), and/or wherein said cooler is positioned in substantial correspondence of the head portion (3) and outside of said third way (2*t*''') and/or outside of said collection portion (109) and/or outside of said condensation chamber (2*c*).

According to another non-limiting aspect, said third way (2*t*''') comprises a lateral wall at least partially integrating a thermal-conductive material (2*w*) and wherein said cooler is at least partially, optionally integrally, introduced and/or in contact and/or embedded within said thermal-conductive material (2*w*).

According to another non-limiting aspect, said refrigerator evaporator (15*e*) is embedded within said thermal-conductive material (2*w*) by a process of casting said thermal-conductive material into a mould.

According to another non-limiting aspect, the cooler is a refrigerator evaporator (15*e*), the heater is a refrigerator condenser (15*c*).

According to another non-limiting aspect, the water distillation device (1) comprises a refrigerator compressor (15) connected to the refrigerator evaporator and to the refrigerator condenser, said refrigerator compressor (15) being configured to compress a gas directed to said refrigerator condenser (15*c*) determining, in use, a heating of the latter sufficient to cause a boiling of the water (201) to distill, said refrigerator evaporator (15*e*) being configured to allow an expansion of the gas previously compressed by the refrigerator compressor (15) determining, in use, a cooling of the distillation steam sufficient to cause a condensation of the distillation steam in the collection portion (109).

According to another non-limiting aspect, the water distillation device (1) comprising an intermediate duct (18) connected in correspondence of an its own ending with the refrigerator condenser (15*c*) and in correspondence of an its own second ending with the refrigerator evaporator (15*e*), said intermediate duct (18) being configured and specifically designed to transport a fluid and/or gas outflowing from the refrigerator condenser (15*c*) toward the refrigerator evaporator (15*e*).

According to another non-limiting aspect, at least part of the body and/or of said lateral wall (2) is realized in a metallic material.

According to another non-limiting aspect, at least part of the body and/or of said lateral wall (2) is realized in thermally insulating material, optionally glass, in particular borosilicate glass, and/or plastic material.

According to another non-limiting aspect, the body and/or said lateral wall (2) is integrally realized in metallic material.

According to another non-limiting aspect, the body and/or said lateral wall (2) is integrally realized in thermally insulating material, optionally glass, in particular borosilicate glass, and/or in plastic material.

According to another non-limiting aspect, the body comprises at least a first upper portion integrating said head portion (3) and a second lower portion integrating said base portion (4).

According to another non-limiting aspect, the body comprises an intermediate portion arranged between the first upper portion and the second lower portion.

According to another non-limiting aspect, the intermediate portion and the first upper portion and second lower portion are removably connectable to each other.

According to another non-limiting aspect, the first upper portion and the second lower portion are directly removably connectable to each other.

According to another non-limiting aspect, the lateral wall (2) is defined at least on the first upper portion and on the second lower portion of the body of the water distillation device (1).

According to another non-limiting aspect, the lateral wall (2) is defined at least on the intermediate portion of the body of the water distillation device (1).

According to another non-limiting aspect, the intermediate or separating element (100) is integral and/or is realized as a piece on the first upper portion or is integral and/or is realized as a piece on the second lower portion or is integral and/or is realized as a piece on the intermediate portion, and/or is integral and/or is realized as a piece on the lateral wall (2).

According to another non-limiting aspect, the portion of junction (103) of the intermediate or separating element is integral and/or is realized as a single piece on the first upper portion or is integral and/or is realized as a single piece on the second lower portion or is integral and/or is realized as a single piece on the intermediate portion, and/or is integral and/or is realized as a single piece on the lateral wall (2).

According to another non-limiting aspect, the at least a through hole (105) configured to allow the passage of at least a distillation steam from the distillation chamber (2*d*) to the condensation chamber (2*c*) has an axis substantially parallel to the main axis (X), and optionally is centered on the main axis (X).

According to another non-limiting aspect, the at least a through hole (105) opens directly on the cavity (106).

According to another non-limiting aspect, the cavity (106) has a cross-section of variable area, in particular tapering moving progressively along the main axis (X) between the lower portion of the intermediate or separating element (100) towards the upper portion of the intermediate or separating element (100).

According to another non-limiting aspect, the cavity (106) has a cross-section of substantially circular shape.

According to another non-limiting aspect, the water distillation device (1) comprises an intermediate septum (110) configured to force the distillation steam in a curved path (200), at least partially misaligned with respect to the main axis (X), between the distillation chamber (2*d*) and the condensation chamber (2*c*), and/or configured to prevent a substantially axial path of the distillation steam between the distillation chamber (2*d*) and the condensation chamber (2*c*).

According to another non-limiting aspect, the intermediate septum (110) is configured to be at least partially substantially installed in correspondence of the intermediate or separating element (100), optionally in correspondence of a cavity (106) of the intermediate or separating element (100).

According to another non-limiting aspect, the intermediate septum (110) is realized at least partially in plastic material and/or in metallic material and/or in glassy material.

According to another non-limiting aspect, the intermediate septum (110) comprises at least one division plane (110*s*), preferably a plurality of division planes (110*s*); said at least one division plane (110*s*), optionally said plurality of division planes (110*s*), being configured to determine the curved path (200) assumed by the distillation steam between the distillation chamber (2*d*) and the condensation chamber (2*c*) and/or to prevent a substantially axial path of the distillation steam between the distillation chamber (2*d*) and the condensation chamber (2*c*).

According to another non-limiting aspect, the at least one division plane (110*s*) is substantially inclined with respect to the main axis (X), optionally is substantially orthogonal to the main axis (X).

According to another non-limiting aspect, the division planes of the plurality of division planes (110*s*) are parallel to each other.

According to another non-limiting aspect, the division planes of the plurality of division planes (110*s*) are substantially inclined with respect to the main axis (X), optionally are substantially orthogonal to the main axis (X).

According to another non-limiting aspect, the at least one division plane (110*s*) presents a perimeter portion in substantial contact with a lateral wall of the intermediate or separating element (100) delimiting said cavity (106).

According to another non-limiting aspect, each division plane of the plurality of division planes (110*s*) presents a perimeter portion in substantial contact with a lateral wall of the intermediate or separating element (100) delimiting said cavity (106).

According to another non-limiting aspect, the at least one division plane (110*s*) detects and/or comprises at least an opening suitable for allowing the passage at least of the distillation steam.

According to another non-limiting aspect, the cross-section of the cavity (106) is substantially circular, and the at least one division plane (110*s*) detects and/or comprises an incomplete circular profile.

According to another non-limiting aspect, said incomplete circular profile detects and/or comprises said opening suitable for allowing the passage at least of the distillation steam.

According to another non-limiting aspect, the opening is misaligned with respect to the main axis (X).

According to another non-limiting aspect, the intermediate septum (110) comprises at least a first division plane (110*s*) and a second division plane (110*s*) superimposed upon each other, wherein the first division plane (110*s*) detects and/or comprises at least a first opening suitable for allowing the passage at least of the distillation steam, wherein the second division plane (110*s*) detects and/or comprises at least a second opening suitable allowing the passage at least of the distillation steam, the first opening being misaligned with respect to the second opening.

According to the present disclosure it is described a water distillation method (1), optionally realized by means of a water distillation device (1) according to one or more of the aspects herein described, the method comprising:

a step of introducing water (201) to distill into a distillation chamber (2*d*) being part of a cavity (2*c*, 2*d*) of a body of a water distillation device (1), a step of heating of the water (201) to distill by means of a heater (15*c*), so that by means of heating at least part of the water (201) to distill, a distillation steam is generated;

a step of transit of the distillation steam within an intermediate or separating element (100) of the water distillation device (1), positioned in an intermediate position of the cavity (2*c*, 2*d*) of the body, and having at least a junction portion (103) with a lateral wall (2) of said body, said intermediate or separating element (100) being configured to divide said cavity (2*c*, 2*d*) realizing the distillation chamber (2*d*) and the condensation chamber (2*c*), wherein said step of transit comprises a transit of at least part of the distillation steam for at least a through hole (105) of the intermediate or separating element (100), said step of transit determining an accumulation of distillation steam in the condensation chamber (2*c*) and determining a collection portion (109) of distilled water (300) defined in the condensation chamber (2*c*).

According to another non-limiting aspect, the collection comprises a collection of distilled water (300) through a lateral wall of collection (102) of the intermediate or separating element (100), said lateral wall of collection (102) being joint with or bordering with said portion of junction (103).

According to another non-limiting aspect, the collection comprises a collection of distilled water (300) in a collection portion (109) comprised between the lateral wall (2) and the lateral wall of collection (102).

According to another non-limiting aspect, the method comprises a closing of said body by means of a head portion (3) and a bottom portion (4), wherein the head portion delimits said body at the top and wherein the bottom portion delimits said body at the bottom.

According to another non-limiting aspect, the step of transit comprises diverting a path of distillation steam by means of a head portion (101) of the intermediate or separating element (100), optionally comprising diverting the path (200) of distillation steam by means of an upper wall of the head portion (101) of the intermediate or separating element (100), said upper wall being optionally substantially orthogonal to the main axis (X).

According to another non-limiting aspect, the step of transit of at least part of the distillation steam by means at least of a through hole (105) of the intermediate or separating element (100) is a step of transit wherein the distillation steam passes through at least a through hole (105) realized in a lateral wall (104) of the intermediate or separating element (100), said lateral wall being optionally jointed with the upper wall in substantial correspondence of an upper end portion thereof and being a wall aligned with the main axis (X).

According to another non-limiting aspect, the step of transit of at least part of the distillation steam by means at least of a through hole (105) of the intermediate or separating element (100) is a step of transit wherein the distillation steam passes through at least a through hole (105) realized in correspondence of the head portion (101) of the intermediate or separating element (100).

According to another non-limiting aspect, the step of transit determines, through the at least a through hole (105), a vaporization and condensation path (200) substantially curved and at least partially misaligned with respect to the main axis (X) of development of the body and/or of the cavity (2*c*, 2*d*).

According to another non-limiting aspect, the collection of distilled water (300) in a collection portion (109) of distilled water (300) defined in the condensation chamber (2*c*) takes place at a height lower with respect to said head portion (101).

According to another non-limiting aspect, the method comprises making at least part of the distilled water (300) slide on a wall of collection (102) substantially inclined with respect to a portion of junction (103) between the intermediate or separating element (100) and/or with respect to the main axis (X) and optionally lying at least partially, optionally integrally, at a greater height with respect to the portion of junction (103).

According to another non-limiting aspect, the collection of distilled water (300) in a collection portion (109) of distilled water (300) defined in the condensation chamber (2*c*) takes place in a collection portion (109) of distilled water (300) having substantially annular shape.

According to another non-limiting aspect, the collection of distilled water (300) in a collection portion (109) of distilled water (300) defined in the condensation chamber (2*c*) takes place in a collection portion (109) of distilled water (300) lying in a radially central position of said intermediate or separating element (100).

According to another non-limiting aspect, the method comprises transiting the distillation steam from the distillation chamber (2*d*) which lies at a first and lower height to the condensation chamber (2*c*) which lies at a second and higher height.

According to another non-limiting aspect, the method comprises a step of cooling of the distillation steam by means of a cooler (15*e*) of the distillation device, said cooling determining a condensation of the distillation steam.

According to another non-limiting aspect, the condensation caused by the cooler (15*e*) determines a collection of condensed distillation steam in substantial correspondence of the collection portion (109).

According to another non-limiting aspect, the cooler (15*e*) comprises at least a Peltier cell, and the step of cooling comprises the activation of said Peltier cell.

According to another non-limiting aspect, the cooler (15*e*) comprises a fluid or gas cooler, in particular a refrigerator evaporator, and the step of cooling comprises the supply of fluid or gas on said cooler (15*e*).

According to another non-limiting aspect, the method comprises positioning the cooler (15*e*) in substantial correspondence of the condensation chamber.

According to another non-limiting aspect, the method comprises a step of heating of the water (201) to distill by means of an auxiliary heater (500) positioned in substantial correspondence of the distillation chamber.

According to another non-limiting aspect, the method comprises a step of starting of the distillation through a simultaneous activation of the heater (15*c*) and of the auxiliary heater (500).

According to another non-limiting aspect, the method comprises placing the auxiliary heater (500) inside and/or in substantial correspondence of a spiral or coil realized by the heater (15*c*).

According to another non-limiting aspect, the method comprises bringing the intermediate or separating element (100) into contact with the lateral wall (2) by means of at least a first seal ring (108) configured to come into substantial contact with said lateral wall (2), in particular determining a substantial insulation and/or separation of the distillation chamber (2*d*) from the condensation chamber (2*c*).

According to another non-limiting aspect, the method comprises bringing the intermediate or separating element (100) into contact with the lateral wall (2) by means of at least a first and a second seal ring (108), said first and said second seal ring (108) being each one configured to come into substantial contact with said lateral wall (2), in particular determining a substantial insulation and/or separation of the distillation chamber (2*d*) from the condensation chamber (2*c*).

According to another non-limiting aspect, the method comprises a filtering of the distillation steam and/or a separation of the distillation chamber (2*d*) from the condensation chamber (2*c*) by means of a filtering membrane of the intermediate or separating element (100), wherein the filtering of the distillation steam and/or the separation of the condensation chamber (2*c*) from the distillation chamber (2*s*) allows the passage of water steam and a retaining of solid residuals deriving from the water distillation process and/or an impediment to the passage of significant amounts of water in liquid form, in particular in droplets or bubbles.

According to another non-limiting aspect, the filtering comprises causing the distillation steam to flow through a plurality of substantially open passages or holes of the filtering membrane, said open passages or holes determining a passage of molecules of a size smaller than a predetermined size and, also, determining an impediment to the passage of molecules of a size greater than or equal to said predetermined size.

According to another non-limiting aspect, the method comprises making the distillation steam flow within a cavity (106) of the intermediate or separating element (100) and within a labyrinth of distillation steam distribution that communicates with the at least one through hole (105), said labyrinth of distribution being positioned in the cavity (106).

According to another non-limiting aspect, the method comprises causing the outflow of the distilled water (300) from the collection portion (109) by means of a through hole (2*f*) bored on the lateral wall (2).

According to another non-limiting aspect, the method comprises boring the through hole (2*f*) on the lateral wall (2) in substantial correspondence of the collection portion (109) in particular in substantial correspondence of a bottom zone of the collection portion (109), and/or in substantial correspondence of an upper edge of the portion of junction (103).

According to another non-limiting aspect, the method comprises carrying out the vacuum distillation of water.

According to another non-limiting aspect, the method comprises a step of activation of a refrigerator compressor (15) connected to the refrigerator evaporator and to the refrigerator condenser, and comprises a step of compression, by means of the refrigerator compressor (15), of a fluid and/or gas directed into the refrigerator condenser (15*c*) determining a heating of said refrigerator compressor (15) and/or of said gas; said heating being sufficient to cause a boiling of the water (201) to distill, said method comprising an expansion of the gas previously compressed by the refrigerator compressor (15) within the refrigerator condenser (15*c*) by means of a refrigerator evaporator determining a cooling of the distillation steam sufficient to cause a condensation of the distilled water (300) in the collection portion (109).

According to another non-limiting aspect, the method comprises putting the refrigerator condenser in substantial correspondence of the distillation chamber.

According to another non-limiting aspect, the method comprises putting and/or installing the refrigerator condenser within the distillation chamber (2$d$), in particular positioning the refrigerator condenser substantially in correspondence of a bottom portion of the distillation chamber and/or positioning the refrigerator condenser outside the distillation chamber.

According to another non-limiting aspect, the method comprises realizing at least part of the lateral wall (2), in substantial correspondence of the distillation chamber, with a material having a high thermal conductivity.

According to another non-limiting aspect, the method comprises positioning the cooler (15$e$) within the cavity (2$c$, 2$d$) in substantial correspondence of the condensation chamber (2$c$), optionally at a height no lower than the height at which the intermediate or separating element lies (100).

According to another non-limiting aspect, the method comprises positioning the cooler (15$e$), in particular the refrigerator evaporator, in substantial correspondence of the lateral wall (104) of the intermediate or separating element (100).

According to another non-limiting aspect, the method comprises causing the flowing of the distillation steam through the at least a through hole (105) and in substantial proximity or contact with the cooler (15$e$) positioned at least partially in substantial axial alignment with the at least one through hole (105).

According to another non-limiting aspect, the method comprises causing the flowing of the distillation steam through the at least a through hole (105) and in substantial proximity or contact with the cooler (15$e$) positioned at least partially at a same height assumed by the at least a through hole (105).

According to another non-limiting aspect, the method comprises positioning the cooler (15$e$) at least partially in substantial axial alignment with the plurality of through holes (105) in correspondence of a portion of the condensation chamber (2$c$), so that said condensation chamber (2$c$) results annularly defined between the intermediate or separating element (100) and the lateral wall (2).

According to another non-limiting aspect, the method comprises supplying water (201) to distill within the distillation chamber (2$d$) through an inlet duct (7) opening on the distillation chamber (2$d$), in particular through a through hole.

According to another non-limiting aspect, the method comprises operating an inlet valve (8) connected to the inlet duct (7) to control the inflow of water (201) to distil within said distillation chamber (2$d$).

According to another non-limiting aspect, during the delivery of distilled water (300), optionally via the through-hole, the inlet valve (7) is closed.

According to another non-limiting aspect, the method comprises operating an outlet valve (12) to adjust the water outflow from the collection portion (109).

According to another non-limiting aspect, the method comprises maintaining a vacuum comprised between a first and a second threshold value (Thv1, Thv2) within said cavity (2$c$, 2$d$), optionally through a data processing unit (119).

According to another non-limiting aspect, the method comprises a step of storing a first and a second vacuum threshold value (Thv1, Thv2) in said data processing unit (119) or through said data processing unit (119).

According to another non-limiting aspect, the method comprises a controlled opening of the inlet valve (8) where the vacuum present in the cavity (2$c$, 2$d$), in particular inside the distillation chamber and the condensation chamber, is higher than a first threshold value (Thv1), in such a way that the vacuum value is again between the first and the second threshold value (Thv1, Thv2), and/or comprises a controlled opening of the outlet valve (12), where the vacuum present in the cavity (2$c$, 2$d$), in particular inside the distillation chamber and the condensation chamber, is lower with respect to the second threshold value (Thv2), in such a way that the vacuum value is again between the first and the second threshold value (Thv1, Thv2).

According to another non-limiting aspect, the controlled opening of the inlet valve (8) and/or of the outlet valve (12) take place through the data processing unit (119).

According to another non-limiting aspect, the method further comprises creating a predetermined vacuum within said cavity (2$c$, 2$d$), optionally comprised between the first and second threshold value (Thv1, Thv2), through the activation of a vacuum pump (13) of the water distillation device (1), said vacuum pump being connected with said cavity (2$c$, 2$d$).

According to another non-limiting aspect, the creation of the predetermined vacuum within the cavity (2$c$, 2$d$) comprises the extraction of air from the cavity (2$c$, 2$d$) via an air extraction duct (14) connected with said vacuum pump (13).

According to another non-limiting aspect, the method comprises extracting the air from the cavity (2$c$, 2$d$) from a top portion of the body and/or in substantial correspondence of the condensation chamber (2$c$), in particular in an upper portion of the condensation chamber (2$c$).

According to another non-limiting aspect, the method comprises programming and/or controlling the data processing unit (119) in such a way that it activates the vacuum pump (13) connected to said cavity (2$c$, 2$d$) in such a way that said vacuum is automatically maintained between said first and said second threshold value (Thv1, Thv2).

According to another non-limiting aspect, the predetermined vacuum within said cavity (2$c$, 2$d$), is destined to cause a reduction of the boiling temperature of the water (201) to distill.

According to another non-limiting aspect, the method comprises a step of measurement of a vacuum level subsisting within the cavity (2$c$, 2$d$) by means of a pressure sensor; the method comprising a step of transmission of a pressure signal intended to cause an activation or deactivation of said vacuum pump (13).

According to another non-limiting aspect, the method comprises a creation and/or maintenance of an operational connection between the data processing unit (119) and the pressure sensor.

According to another non-limiting aspect, the method comprises a step of loading water (201) to distill, wherein the water (201) to distill is introduced into the distillation chamber (2$d$) through an inlet duct; and the method comprises maintaining within the said cavity (2$c$, 2$d$) a predetermined vacuum level with respect to a predetermined threshold during the continuation of the step of loading water (201) to distill.

According to another non-limiting aspect, the method comprises a step of pre-heating of the water (201) to distill by means of a pre-heater (20) positioned outside said cavity (2$c$, 2$d$), so that the water (201) to distill is heated before it is introduced into the distillation chamber (2$d$), the step of pre-heating the water (201) to distill comprising:

- an introduction of water into a containment vase (21, 22, 23) of the pre-heater (20) by means of an inlet duct (24) configured to allow the introduction of the water to be pre-heated within said containment vase (21, 22, 23), an extraction of water from the containment vase (21, 22, 23) by means of an outlet duct (25), connected to the cavity (2*c*, 2*d*), in particular to the distillation chamber (2*d*) so that the pre-heated water is made to flow from the containment vase (21, 22, 23) to the cavity (2*c*, 2*d*), in particular to the distillation chamber (2*d*), a supply of a pre-heating element (18*p*), at least partially introduced within said containment vase (21, 22, 23), so that a heat is supplied to the water to be pre-heated contained in the containment vase (21, 22, 23).

According to another non-limiting aspect, the introduction of water into the containment vase (21, 22, 23) determines bringing said water to be pre-heated into contact with said pre-heating element (18*p*), preferably determining bringing said water to be pre-heated into direct contact with said pre-heating element (18*p*).

According to another non-limiting aspect, the method comprises a step of pre-cooling of the gas outflowing the refrigerator condenser (15*c*), said pre-cooling taking place by means of a pre-cooling system of the water distillation device (1), said pre-cooling system being configured to cool at least a part of the intermediate duct (18).

According to another non-limiting aspect, the step of pre-cooling comprises the activation of an active cooler, determining a removal of heat from said at least a part of the intermediate duct (18).

According to the present disclosure it is further described a water distillation method (1), optionally according to one or more of the aspects described herein, the method comprising:

a step of introduction of water (201) to distill into a distillation chamber (2*d*) forming part of a cavity (2*c*, 2*d*) of a body of a water distillation device (1), a step of heating of the water (201) to distill by means of a heater (15*c*), so that by means of heating at least part of the water (201) to distill, a distillation steam is generated;

a step of cooling of the distillation steam by means of a cooler, said step of cooling determining a condensation of the distillation steam for the production of distilled water (300), wherein the step of heating of water (201) by means of a heater (15*c*) is a step of heating by means of a refrigerator condenser (15*c*), the step of cooling of the condensation steam is a step of cooling by means of a refrigerator evaporator (15*e*), the method comprises a step of supply of the refrigerator condenser (15*c*) and of the refrigerator evaporator (15*e*) by means of a refrigerator compressor (15) connected to the refrigerator evaporator and to the refrigerator condenser, the step of supply comprising the compression, by means of the refrigerator compressor (15), of a gas directed into the refrigerator condenser (15*c*) determining a heating of said fluid and/or gas and/or of said refrigerator condenser (15*c*) sufficient to cause a boiling of the water (201) to distill, the step of supply determining an expansion of the gas previously compressed by the refrigerator compressor (15) determining, in use, a cooling of the distillation steam sufficient to cause a condensation of the distillation steam in the collection portion (109), the method comprising making the fluid and/or gas flow in an intermediate duct (18) connected in correspondence of one its end to the refrigerator condenser (15*c*) and in correspondence of an its second end to the refrigerator evaporator (15*e*), so that the intermediate duct (18) conveys the fluid and/or gas outflowing the refrigerator condenser (15*c*) toward the refrigerator evaporator (15*e*).

According to the present disclosure it is further described a water distillation method (1), optionally by means of a water distillation device (1) according to one or more of the aspects described herein, the method comprising:

a step of introduction of water (201) to distill into a distillation chamber (2*d*) forming part of a cavity (2*c*, 2*d*) of a body of a water distillation device (1), a step of heating of the water (201) to distill by means of a heater (15*c*), so that by means of heating at least part of the water (201) to distill, a distillation steam is generated;

a step of cooling of the distillation steam by means of a cooler, said step of cooling determining a condensation of the distillation steam for the production of distilled water (300), wherein the step of heating of water (201) by means of a heater (15*c*) is a step of heating by means of a refrigerator condenser (15*c*), the step of cooling of the condensation steam is a step of cooling by means of a refrigerator evaporator (15*e*), and wherein the method comprises a step of pre-heating of the water (201) to distill by means of a pre-heater (20) positioned outside said cavity (2*c*, 2*d*), so that the water (201) to distill is heated before its introduction into the distillation chamber (2*d*), the step of pre-heating of the water (201) to distill comprising:

an introduction of water into a containment vase (21, 22, 23) of the pre-heater (20) by means of an inlet duct (24) configured to allow the introduction of the water to be pre-heated within said containment vase (21, 22, 23), an extraction of water from the containment vase (21, 22, 23) by means of an outlet duct (25), connected to the cavity (2*c*, 2*d*), in particular to the distillation chamber (2*d*) so that the pre-heated water is made to flow from the containment vase (21, 22, 23) to the cavity (2*c*, 2*d*), in particular to the distillation chamber (2*d*), a supply of a pre-heating element (18*p*), at least partially introduced within said containment vase (21, 22, 23), so that a heat is supplied to the water to be pre-heated contained in the containment vase.

According to another non-limiting aspect, the method comprises connecting a first end of the intermediate duct (18) at least partially introduced into the containment vase (21, 22, 23) with the refrigerator condenser and also comprises connecting a second end of the intermediate duct (18) with the refrigerator evaporator.

According to another non-limiting aspect, the method comprises supplying an inlet (15*c*') of the refrigerator condenser directly by means of the refrigerator compressor (15) and comprises directly connecting an outlet (15*c*') of the refrigerator condenser with the first end of the intermediate duct.

According to another non-limiting aspect, the method comprises a step of transit of the distillation steam within an intermediate or separating element (100) of the water distillation device (1), positioned in an intermediate position of the cavity (2*c*, 2*d*) of said body, and having at least a junction portion (103) with a lateral wall (2) of said body, said intermediate or separating element (100) being configured to divide said cavity (2*c*, 2*d*) realizing the distillation chamber (2*d*) and the condensation chamber (2*c*), wherein said step of transit comprises a transit of at least part of the distillation steam for at least a through hole (105) of the intermediate or separating element (100), known as the step of transit, determining an accumulation of distillation steam in the condensation chamber (2*c*) and determining a collection of distilled water (300) in a collection portion (109) of distilled water (300) defined in the condensation chamber (2*c*).

According to the present disclosure it is further described a water distillation method (1), optionally by means of a water distillation device (1) according to one or more of the aspects described herein, the method comprising:

a step of introduction of water (201) to distill into a distillation chamber (2*d*) forming part of a cavity (2*c*, 2*d*) of a body of a water distillation device (1), a step of heating of the water (201) to distill by means of a heater (15*c*), so that by means of a heating at least part of the water (201) to distill, a distillation steam is generated;

a step of cooling of the distillation steam by means of a cooler, said step of cooling determining a condensation of the distillation steam for the production of distilled water (300), wherein the step of heating of water (201) by means of a heater (15*c*) is a step of heating by means of a refrigerator condenser (15*c*), the step of cooling of the condensation steam is a step of cooling by means of a refrigerator evaporator (15*e*), wherein the method comprises a step of supply of the refrigerator condenser (15*c*) and of the refrigerator evaporator (15*e*) by means of a refrigerator compressor (15) connected to the refrigerator evaporator and to the refrigerator condenser, the step of supply comprising the compression, by means of the refrigerator compressor (15), of a fluid and/or gas directed into the refrigerator condenser (15*c*) determining a heating of said fluid and/or gas and/or of said refrigerator condenser (15*c*) sufficient to cause a boiling of the water (201) to distill, the step of supply determining an expansion of the fluid and/or gas previously compressed by the refrigerator compressor (15) determining, in use, a cooling of the distillation steam sufficient to cause a condensation of the distillation steam in the collection portion (109), wherein the method comprising making the fluid and/or gas flow in an intermediate duct (18) connected in correspondence of a first own end to the refrigerator condenser (15*c*) and in correspondence of an second own end to the refrigerator evaporator (15*e*), so that the intermediate duct (18) conveys the fluid and/or gas outflowing the refrigerator condenser (15*c*) to the refrigerator evaporator (15*e*), the method comprising a step of pre-cooling of the gases outflowing out of the refrigerator condenser by means of a pre-cooling system comprising an active cooler, wherein the step of pre-cooling comprises supplying the active pre-cooler to cool at least a part of the intermediate duct (18) by means of a subtraction of heat from said at least a part of the intermediate duct (18).

According to another non-limiting aspect, the method comprises a step of conveying an air flow over said at least a part of said intermediate duct (18) by means of the active cooler by means of the power supply of a fan (15*v*) configured to convey an air flow over said at least a part of said intermediate duct (18), said air flow determining a heat removal from said at least a part of said intermediate duct (18).

According to another non-limiting aspect, the method comprises a step of installation of the pre-cooling system in substantial correspondence of the refrigerator compressor (15), so that said pre-cooling system can cool at least part of the refrigerator compressor (15), in particular in substantial temporal simultaneity with the heat subtraction from said at least a part of the intermediate duct (18).

According to another non-limiting aspect, the method comprises arranging and/or housing the refrigerator compressor (15) of the water distillation device (1) on a support (30) for the refrigerator compressor (15).

According to another non-limiting aspect, the method comprises supporting, by means of said support, the refrigerator compressor (15) at a predetermined height with respect to a bottom of the water distillation device (1).

According to another non-limiting aspect, the method comprises the flowing of a cooling airflow (F) in a channel (31) defined by means of the lateral wall of the support (30) and the refrigerator compressor.

According to another non-limiting aspect, said channel (31) is delimited:

in a radially internal zone, from the refrigerator compressor (15), and in a radially external area, at least partially from the lateral wall of the support (30).

According to another non-limiting aspect, the fan (15*v*) is configured to push air within said channel (31).

According to another non-limiting aspect, the fan (15*v*) is arranged in a predefined spatial configuration with respect to the support (30) and the method comprises the flowing of the airflow (F) generated by said fan (15*v*) against at least part of said intermediate duct (18) and subsequently against at least part of the refrigerator compressor (15).

According to another non-limiting aspect, the method comprises installing the fan (15*v*) under said refrigerator compressor (15).

According to another non-limiting aspect, the method comprises installing in a mobile way the refrigerator compressor (15), optionally on the support (30), by means of shock-absorbing elements (33) of the water distillation device (1), said shock-absorbing elements (33) being optionally rubber buffers, wherein the shock-absorbing elements (33) are interposed between the support (30) and the refrigerator compressor (15), so that a reduction and/or absorption of vibrations generated by the refrigerator compressor (15) during its operation is determined in use and by means of the shock-absorbing elements (33).

According to another non-limiting aspect, the method comprises a step of electronic control, optionally automatic, of the active cooler, in particular the fan (15*v*), by means of the data processing unit (119).

According to another non-limiting aspect, the electronic control comprises an automatic control of at least one among an activation of the active cooler, a deactivation of the active cooler, an intensity of cooling action brought by the active cooler, according to one or more of the following parameters: a temperature of the refrigerator compressor (15), a temperature of the refrigerator condenser (15*c*), a temperature of the refrigerator evaporator (15*e*), a temperature differential between the temperature of the refrigerator condenser (15*c*) and the temperature of the refrigerator evaporator (15*e*), a temperature of the water (201) to distill within said distillation chamber (2*d*), a pressure present within said cavity (2*c*, 2*d*).

According to another non-limiting aspect, the method comprises arranging the fan (15*v*) in a predefined spatial orientation such that the air flow (F) generated thereby is pushed into said channel (31) along a direction at least partially oriented along a vertical axis and, optionally, with a with a curved path investing a bottom portion of said refrigerator compressor (15).

According to the present disclosure it is further described a water distillation method (1), optionally by means of a water distillation device (1) according to one or more of the aspects described herein, the method comprising:

a step of introduction of water (201) to distill into a distillation chamber (2*d*) forming part of a cavity (2*c*, 2*d*) of a body of a water distillation device (1), a step of heating of the water (201) to distill by means of a heater (15*c*), so that by means of heating at least part of the water (201) to distill, a distillation steam is generated;

step of cooling of the distillation steam by means of a cooler, said step of cooling determining a condensation of the distillation steam for the production of distilled water (300), wherein the method of distillation is a vacuum distillation method, wherein the water (201) to distill is distilled at a pressure lower with respect to the atmospheric pressure, within said cavity (2*c*, 2*d*) a predetermined level of vacuum is maintained with respect to a predetermined threshold during a distribution of distilled water (300) wherein the distilled water (300) collected in the collection portion (109) is made flow out of said cavity (2*c*, 2*d*) optionally into an outlet duct (10) of a water distillation device (1) by means of an outlet (2*f*) of the condensation chamber (2*c*) configured to allow an outflow of distilled water (300) from the collection portion (109), and wherein the method comprises a step of activation of an extraction pump (400) connected to said outlet (2*f*), the activation remaining during the delivery of the distilled water (300) to extract the distilled water (300) from the collection portion (109) allowing to maintain the vacuum within the cavity (2*c*, 2*d*) and/or preventing the vacuum within the cavity (2*c*, 2*d*) from exceeding a predetermined threshold value, and/or preventing, during its functioning, the access of air within said cavity (2*c*, 2*d*).

According to another non-limiting aspect, the extraction pump (400) is an occlusive pump and/or a volumetric pump and/or is a double effect pump, and wherein the activation of the extraction pump (400) determines an insulation of the cavity (2*c*, 2*d*) from the external environment when said extraction pump (400) is stopped.

According to another non-limiting aspect, the step of activation of said extraction pump (400) is a step of activation by electrical and/or electronic control and/or magnetic actuation.

According to another non-limiting aspect, the extraction pump (400) comprises:

a body (403) that defines a first inlet (401) for the distilled water (300) to extract from the collection portion (109) and a first outlet (404) from which outflows the distilled water (300), a piston (402) configured to push the water from the first inlet (401) to the first outlet (404) defined on the body (403) of the extraction pump (400), wherein the body (403) defines a cylinder for the piston (402).

According to another non-limiting aspect, the method comprises an axial movement of the piston (402) within said body (403) between a first end position and a second end position.

According to another non-limiting aspect, the extraction pump (400) comprises a first compression chamber (411) for distilled water (300), optionally positioned in front of said piston (402), said compression chamber (411) being defined between said piston (402) and said body (403).

According to another non-limiting aspect, the method comprises a step of extraction of the distilled water (300) from the first compression chamber (411) to the outlet (404) by means of a first unidirectional valve (405) of the extraction pump (400).

According to another non-limiting aspect, the body (403) defines a second inlet (401') for the distilled water (300) to extract from the collection portion (109) and a second outlet (404') from which outflows the distilled water (300), and the method comprises a step of pushing of the water, through the piston (402), from the second inlet (401') to the second outlet (404') defined on the body (403) of the extraction pump (400).

According to another non-limiting aspect, the extraction pump (400) comprises a second compression chamber (411') for the distilled water (300), optionally positioned in front of said piston (402), said second compression chamber (411') being defined between said piston (402) and said body (403).

According to another non-limiting aspect, said second compression chamber (411') is opposed to said first compression chamber (411).

According to another non-limiting aspect, the method comprises insulating the second inlet (401') of the second compression chamber (411) when the piston (402) is in said first end-stroke position, or travels for a first portion of its stroke comprising the first end-stroke position, and comprises placing the second inlet (401') in direct communication with the second compression chamber (411') when the piston (402) is in said second end-stroke position, or travels for a second portion of its stroke comprising the second end-stroke position.

According to another non-limiting aspect, the method comprises controlling a maintenance of the vacuum within said cavity (2*c*, 2*d*) between a first and a second threshold value (Thv1, Thv2) through the data processing unit (119), and comprises carrying out a controlled opening of the inlet valve (8) in case the vacuum within the cavity (2*c*, 2*d*), in particular within the distillation chamber and condensation chamber, is greater than a first threshold value (Thv1), in such a way that the vacuum value again falls between the first and the second threshold value (Thv1, Thv2).

According to another non-limiting aspect, the method comprises a step of control of at least an activation or deactivation of the extraction pump (400), in particular to cause a maintenance of the vacuum within said cavity (2*c*, 2*d*) between a first and a second threshold value (Thv1, Thv2).

According to another non-limiting aspect, said step of control is carried out by the data processing unit (119).

According to another non-limiting aspect, the method comprises a step of commutation of the opening or the closing of the inlet valve (8) in relation at least to the activation or deactivation, and/or in relation to the activation speed, of the extraction pump (400) such as to maintain the vacuum level within the cavity (2*c*, 2*d*) comprised between the first threshold value (Thv1) and the second threshold value (Thv2).

According to another non-limiting aspect, the activation of the extraction pump (400) such that, during the sliding between the first end stroke position and the second end stroke position, the piston (402) causes at first a partial occlusion of the first inlet (401) and subsequently a total occlusion of the first inlet (401) and, contemporarily, the piston (402) causes at first a partial opening of the second inlet (401') and subsequently a total opening of the second inlet (401') such as the first compression chamber (411) contains, in use, a determined volume of distilled water (300) being insulated from the inlet (401), whereas the second compression chamber (411') opens from its insulating condition with respect to the second inlet (401') resulting again fillable with distilled water (300) to extract from said collection portion (109).

According to another non-limiting aspect, the method comprises an extraction of the distilled water (300) from the second compression chamber (411') to the second outlet (404') by means of a second unidirectional valve (405') of the extraction pump (400), said second unidirectional valve (405) being positioned in substantial correspondence of the second compression chamber (411').

According to another non-limiting aspect, the method comprises a hindrance of the introduction of water or air from the respective first outlet (404) to the respective first compression chamber (411) by means of the first unidirectional valve (405).

According to another non-limiting aspect, the method comprises a hindrance of the introduction of water or air from the respective second outlet (404') to the respective second compression chamber (411') by means of the second unidirectional valve (405').

According to the present disclosure it is further described a water distillation method (1), optionally by means of a water distillation device (1) according to one or more of the aspects described herein, the method comprising:

- a step of introduction of water (201) to distill into a distillation chamber (**2*d*) forming part of a cavity (2*c*, 2*d*) of a body of a water distillation device (1**),
- a step of heating of the water (201) to distill by means of a heater (**15*c*), so that by means of heating at least part of the water (201**) to distill, a distillation steam is generated;
- a step of cooling of the distillation steam by means of a cooler, said step of cooling determining a condensation of the distillation steam for the production of distilled water (300), the method comprising the flowing of the distillation steam into a head portion (3) of the body of the water distillation apparatus (1) from a main portion (**2*f*, 2*r*) of the body of the water distillation apparatus (1), where the distillation chamber is realized (2*d*), the method comprising making the distillation steam flow within a junction portion (2*k*) of the body angularly joining the head portion (3) with said main portion (2*f*, 2*r*), the method comprising a step of collection of the distilled water (300) in a collection portion (109) realized in a third way (2*t*''') of a three ways element (2*t*) of the head portion (3), said three ways element (2*t*) in turn comprising a first way (2*t*'), a second way (2*t*'') and a third way (2*t*'''), wherein said first way (2*t*') faces on said junction portion (2*k*), and wherein said third way (2*t*''') houses said cooler and substantially defines the condensation chamber (2*c*) and a collection portion (109) for the distilled water (300**).

According to another non-limiting aspect, the method comprises positioning the three ways element (**2*t*) so that said second way (2*t*'') and third way (2*t*'''**) are aligned along a common direction.

According to another non-limiting aspect, the collection of the distilled water (300) in the collection portion (109) and/or in the third way (**2*t*''') occurs at a height lower than the height at which at least one of the second way (2*t*'') and/or the first way (2*t*'**) lies.

According to another non-limiting aspect, the method comprises a step of guiding or deviating the flow of distillation steam through the junction portion (**2*k*), wherein the step of guiding or deviating the flow comprises a deviation of said flow from a substantially axial direction (X) with the distillation chamber (2*d*) to a position, and along a direction, axially misaligned from said distillation chamber (2*d***).

According to another non-limiting aspect, the deviation takes place on an angle substantially higher than 45°, in particular higher than 60°, more in particular substantially equal to 90°.

According to another non-limiting aspect, a condensation of the distillation steam takes place in the head portion (3).

According to another non-limiting aspect, the method comprises a step of operating connection of the head portion (3), in particular the second way (**2*t*''), to said vacuum pump (13), optionally by means of an air extraction duct (14**).

According to another non-limiting aspect, the method comprises a step of realization of the junction portion (**2*k*) integrally on the main portion (2*f*, 2*r*) or a step of realization of the junction portion (2*k*) integrally on the three ways element (2*t*), or the method comprises a step of realization as a unique piece and/or integral of the three ways element (2*t*), of the main portion (2*f*, 2*r*) and of the junction portion (2*k***).

According to another non-limiting aspect, the cooler is substantially positioned within said head portion (3), in particular within said third way (**2*t*''') and/or within the, or in substantial correspondence of, collection portion (109) and the method comprises transferring a cooling to the distilled water (300**) and/or the distillation steam via said cooler.

According to another non-limiting aspect, the three ways element (**2*t***) comprises at least a lateral wall and the cooler is substantially contained within said lateral wall.

According to another non-limiting aspect, the method comprises realizing at least part of the body and/or of said lateral wall (2) in a metallic material.

According to another non-limiting aspect, the method comprises realizing at least part of the body and/or of said lateral wall (2) in thermally insulating material, optionally glass, in particular borosilicate glass, and/or in plastic material.

According to another non-limiting aspect, the method comprises realizing the body and/or said lateral wall (2) integrally in metallic material.

According to another non-limiting aspect, the method comprises realizing the body and/or said lateral wall (2) integrally in thermally insulating material, optionally glass, in particular borosilicate glass, and/or in plastic material.

According to another non-limiting aspect, the method comprises a step of realization and/or production of the body through at least a first upper portion integrating said head portion (3) and a second lower portion integrating said base portion (4).

According to another non-limiting aspect, the method comprises realizing on the body an intermediate portion between the first upper portion and the second lower portion.

According to another non-limiting aspect, the method comprises realizing integrally and/or of piece the intermediate or separating element (100) on the first upper portion or on the second lower portion or on the intermediate portion, and/or on the lateral wall (2).

According to another non-limiting aspect, the method comprises realizing the portion of junction (103) integrally and/or of piece on the first upper portion or on the second lower portion or on the intermediate portion, and/or on the lateral wall (2).

According to another non-limiting aspect, the transit of at least part of the distillation steam for at least a through hole (105) determines the passage of the distillation steam from the distillation chamber (2*d*) to the condensation chamber (2*c*) at least partially along an axis substantially parallel to the main axis (X).

According to another non-limiting aspect, the at least a through hole (105) directly opens on the cavity (106).

According to another non-limiting aspect, the cavity (106) has a cross-section of variable area, in particular tapering moving progressively along the main axis (X) between the lower portion of the intermediate or separating element (100) towards the upper portion of the intermediate or separating element (100).

According to another non-limiting aspect, the cavity (106) has a cross-section of substantially circular shape.

According to another non-limiting aspect, the method comprises a step of arranging an intermediate septum (110) in the cavity (106) of the intermediate or separating element (100), the transit of the distillation steam for the intermediate septum comprises the passage of the distillation steam through said intermediate septum (110) delineating a curved path (200), optionally at least partially misaligned with respect to the main axis (X), between the distillation chamber (2*d*) and the condensation chamber (2*c*), and/or preventing a substantially axial path of the distillation steam (201) between the distillation chamber (2*d*) and the condensation chamber (2*c*).

According to another non-limiting aspect, the passage of the distillation steam through said intermediate septum (110) comprises the passage of the distillation steam through and/or in substantial correspondence of at least a division plane (110*s*), preferably a plurality of division planes (110*s*); said at least a division plane (110*s*), optionally said plurality of division planes (110*s*), determining the curved path (200) assumed by the distillation steam between the distillation chamber (2*d*) and the condensation chamber (2*c*) and/or preventing a substantially axial path of the distillation steam between the distillation chamber (2*d*) and the condensation chamber (2*c*).

According to another non-limiting aspect, the method comprises arranging the at least a division plane (110*s*) along a plane substantially inclined with respect to the main axis (X), optionally substantially orthogonal to the main axis (X).

According to another non-limiting aspect, the method comprises arranging the division planes of the plurality of division planes (110*s*) on planes parallel to each other.

According to another non-limiting aspect, the method comprises arranging the division planes of the plurality of division planes (110*s*) on planes substantially inclined with respect to the main axis (X), optionally substantially orthogonal to the main axis (X).

According to another non-limiting aspect, the method comprises arranging a perimeter portion of the at least a division plane (110*s*) in substantial contact with a lateral wall of the intermediate or separating element (100) delimiting said cavity (106).

According to another non-limiting aspect, the method comprises arranging a perimeter portion of each division plane of the plurality of division planes (110*s*) in substantial contact with a lateral wall of the intermediate or separating element (100) delimiting said cavity (106).

According to another non-limiting aspect, the passage of the distillation steam through and/or in substantial correspondence of at least a division plane (110*s*) comprises the passage of the distillation steam through an opening suitable for allowing the passage at least of the distillation steam (201), said opening being detected between the division plane (110*s*) and the lateral wall of the intermediate or separating element (100) detecting said cavity (106) or forming part of the division plane (110*s*).

According to another non-limiting aspect, the opening is misaligned with respect to the main axis (X).

According to another non-limiting aspect, the passage of the distillation steam in the intermediate septum (110) comprises the passage of said distillation steam between at least a first division plane (110*s*) and a second division plane (110*s*) superimposed upon each other, and comprises:

- the passage of the distillation steam through an opening suitable for allowing the passage at least of the distillation steam, said first opening being detected between the first division plane (110*s*) and the lateral wall of the intermediate or separating element (100) detecting said cavity (106) or being part of the first division plane (110*s*),
- the passage of the distillation steam through a second opening suitable for allowing the passage at least of the distillation steam, said second opening being detected between the second division plane (110*s*) and the lateral wall of the intermediate or separating element (100) detecting said cavity (106) or being part of the second division plane (110*s*),
- wherein said first opening and said second opening are misaligned the one with respect to the other.

FIGURES

The object of the present disclosure will now be described in some preferred and non-limiting embodiments, with particular reference to certain figures, a brief description of which is given below.

Figure 4A:
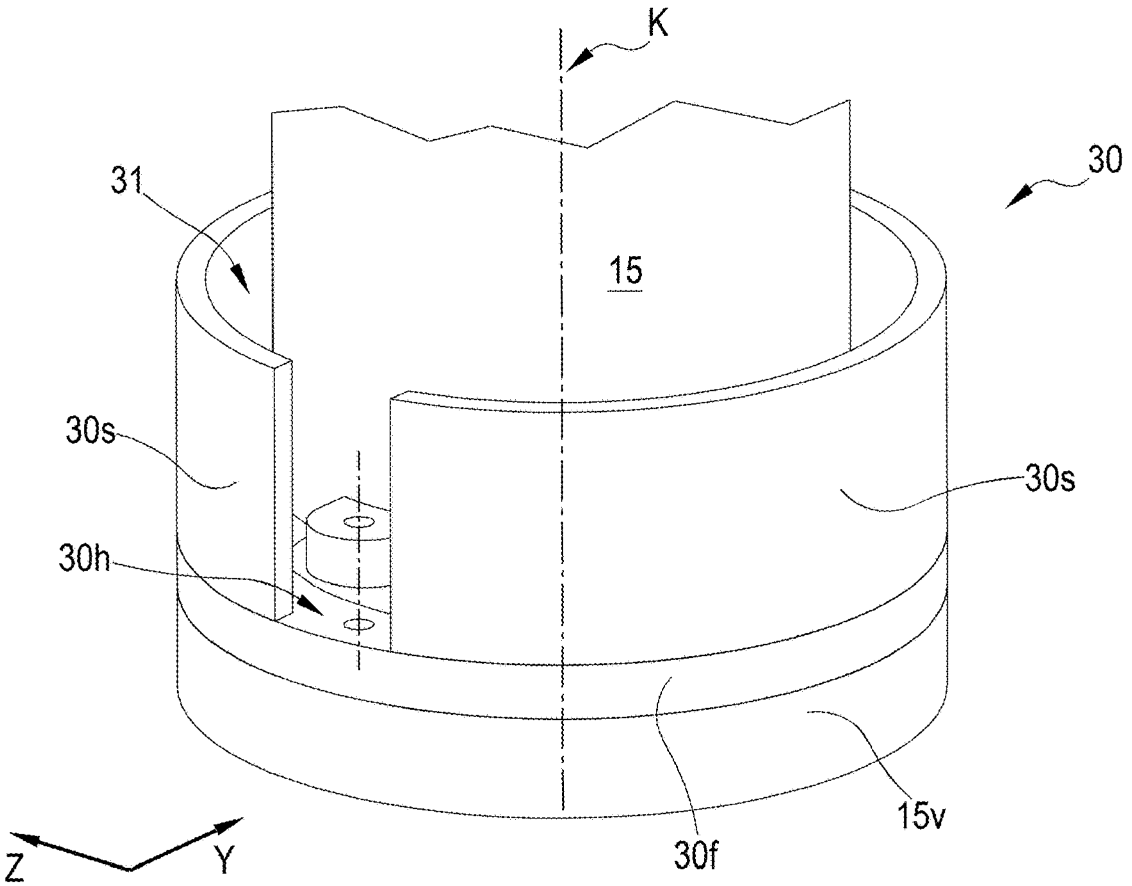
FIG. 4 shows a lateral view, in partial section, of a support for a refrigerator compressor of the water distillation device 1, wherein there is a fan destined to cause a cooling of part of the refrigerator circuit, in particular of an intermediate duct interposed between a refrigerator evaporator and a refrigerator condenser, and—simultaneously—a cooling of the refrigerator compressor.

FIG. 4*a* shows a perspective view of a specific embodiment of the support for the compressor.

FIG. 5 shows a sectional view along the B-B line of FIG. 4.

Figure 5A:
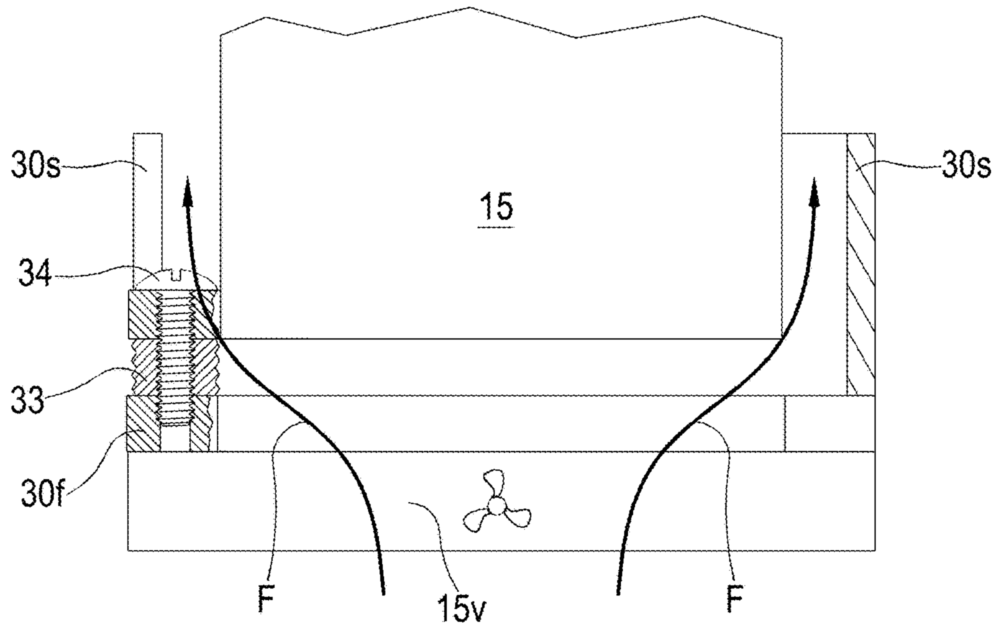

FIG. 5*a* shows a sectional view of the specific embodiment of the support for the compressor shown in FIG. 4*a*.

FIG. 6 shows a sectional view of a pre-heater for the water to distill; this sectional view is taken along a substantially vertical plane.

FIG. 7 shows a cross-sectional view of the pre-heater for the water to distill of FIG. 6; the sectional view of FIG. 7 is taken along the A-A line of FIG. 7.

Figure 8:
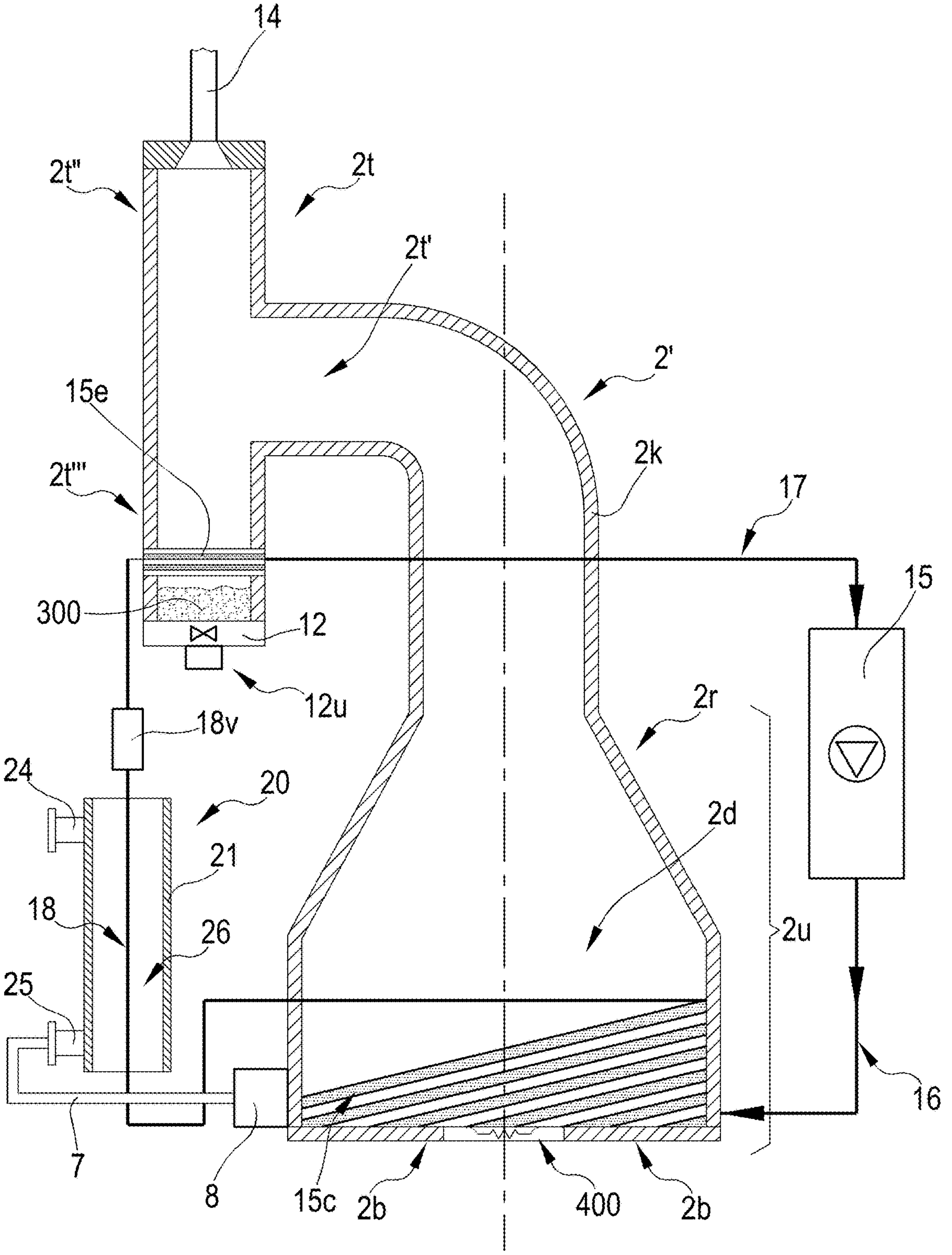

FIG. 8 shows an alternative embodiment of a body of the water distillation device according to the present disclosure.

Figure 9:
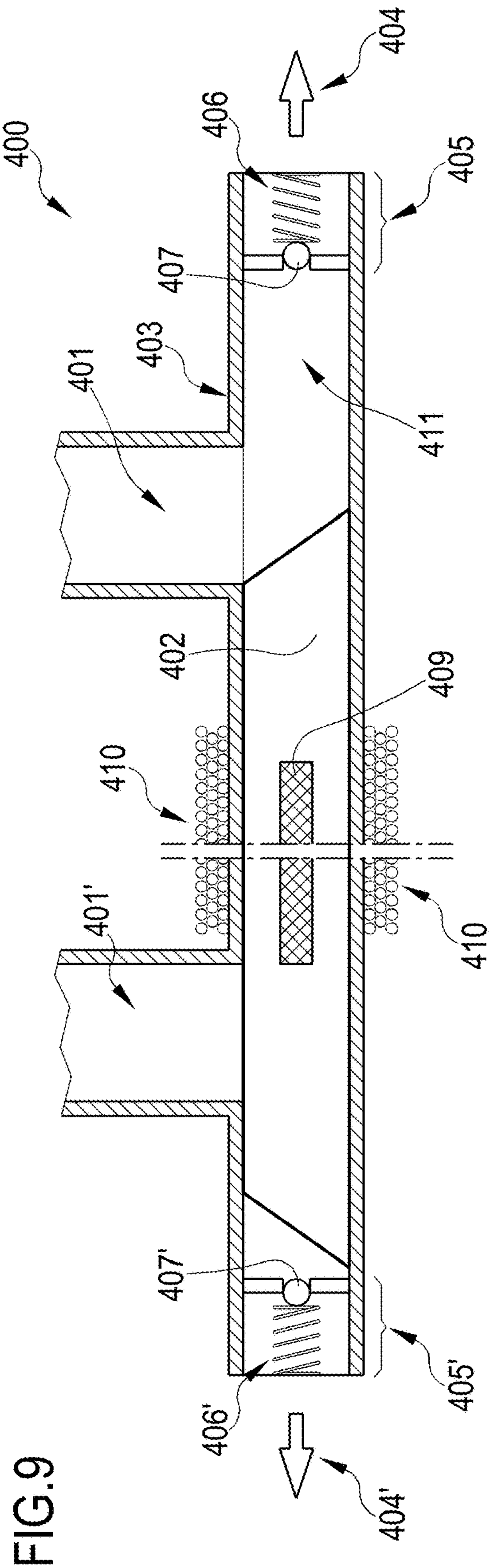

FIG. 9 shows a sectional view of a particular embodiment of an extraction pump configured to allow the extraction of the distilled water from a collection portion of the condensation chamber.

Figure 10:
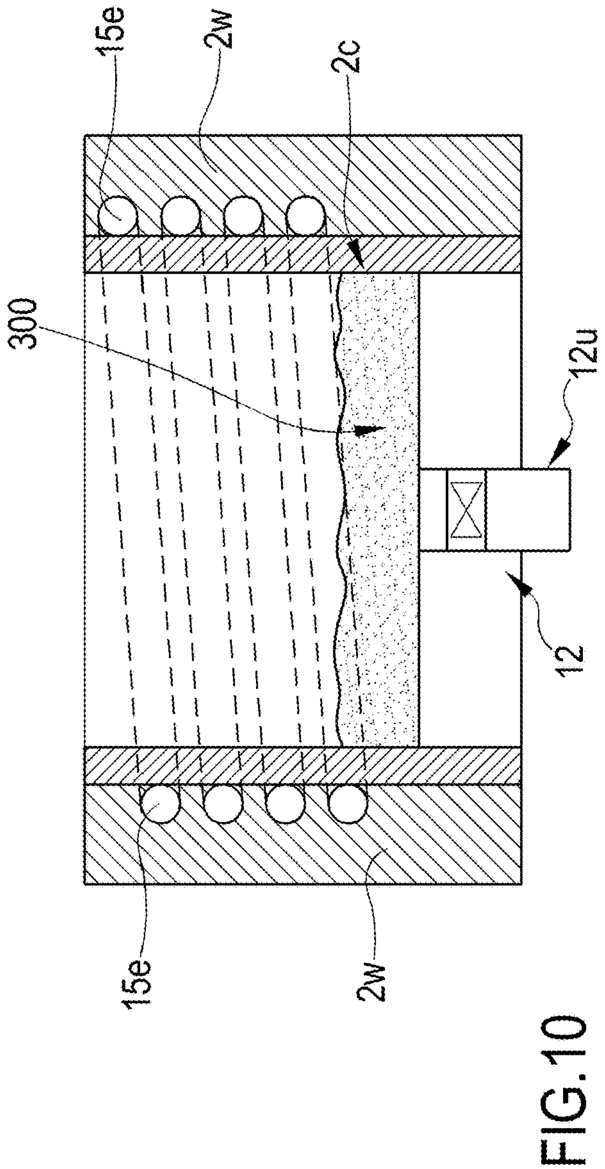

FIG. 10 shows a sectional view of a particular embodiment of a cooler, in particular a refrigerator evaporator, which is installed outside the condensation chamber but which is anyway configured to transfer a cooling to the distillation steam substantially present herein.

FIG. 11 shows a perspective view of a particular and further embodiment of the body of the water distillation device.

FIG. 12 shows a sectional view of the embodiment of the body of FIG. 11.

DETAILED DESCRIPTION

With reference number 1 is indicated a water distillation device 1 as a whole. In particular, in an embodiment, the water distillation device 1 is a vacuum distillation device, configured to carry out the distillation of water at a pressure lower with respect to the atmospheric pressure. The Applicant observes that certain features of the water distillation device 1 described herein can also be applied to water distillation devices operating at atmospheric pressure. For this reason, the specific use configuration of vacuum distillation should not be intended in a limiting manner.

In order to carry out the distillation of water, the water distillation device 1 comprises a body having a lateral wall 2 which defines at least a cavity 2*c*, 2*d* suitable for allowing the distillation of an amount of water 201 to distill.

In particular, the body is integral and the lateral wall 2 defines a first and a second portion of the body that in use constitute a distillation chamber 2*d* and a condensation chamber 2*c*.

Figure 1:
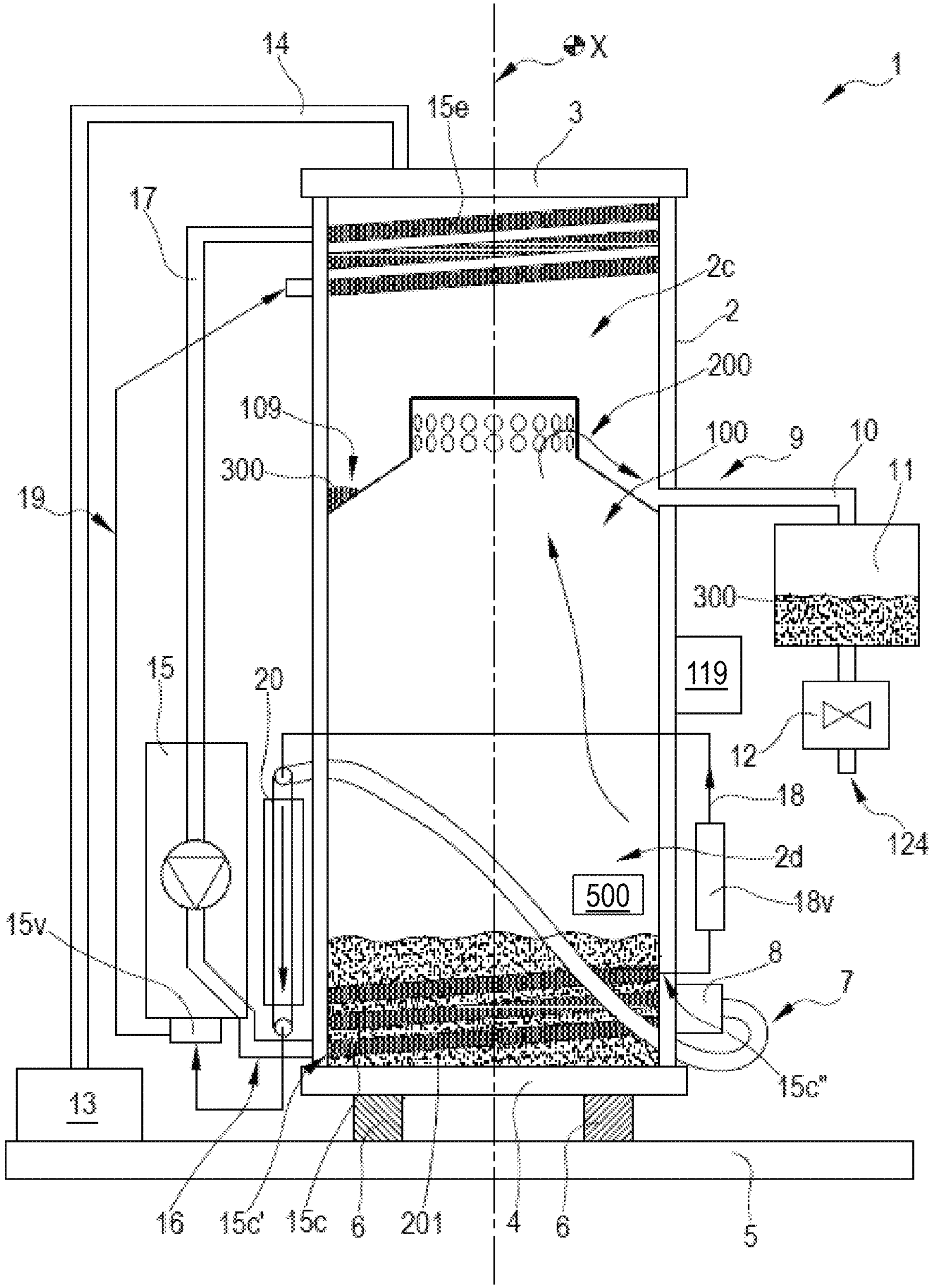
FIG. 1 shows a schematic view of a first embodiment of a water distillation device, equipped with a cavity with a substantially axial development and an intermediate or separating element positioned in a predetermined fixed position within said cavity to divide it at least between a water distillation chamber and a condensation chamber of the distillation steam.

As it is possible to observe in the embodiment shown in FIG. 1, preferably the body of the water distillation device 1 assumes a substantially tubular shape, which preferably, but not limited thereto, has a circular cross-section. The body of the water distillation device 1 develops substantially along a main axis X. Therefore, if such body is tubular in shape, the lateral wall 2 is unique and develops around the axis X, defining a curve without angular points and uninterruptedly. Therefore, in an embodiment, the cavity 2*c*, 2*d* also develops along the main axis X. The distillation chamber lies at a first and lower height and the condensation chamber 2*c* is at a higher height with respect to the height at which the distillation chamber 2*d* lies.

In the embodiment of FIG. 1 the body is realized in a single piece and thus the lateral wall 2 extends uninterruptedly, in particular along the main axis X. However, this should not be intended in a limiting manner, since the body can be realized in at least two pieces removably connectable to each other: these at least two pieces can be configured in a first separate configuration and in a second joined configuration, which is a use or operating configuration, in which the two above-mentioned pieces together realize said lateral wall 2 suitable for defining the cavity comprising the distillation chamber 2*d* and the condensation chamber 2*c*.

The body is configured to extend along a substantially vertical direction. This means that in a preferred but not limiting embodiment, the main axis X is substantially aligned along a vertical direction.

In an embodiment, the body is delimited at the top by a head portion 3 and is delimited at the bottom by a bottom portion 4. Preferably, but not limited thereto, at least one between the head portion 3 and the bottom portion 4 comprises a closing element of the cavity 2*c*, 2*d* of a removable type. Specifically, the closing element allows to an operator, or at least a tool, to access the interior of the distillation chamber 2*d* and of the condensation chamber 2*c* so that they can be in use clean. This advantageously allows to clean the lateral wall 2 and the other elements which are present in the cavity 2*c*, 2*d* after a certain period of use. In a non-limiting embodiment, the closing element comprises a ring that can be clamped by means of a clamp, and this ring is arranged along a plane substantially orthogonal with respect to the main axis X.

At least a support 6 is fixed to a base 5 of the water distillation device 1, in order to keep the body, in particular at least the bottom portion 4, aligned along a predetermined direction in use substantially vertical and/or in order to keep said body and in particular the bottom portion 4 spaced with respect to the base 5. In a preferred but not limiting embodiment, the support 6 advantageously comprises at least a support column, preferably but not limited thereto realized in anodized aluminum.

The use of a body with substantial axial development allows to realize a very compact and aesthetically 'clean' structure, and—it has been observed—of particular efficiency, in particular since thermal convection substantially moves the fluids along a vertical path, so that both distillation and condensation of water occur efficiently.

The use of a body with substantial axial development advantageously allows also to realize a water distillation device of particular compactness, especially in the transversal direction. The use of a body with substantial axial development, particularly when—as in the case of the preferred embodiment described herein—this axial development is vertically oriented, favours the coupling of the body to further technical elements in an overall compact structure.

At least the bottom portion 4 is openable. Preferably, the head portion 3 is also openable. Thanks to this technical feature it is possible to carry out a cleaning of the cavity 2*c*, 2*d* defined by the lateral wall, in particular to carry out a cleaning of the portion of said cavity 2*c*, 2*d* defining the distillation chamber. In this way, it is possible to remove the solid residuals formed following the completion of distillation 201 of the water.

The Applicant observes that different types of materials can be used to realize the body, and in particular the lateral wall 2. However, preferably, the lateral wall shall be realized in a material with a low ionic release in the water, and this allows a high distillation purity of the distilled water 300. In a preferred but not limiting embodiment, such material is a metallic material and preferably is stainless steel. The use of a metallic material for the realization of the body should not be intended in a limiting manner, as the body, and in particular the lateral wall 2, could be equivalently realized in at least one between a plastic material and a glass material. In a specific and non-limiting embodiment, such a glass material comprises borosilicate glass. The plastic and/or glass material advantageously allow to obtain a reduction of the transmission of heat and cold to the external environment and thus help to optimize the thermal efficiency of the water distillation device 1.

In a particular embodiment, the inner face of the lateral wall 2 is gold-plated. This allows to significantly reduce the mineral contamination and/or ion release in the water 201 to distill. Gold is also compatible with the use of the water distillation device 1 to realize beverages produced from the distilled water 300 via the device itself.

Furthermore, should the water distillation device 1 described herein be of the type configured to carry out a vacuum distillation, that lateral wall 2, and in particular also the head portion 3 and the bottom portion 4 shall be configured to support a predetermined vacuum value. The use of metal is in this case advantageous, since the use of an adequate thickness for the lateral wall 2 and for the head portion 3 and for the bottom portion 4 makes it possible to realize a robust body, and little subject to deformation.

The water distillation device 1 further comprises a heater 15*c*, which is configured to heat the amount of water 201 to distill contained within the distillation chamber 2*d*.

In order to allow the cooling of the condensation steam, the water distillation device 1 comprises a cooler 15*e* configured to cause a condensation of the distillation steam and to determine a collection of the condensed distillation steam in substantial correspondence of the collection portion 109.

As it will be better described in the following portion of the description, the cooler 15*e*, preferably—but not limited thereto—is substantially coil-shaped and is positioned in substantial correspondence of the condensation chamber 2*c*.

A particular embodiment of the water distillation device 1 described herein also comprises an auxiliary heater 500, which is configured to inject thermal energy in such a way that the water 201 to distill is heated faster and/or at a higher temperature. In an embodiment, this auxiliary heater 500 comprises an electrical resistance. This auxiliary heater 500 can be conveniently positioned in substantial correspondence of the distillation chamber, and in detail can be positioned at a height substantially equal to the height in correspondence of which the heater 15*c* lies.

Should the heater 15*c* assume a spiral or coil shape, the auxiliary heater 500 can be arranged within said spiral or coil, in particular by delineating an inner circumference of circumscription of a diameter lower than or equal to that of the spiral or coil, or assume a spiral and/or coil shape itself and have portions interposed, in particular substantially positioned, in correspondence with vertically present portions of space between one turn and the next turn of the spiral or coil, so as to be substantially vertically aligned therewith. In an embodiment, therefore, observing the assembly of the heater 15*c* and the auxiliary heater 500 from above, a substantial vertical alignment would be observed, and the space within the spiral or coil defined by the heater 15*c* would not be compromised or otherwise limited by the presence of the auxiliary heater 500.

A particular characteristic of an embodiment of the water distillation device 1 is to comprise an intermediate or separating element 100 positioned in an intermediate position of the cavity 2*c*, 2*d*. The intermediate or separating element has at least one portion of junction 103 in contact with the lateral wall 2 and is configured to divide the cavity 2*c*, 2*d* defined in the lateral wall 2 by realizing a distillation chamber and a condensation chamber.

Preferably the intermediate or separating element 100 is positioned in a predefined and/or fixed position with respect to the other lateral wall 2 and/or within said cavity 2*c*, 2*d*.

In particular, this portion of junction comprises, or is, a lateral seal wall 103, in contact with the lateral wall 2 of the body and is configured to divide the cavity 2*c*, 2*d* in the distillation chamber 2*d* and, at the top, in the condensation chamber 2*c*.

In particular, the intermediate or separating element 100 comprises at least a through hole 105, which is configured to allow the passage of at least a distillation steam from the distillation chamber to the condensation chamber.

Preferably, but in a non-limiting extent, the intermediate or separating element 100 comprises a plurality of through holes 105. This allows a greater uniformity of passage of the distillation steam from the distillation chamber 2*d* to the condensation chamber 2*c*, also since in this way the plurality of through holes 105 can have a smaller diameter with respect to the diameter assumed by the single through hole 105.

Therefore, the condensation chamber 2*c* and the distillation chamber 2*d* communicate through the through-hole 105, or where present, through the plurality of through holes 105.

In a preferred but not limiting embodiment, this through hole 105 or, where present, the plurality of through holes 105, has a substantially circular cross-section.

In an embodiment, the intermediate or separating element 100 further comprises at least a lateral wall of collection 102, in particular a lateral wall of collection, joint and/or bordering the seal wall 103.

The bottom portion of the intermediate or separating element 100 is clearly open, and therefore the intermediate or separating element 100 realizes a substantially domed cavity 106, which allows to collect as a kind of chimney the distillation steam of the water 201 to distill and convey it towards the plurality of through holes 105. When the distillation steam of the water 201 to distill has passed through the plurality of through holes 105, said steam substantially passes from the distillation chamber 2*d* to the condensation chamber 2*c*, and in this chamber tends to condense again towards a liquid phase. The arrow 200 indicates the path—at least partially aligned along the main axis X—of the distillation steam from the distillation chamber 2*d* to the condensation chamber 2*c*. As will be better expressed in the following portion of the description, albeit in a non-limiting manner, the path 200 taken by the distillation steam is preferably of a curved type.

A collection portion of distilled water 300, identified by the reference number 109, is comprised between the lateral wall 2 and the collection lateral wall. This means that the collection lateral wall 102 is configured to define, at least partially, a collection portion 109 of distilled water 300.

In particular, the present disclosure thus shows a water distillation method comprising a step of heating of the water 201 to distill, the boiling causes a flow of the distillation steam towards an intermediate or separating element 100 positioned in an intermediate position of the cavity 2*c*, 2*d* of the body of the water distillation device 1 so that a portion of junction 103 of the intermediate or separating element 100 is in contact with the lateral wall 2 and determines a division of said cavity 2*c*, 2*d* realizing the distillation chamber 2*d* and the condensation chamber 2*c*.

Figure 2:
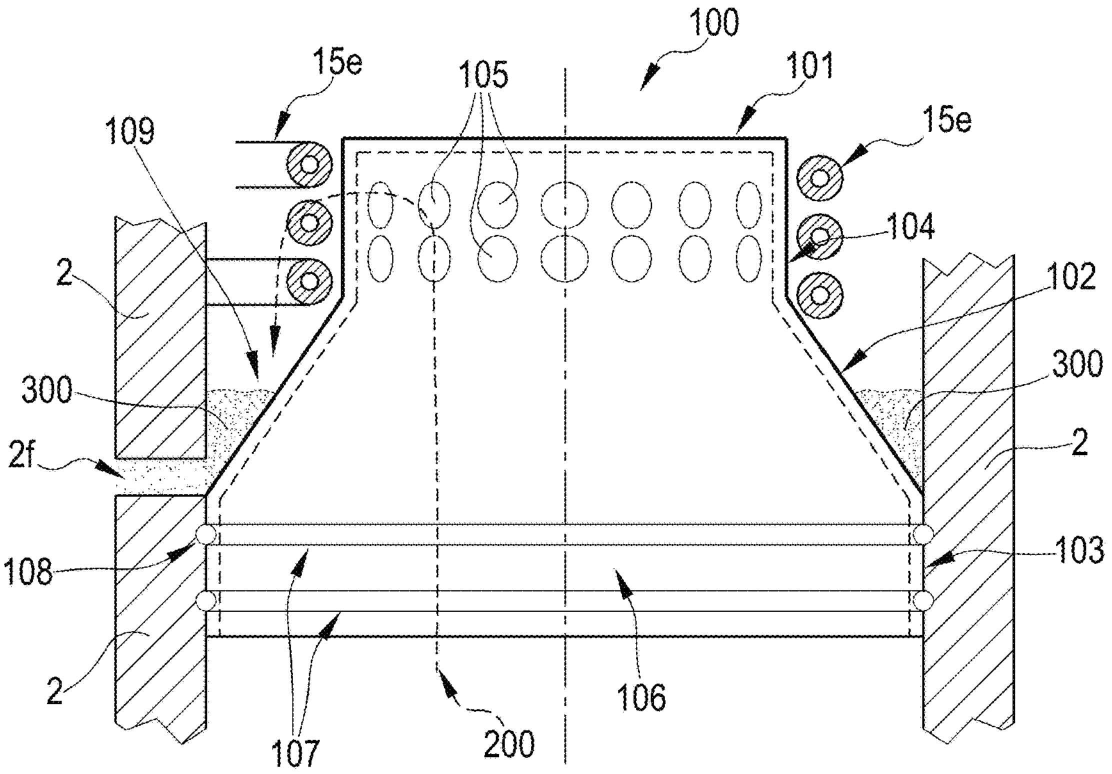
FIG. 2 shows a detail of a first embodiment of the intermediate or separating element.

A first preferred and non-limiting embodiment of the intermediate or separating element 100 is represented in FIG. 2. In this case, it is observed that the intermediate or separating element 100 is configured to be introduced axially along the main axis X within the cavity 2*c*, 2*d* defined by the lateral wall 2.

The seal wall 103 extends substantially parallel to the main axis X and if observed along a section orthogonal to the main axis X identifies a circumference in substantial perfect adherence with the inner face of the lateral wall 2. In order to increase the tightness of the intermediate or separating element 100 on the lateral wall, this intermediate or separating element can comprise at least a seal ring 108, positioned in substantial correspondence of the seal wall 103. The seal ring 108 is realized in a flexible material, for example rubber, and configured to withstand the distillation temperatures of water.

The embodiment shown in FIG. 2 shows the presence of a first and a second seal ring 108 positioned in substantial correspondence of the seal wall 103. On the seal wall 103 at least a recess 107 can be realized; said recess 107 has a substantially annular shape and is preferably aligned along a substantially orthogonal plane with respect to the main axis X. Within this recess 107 is housed, at least in part, said seal ring 108. The specific embodiment shown in FIG. 2 has two annular-shaped recesses 107 aligned on parallel planes.

In an embodiment, which is represented in detail in FIG. 1 and in FIG. 2, the lateral wall of collection 102 is substantially inclined with respect to the seal wall 103, and this means that this lateral wall of collection 102 is substantially inclined with respect to the main axis X. This inclination can be for example, but not limited thereto, comprised between 20° and 70°, more preferably between 30° and 60°. The inclination between the lateral wall of collection 102 and the seal wall 103 and the main axis X is non-orthogonal.

An ideal line of junction joins the lateral wall of collection 102 with the seal wall 103. This ideal line of junction is positioned in a lower portion of the lateral wall of collection 102 and in an upper portion of the seal wall 103. This means that the lateral wall of collection 102 is at a higher height with respect to the height at which the seal wall 103 lies.

The distillation carried out through the water distillation device 1 herein described comprises therefore a collection of the condensate of the distillation steam, said collection taking place via a lateral wall of collection 102 of the intermediate or separating element 100, which is joint and/or bordering the portion of junction 103, in a collection portion 109 comprised between the lateral wall 2 and the lateral wall of collection 102 and/or arranged in a radially central position of the intermediate or separating element 100.

The intermediate or separating element 100 comprises a head portion 101 and the plurality of through holes 105 is positioned in substantial correspondence of said head portion 101. The head portion 101 is positioned in a central position of the intermediate or separating element and defines a cross-section of smaller area with respect to the area of the cross-section of the portion of junction 103.

The head portion 101 lies at a higher height with respect to the height at which the portion of junction 103 lies.

As it can be observed for example in FIG. 2, the head portion is joined to the portion of junction 103, and in particular is joined uninterruptedly to the portion of junction 103.

The plurality of through holes 105 is realized in substantial correspondence of the head portion 101. Preferably, but not limited thereto, la plurality of through holes 105 is arranged along the lateral wall 104 of the head portion 101, and on that wall is evenly distributed. In particular the plurality of through holes 105 extends uninterruptedly over all 360° of the zenith plane on which the lateral wall 104 faces. In particular, in the embodiments shown in the attached figures, each hole of the plurality of through holes 105 has an axis substantially orthogonal to the main axis X. In this way, the intermediate or separating element 100 is configured to determine, via at least part of the plurality of through-holes 105, a vaporization and condensation path 200 substantially curved and at least partially misaligned with respect to said main axis X. This misalignment advantageously prevents the condensation steam from flowing along a substantially extremely direct and linear path 200 along substantially only the axis X, which would lead to its falling back to the distillation chamber **2*d***, reducing the distillation efficiency obtained herein.

This path comprises at least a partial falling of the distillation steam downwards, since the collection portion 109 of distilled water 300 lies at a lower height with respect to said head portion 101.

In the embodiment of FIG. 2, the head portion 101 comprises an upper wall substantially orthogonal with respect to the main axis X and, preferably of discoidal shape. The head portion 101 further comprises a lateral wall 104, which is conjoined with the upper wall in substantial correspondence of a portion of its upper end. The lateral wall 104 of the head portion 101 is preferably aligned to the main axis X, thus extending along a direction parallel to the direction along which the seal wall 103 extends. This particular inclination (parallel) with respect to the main axis X should not be intended in a limiting manner, as it is possible to realize a lateral wall with a different (non-zero) inclination with respect to the main axis X.

Each through hole of the plurality of through holes 105 has an axis that is substantially inclined with respect to the main axis X, and in particular, in the embodiments represented in the attached figures, the axis of each of said holes is substantially orthogonal with respect to the main axis X. This allows to optimize the distillation process and allows to avoid a substantially direct and/or axial path of vaporization and condensation of the distillation steam, which would lead to the risk of condensation that by gravity could also occur within the distillation chamber, in particular observing the substantially axial structure of the cavity **2*c*, 2*d***.

This means that in an embodiment the upper wall of the head portion 101 has no holes. Although not shown, the Applicant has realized another embodiment of the intermediate or separating element 100 wherein the upper wall of the head portion 101 has part of the plurality of through holes 105. Another embodiment of the intermediate or separating element 100 has through holes only in substantial correspondence of the upper wall of the head portion 101.

In the embodiment of FIG. 2 the collection portion 109 of the distilled water 300 is of substantially annular shape and has an acute-pointed bottom zone with a cross section smaller with respect to the cross section of the upper zone of the collection portion 109. In other words, observing the intermediate or separating element 100 along a section parallel to the main axis X it is observed a substantially triangular shape for the collection portion 109.

The Applicant observes that this particular configuration with the lateral wall of collection 102 inclined with respect to the main axis X advantageously allows to optimize the collection of the distilled water 300 in an increasingly smaller portion of the collection portion 109 and in substantial contact with the lateral wall 2. This allows to reduce the risk of stagnation of the distilled water 300 and allows a higher efficiency of collection for the distilled water itself.

Figure 3:
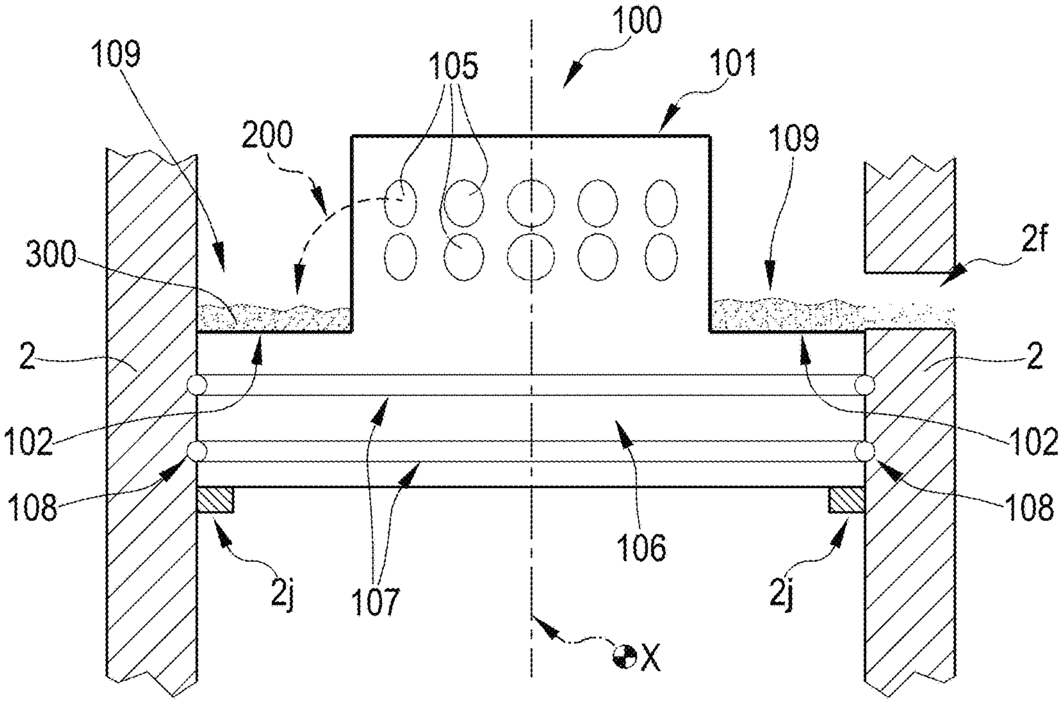
FIG. 3 shows a detail of a second embodiment of the intermediate or separating element.

An alternative embodiment of the intermediate or separating element 100 is shown in FIG. 3. Also in this case, it is observed that the intermediate or separating element 100 is configured to be introduced axially along the main axis X within the cavity **2*c*, 2*d* defined by the lateral wall 2**.

Also in the embodiment of FIG. 3, the intermediate or separating element 100 comprises a portion of junction with the lateral wall 2 and is configured to divide the cavity **2*c*, 2*d* realizing said distillation chamber 2*d* and the condensation chamber 2*c*. In particular, the portion of junction comprises, or is, a seal wall 103**.

The seal wall 103 extends substantially parallel to the main axis X and if observed along a section orthogonal to the main axis X identifies a circumference in substantial perfect adherence with the inner face of the lateral wall 2. In order to increase the tightness of the intermediate or separating element 100 on the lateral wall, this intermediate or separating element can comprise at least a seal ring 108, positioned in substantial correspondence of the seal wall 103. The embodiment shown in FIG. 3 shows the presence of a first and a second seal ring 108 positioned in substantial correspondence of the seal wall 103. On the seal wall 103 it can be realized at least one recess 107, of substantially annular shape and preferably aligned along a plane substantially orthogonal with respect to the main axis X. Within this recess 107 is housed, at least a part, said seal ring 108. The specific embodiment shown in FIG. 3 has two recesses 107 of annular type aligned on parallel planes.

The lateral wall of collection 102 is substantially inclined with respect to the seal wall 103, and this means that this lateral wall of collection 102 is substantially inclined with respect to the main axis X.

In particular, the lateral wall of collection 102 is orthogonal with respect to the seal wall 103 and with respect to the main axis X.

An ideal line of junction joins the lateral wall of collection 102 with the seal wall 103. This ideal line of junction is positioned in a lower portion of the lateral wall of collection 102 and in an upper portion of the seal wall 103. This means that the lateral wall of collection 102 is at a higher height with respect to the height at which the seal wall 103 lies.

The intermediate or separating element 100 comprises a head portion 101 and the at least a through hole 105, in particular the plurality of through holes 105, is positioned in substantial correspondence of the head portion 101. The collection portion 109 of distilled water 300 lies at a lower height with respect to the height at which said head portion 101 lies.

In the embodiment of FIG. 3, the head portion 101 comprises an upper wall substantially orthogonal with respect to the main axis X and, preferably having a discoidal shape. The head portion 101 further comprises a lateral wall 104, which is conjoined with the upper wall in substantial correspondence of a portion of its upper end. The lateral wall 104 of the head portion 101 is preferably aligned to the main axis X, thus extending along a direction parallel to the direction along which the seal wall 103 extends. This particular inclination (parallel) with respect to the main axis X shall not be intended in a limiting manner, as it is possible to realize a lateral wall with a different (non-zero) inclination with respect to the main axis X.

The plurality of through holes 105 is realized in substantial correspondence of the head portion 101. Preferably, but not limited thereto, the plurality of through holes 105 is arranged along the lateral wall 104 of the head portion 101. This means that in an embodiment the upper wall of the head portion 101 has no holes. Although not shown, the Applicant has realized another embodiment of the intermediate or separating element 100 wherein the upper wall of the head portion 101 has part of the plurality of through holes 105. Another embodiment of the intermediate or separating element 100 has through holes only in substantial correspondence of the upper wall of the head portion 101.

In the embodiment of FIG. 3 the collection portion 109 of the distilled water 300 is of substantially annular shape and has a flat bottom zone; this means that the bottom zone of the collection portion 109 develops along a plane substantially orthogonal to the main axis X.

The Applicant observes that in the embodiment of FIG. 3 is highlighted a striker ring **2*j* protruding from the inner face of the lateral wall. When the cross-section of the cavity 2*c*, 2*d* is circular, the striker ring 2*j*** detects a circumference with a smaller diameter with respect to the diameter of the circumference detected by the lateral wall.

The striker ring **2*j* is configured and specifically designed to allow the support of a lower portion of the intermediate or separating element 100; the latter in particular rests on the striker ring 2*j* in substantial correspondence of a lower edge of the seal wall 103. The striker ring 2*j*** can develop along the entire circumference of the lateral wall uninterruptedly or, alternatively, be defined on at least two or more sectors at intervals with recesses in correspondence of which the cross-section detects the same diameter assumed by the lateral wall.

In a preferred but not limiting embodiment, the striker ring **2*j*** is integral and/or is realized in piece with the lateral wall.

The Applicant observes that the two embodiments of the intermediate or separating element 100 shown in FIG. 2 and FIG. 3 should not be considered as limiting, as it is also possible to realize the intermediate or separating element at least in another embodiment briefly described below.

In contrast to the embodiment of FIG. 2, wherein the lateral wall of collection 102 is inclined outwards defining a collection portion 109 substantially of annular type, the further embodiment of the intermediate or separating element described here comprises a collection portion 109 which is positioned in a radially central zone of the intermediate or separating element 100. In this embodiment, in particular, the lateral wall of collection 102 is inclined inwards so as to convey the condensate of the distillation steam ideally in correspondence of a central zone of the collection portion, in particular in a central zone of the collection portion which is axially aligned to the main axis X.

The lateral wall of collection 102 defines, when observed in section along a plane that, as in the case of FIG. 2 and FIG. 3, comprises the main axis X, a substantially V-shaped, or funnel-shaped, centered along the longitudinal axis X. In order to allow evacuation of the distilled water 300 by the collection portion 109, an auxiliary duct connects the through hole **2*f* present on the lateral wall of the body, and opens in the collection portion 109**, in particular in the bottom portion (vertex of the "V") of the collection portion.

The intermediate or separating element 100 is removable by the cavity **2*c*, 2*d*. Thanks to this aspect, particularly when at least the head portion or bottom portion of the body can be opened as previously described, it favours the possibility of easily cleaning the inside of the cavity 2*c*, 2*d***.

A particular embodiment of the intermediate or separating element 100 comprises a filtering membrane. This membrane is configured to allow the passage of water steam and is also configured to retain solid residuals typical of the water distillation process and prevent the passage of significant quantities of water in liquid form, in particular in droplets or bubbles.

This filtering membrane acts substantially as a molecular sieve, being provided with holes or passages or pores that are substantially always open, capable to determine and allow a passage of molecules smaller than a predetermined size and, likewise, to determine an impediment to the passage of molecules of a size greater than or equal to said predetermined size. In particular, the above-mentioned drops or bubbles are significantly larger than the predetermined size.

Preferably, this filtering membrane is positioned within the cavity 106 of the intermediate or separating element 100. In other words, it can be considered that the filtering membrane is still positioned within the distillation chamber.

The Applicant observes, in particular, that the filtering membrane can optionally be installed in the specific embodiment of the intermediate or separating element 100 described in the previous portion of the description and also shown in the FIGS. 2 and 3.

For this reason, in a particular embodiment, the water distillation method described here comprises a step of transit of the distillation steam deriving from the heating of the water 201 to distill through the membrane above described. Due to the specific arrangement of the filtering membrane within the cavity 106 of the intermediate or separating element 100, this transit through the above-mentioned filtering membrane occurs in substantial temporal correspondence of the transit through the intermediate or separating element 100.

Optionally, this filtering membrane is removably connected to the body of the intermediate or separating element, and can be for example installed on a support ring removably connected to the body of the intermediate or separating element 100. This allows a rapid replacement thereof, in case of need.

Various types of material can be used to realize the filtering membrane. Preferably, however, this filtering membrane is realized in a non-hygroscopic material. In a non-limiting embodiment, this filtering membrane is a polymer membrane, in particular perfluorocarbon (PFC), more in particular polytetrafluoroethylene (PTFE), even more in particular expanded polytetrafluoroethylene (ePTFE) or expanded polyethylene (ePE) such as Gore-Tex®.

In use, the distillation of the water 201 to distill in the distillation chamber causes a production of bubbles, which can be pushed upwards by coming into substantial contact with the intermediate or separating element 100. Part of the water bubbles and/or distillation solid residuals could pass through the through holes 105, unduly coming into substantial correspondence of the collection portion 109. Therefore, the filtration process concomitant to the distillation of the water 201 to distill, brought about by the filtering membrane, allows to optimize the distillation process, leading to a lower contamination of the distilled water 300, which is reflected in a lower electrical conductivity of the latter.

In use, then, a distillation process of the water 201 to distill comprises the boiling of the water 201 to distill contained within the distillation chamber 2*d* by the effect of the heat transmitted herein by the heater 15*c*, and also comprises the passage of the distillation steam from the distillation chamber 2*d* to the condensation chamber 2*c* through the passage by the intermediate or separating element 100 and, where present, through the filtering membrane.

Still optionally, the cavity 106 of the intermediate or separating element 100 comprises a labyrinth of distribution of the distillation steam that communicates with the through holes 105. In a non-limiting embodiment, this labyrinth is fixed with respect to the intermediate or separating element 100. In another non-limiting embodiment, this labyrinth is removably connectable to the body of the intermediate or separating element.

Referring back to the description of the lateral wall, it is observed that this lateral wall 2 comprises a through hole identified by the numerical reference 2*f*. This through hole 2*f* is configured to allow an outflow of the distilled water 300 by the collection portion 109 and therefore constitutes an outlet for the distilled water 300.

The through hole 2*f*, also referred to below as the outlet hole, is positioned at a particular height substantially corresponding with the bottom area of the collection portion 109 and/or with the top edge of the portion of junction 103, in particular of the seal wall. Thanks to this aspect it is advantageously possible to realize an optimal extraction of the distilled water 300 from the collection portion 109, without waste.

In an embodiment, the water distillation device 1 object of the present disclosure comprises an inlet duct 7 for the water to distill, and an inlet 9 of the outlet duct 10 for the distilled water. The through hole 2*f*, which is an outlet hole, is connected directly with inlet 9 of the outlet duct 10.

The inlet duct 7 for the water to distill can be connected with a supply pump of the water 201 to distill. The present disclosure therefore shows a step of introduction of water into the distillation chamber 2*d* which is of the active type, and is carried out through said feed pump. Alternatively, it is provided a step of alimentation of the water 201 to distill of the passive type, wherein the water 201 to distill can be supplied to the distillation chamber by gravity. When the water distillation device 1 is configured to carry out a vacuum distillation, this water distillation device 1 will advantageously comprise an inlet valve 8 configured to adjust the flow of water inside the cavity 2*c*, 2*d*. The use of the inlet valve makes it possible to maintain the vacuum within the cavity 2*c*, 2*d*, notably at least during water distillation.

The inlet valve can be a manually controlled valve or an electronically controlled valve (solenoid valve). The inlet valve 8 comprises at least an open configuration and a closed configuration.

The inlet duct 7 is connected to an inlet hole, which, in a preferred but not limiting embodiment, is realized on the bottom portion of the lateral wall 2, preferably but not limited thereto in correspondence of a lower end portion of the distillation chamber 2*d*.

When the water distillation device 1 is configured to carry out a vacuum distillation, this water distillation device 1 will comprise a vacuum pump 13, connected to an air extraction duct 14 that has access to the cavity 2*c*, 2*d*. In a preferred but non-limiting embodiment, the air extraction duct 14 extracts air from a substantially higher portion of the cavity 2*c*, 2*d*, and in particular accesses the cavity 2*c*, 2*d* at a higher height with respect to the height at which substantially lies the intermediate or separating element 100, thus opening onto the condensation chamber 2*c*. In an embodiment, preferably, but not limited thereto, the air extraction duct 14 is connected with the lateral wall 2 in substantial correspondence of the head portion 3 of the body. The vacuum pump 13 is a known type of pump, and for this reason is not described herein.

However, the Applicant notes that preferably, but not limited thereto, this vacuum pump is an electro-actuated pump and is configured to be controlled by means of a PWM control. For example, the vacuum pump 13 can be a diaphragm pump.

In an embodiment, the water distillation device 1 described herein uses a refrigerator circuit to carry out the heating and cooling of water intended to cause the evaporation by boiling of the water 201 to distill and the condensation of the distillation steam, respectively. In particular, in an embodiment which is that represented in the attached figures, the water distillation device 1 comprises a refrigerator compressor 15.

This refrigerator compressor 15 has the purpose of compressing a refrigerant gas which, when it passes through the heater 15*c* in the form of a refrigerator condenser, by the effect of compression, at least partially transforms into a fluid and heats up. Therefore, by thermal transmission, it heats the water 201 to distill, in use, contained in the distillation chamber 2*d*. In particular, the heating of the water 201 to distill induced by the heater 15, in particular in the form of the refrigerator condenser, is sufficient to cause the boiling thereof.

Although various forms of refrigerator compressor can be used, in a preferred but not limiting embodiment this refrigerator compressor can be a linear type compressor or a reciprocating type compressor.

The Applicant observes that in principle, the distillation of the water 201 to distill by means of the refrigerator circuit described herein can be carried out at atmospheric pressure, although the use of a lower pressure with respect to the atmospheric pressure can be convenient from an energy point of view, observing that it can reduce the need to compress the refrigerant gas to significantly high pressures such as to determine the traditional achievement of a temperature close to 100° C. to allow the boiling of water at atmospheric pressure.

Therefore, a specific embodiment of the water distillation device comprises a body having a lateral wall 2 and defining a cavity 2*c*, 2*d* suitable for allowing the distillation of an amount of water 201 to distill, wherein in the cavity 2*c*, 2*d* are defined a distillation chamber 2*d* and a condensation chamber 2*c*, wherein the condensation chamber 2*c* comprises a collection portion 109 intended to collect at least temporarily a distilled water 300. The device also comprises a heater, configured to heat the amount of water 201 to distill present, in use, inside the distillation chamber 2*d* and a cooler, configured to cause a condensation of the distillation steam deriving from the heating of the water 201 to distill through the heater. In this case, the cooler is a refrigerator evaporator 15*e*, the heater is a refrigerator condenser 15*c* and the water distillation device 1 comprises a refrigerator compressor 15 connected to the refrigerator evaporator and to the refrigerator condenser, said refrigerator compressor 15 being configured to compress a direct gas within said refrigerator condenser 15*c* determining, in use, a heating of the latter sufficient to cause a boiling of the water, said refrigerator evaporator 15*e* being configured to allow an expansion of the gas previously compressed by the refrigerator compressor 15 determining, in use, a cooling of the distillation steam sufficient to cause a condensation of the distillation steam taking place in the distillation chamber 2*d* and in particular at least partially in the collection portion 109. An intermediate duct 18 connected in correspondence of an its first end with the refrigerator condenser 15*c* and in correspondence of an its second end with the refrigerator evaporator 15*e* is configured and specifically designed to transport a fluid and/or gas outflowing from the refrigerator condenser 15*c* to the refrigerator evaporator.

The refrigerator circuit 15*c*, 15*e* formed by the refrigerator condenser and by the refrigerator evaporator 15*e* (the latter realizing a particular embodiment of the previously mentioned cooler), connected to the refrigerator compressor 15, not only heats the water 201 to distill in the distillation chamber but also, when the water in the form of distillation steam lies in the condensation chamber 2*c*, cools it. The step of cooling that is caused by the refrigerator evaporator 15*e* makes the water condense in the form of distillation steam in the condensation chamber 2*c*, in particular by cooling the distillation steam created by the boiling of the water 201 to distill within the distillation chamber 2*d*.

Therefore, the present disclosure shows a distillation process which comprises a heating of the water 201 to distil by means of a condenser cooler positioned in correspondence of the distillation chamber 2*d*, and this heating is sufficient to allow the boiling of the water causing the production of a distillation steam. The distillation process described here also comprises a cooling of the distillation steam by means of a refrigerator evaporator which is connected in circuit with the refrigerator condenser and the refrigerator compressor 15.

The refrigerator compressor 15, preferably but not limited thereto, uses a gas which in used is passed through the heater 15*c* in the form of a refrigerator condenser and in a refrigerator evaporator 15*e*. This gas is preferably, but not limited thereto, a gas free of ozone depleting substances. In a preferred but not limiting embodiment, this gas is propane, in particular Kryon® 290 (R-290). In an alternative embodiment to the one described above, that gas is R134a (freon, 1,1,1,2-tetrafluoroetane).

For this reason, the heater 15*c* is a refrigerator condenser connected to said refrigerator compressor 15. In particular, the inlet of the refrigerator condenser 15*c* is connected to a high-pressure outlet of the refrigerator compressor 15.

In a preferred but non-limiting embodiment, the heater 15*c* assumes substantially a coil shape and lies in substantial correspondence of the bottom portion of the distillation chamber. The refrigerator condenser is positioned within the distillation chamber, in particular lying substantially in correspondence of a bottom portion of the distillation chamber.

In FIG. 1 is shown a particular embodiment of the water distillation device 1 wherein the heater 15*c* is positioned within the cavity 2*c*, 2*d*, and in particular within the distillation chamber. However, this configuration is not to be intended in a limiting manner, as the Applicant has conceived a particular embodiment of the water distillation device 1 wherein the heater 15*c* is positioned in substantial proximity to the distillation chamber but lies outside with respect to the latter. In such a case at least part of the lateral wall 2 in substantial correspondence of the distillation chamber is characterized by a high thermal conductivity.

Where the water distillation device 1 is operating with a refrigerator compressor 15, this water distillation device 1 will advantageously comprise a refrigerator evaporator 15*e* or equivalent cooler element, connected to the refrigerator compressor 15. In use, in the refrigerator evaporator 15*e* is present a refrigerant gas in an expanded, and therefore cooled, condition, which transfers cold to the water distillation steam, causing its condensation.

In an alternative embodiment, or combined with the previous embodiment, the refrigerator evaporator 15*e* can comprise, or be replaced by, an equivalent cooler comprising at least one Peltier cell, or can comprise a refrigerator evaporator 15*e* operatively coupled to the Peltier cell to allow the cooling of the distillation steam. The control of the Peltier cell described herein can be advantageously carried out by a data processing unit of the water distillation device 1, the functioning of which will be better described in the following portion of the description.

The refrigerator evaporator 15*e* is preferably but not limited thereto installed within the cavity 2*c*, 2*d* in substantial correspondence of the condensation chamber, and thus to a height not lower with respect to the height at which the intermediate or separating element 100 lies. In the embodiment shown in FIG. 1 the refrigerator evaporator 15*e* is positioned in substantial correspondence of the head portion 3 of the cavity 2*c*, 2*d*, far above the intermediate or separating element 100. This configuration should not be intended in a limiting way, since another embodiment—illustrated in FIG. 2—of the water distillation device 1 has a refrigerator evaporator 15*e* which is substantially aligned in correspondence of the lateral wall 104 of the head portion 101 of the intermediate or separating element 100. In other terms, the refrigerator evaporator 15*e* is substantially aligned with the through holes 105 and/or lies in substantial proximity to the through holes. In this configuration, during the distillation cycle, the steam of distillation of the water 201 to distill comes into substantial contact with the refrigerator evaporator 15*e* as soon as it outflows out of the plurality of through holes 105, and is therefore almost immediately condensed in the collection portion 109. This configuration allows to reduce the height, in other words the axial development, of the body of the water distillation device 1.

In this latter configuration, therefore, the refrigerator evaporator 15*e* assumes the shape of a substantial coil which, if observed along the direction of the main axis X, is inscribed in a shape substantially corresponding to the shape of the cross-section of the cavity 2*c*, 2*d*. In the embodiments this coil is circular in cross-section and has a substantially axial development aligned on the main axis X. The refrigerator evaporator 15*e* surrounds the head portion 101, in particular the lateral wall 104 of the head portion 101, of the intermediate or separating element 100. It results in particular in at least partial axial alignment with the plurality of through holes 105. As it can be observed from the attached figures, between the intermediate or separating element 100, in particular between the head portion of the latter, and the lateral wall 2 exists an annular portion of the condensation chamber, and the refrigerator evaporator 15*e* is at least partially and preferably integrally positioned in that portion of the condensation chamber. The maximum height development of the refrigerator evaporator 15*e* can be such that it does not exceed the maximum height reached by the intermediate or separating element 100, and thanks to this aspect, the condensation chamber can have relatively small sizes, mainly in the axial direction with the main axis X, allowing for this reason a high level of efficiency in condensation of the distillation steam.

In another embodiment not shown in the attached figures, the refrigerator evaporator 15*e* is positioned in substantial correspondence of the upper portion of the lateral wall 2, in particular in substantial correspondence of the head portion 3, ma lies outside of the lateral wall 2, therefore outside of the cavity. In case in which the refrigerator evaporator 15*e* lies outside of the lateral wall 2, in particular outside of the condensation chamber 2*c*, there is the need to transfer a thermal energy by the cooler element 15*e* to the inside of the condensation chamber 2*c*, so that the distillation steam can be cooled, determining the production of distilled water 300 in liquid form. In such a case at least part of the lateral wall 2, in particular the part in substantial alignment with the cooler evaporator 15*e*, has characteristics of high thermal conductivity.

When the cooler 15*e*, in particular but not limited thereto when in the shape of the refrigerator evaporator 15*e*, lies outside of the condensation chamber 2*c*, this cooler can be realized according to the process described herein.

The refrigerator evaporator 15*e* is firstly positioned on the outside of the lateral wall, and in particular is wound in a coil shape around the lateral wall of the condensation chamber 2*c*. Subsequently, the assembly formed by the refrigerator evaporator 15*e* and by the body of the water distillation device 1, or where in a split shape, the assembly formed by the refrigerator evaporator 15*e* is introduced into a shape and in that shape is cast a thermal-conductive material 2*w*, preferably but not limited to metal, and in particular aluminum. The refrigerator evaporator 15*e* results therefore embedded within the thermal-conductive material 2*w*.

The assembly formed by the refrigerator compressor 15, by the refrigerator evaporator 15*e*, by the refrigerator condenser 15*c* and, at least, by a condenser duct 16, connected between the refrigerator compressor 15 and the refrigerator condenser 15*c*, and by an evaporator duct 17 connected between the refrigerator evaporator 15*e* and the refrigerator compressor 15, realizes a refrigerator system capable of heating water to a temperature sufficient to heat it to cause its boiling, and then causing its condensation in the condensation chamber.

The Applicant observes that although the use of a refrigerator system as described above can be applied also for non-vacuum distillation of water, in a preferred but not limiting embodiment such a refrigerator system is more advantageous when applied to a water distillation device 1 operating under vacuum conditions, since under such conditions the boiling temperature of the water 201 to distill is lower with respect to the temperature necessary to cause a boiling if the water 201 to distill were heated at atmospheric pressure.

Preferably, but not limited thereto, the refrigerator evaporator 15*e* and the refrigerator condenser 15*c* are realized in material with low ionic release into the water, which allow a high distillation purity of the distilled water 300. In a preferred but non-limiting embodiment, this material is a metallic material and preferably is stainless steel. In a non-limiting embodiment, the outer surface of the refrigerator evaporator 15*e* and/or of the refrigerator condenser 15*c* is gold-plated.

The Applicant has conceived a particular embodiment of the water distillation device 1 which comprises a pre-heater 20 for the water 201 to distill. In particular, the Applicant observes that the pre-heater 20 for the water 201 to distill described herein can be used for any type of water distillation device 1, in particular (but not limited thereto) also free from the intermediate or separating element 100 and/or free from the vacuum distillation function, but is preferably applicable to a water distillation device 1 provided with the heating of the water 201 to distill by means of a compressed fluid, as in the case of the water distillation device 1 specifically described herein, which is provided with a refrigerator compressor 15.

The pre-heater 20 is configured to carry out a step of pre-heating of the water 201 to distill before its introduction into the distillation chamber 2*d*. FIGS. 1, 6 and 7 show a detail of the connection of the pre-heater 20 in the refrigerator circuit and a detail of the construction of the pre-heater 20.

It is observed that although the pre-heater 20 is specifically described herein in association with a refrigerator circuit with the heater of the water 201 to distill supplied by the refrigerator compressor, this pre-heater 20 could operate with other types of heater which for example and not limited thereto use fluids, in particular liquids, or gases of any kind not necessarily forming part of the refrigerator circuit described herein.

The pre-heater 20 comprises a body which defines a containment vase 21, 22, 23 for the water to pre-heat, defined by:

- a lateral wall 21, preferably, but not limited thereto, of tubular shape, substantially cylindrical, and with main development axial and parallel to the main axis X,
- an upper wall 22,
- a bottom wall 23.

The lateral wall 21 of the pre-heater 20 can be realized in metal or glass and can be optionally covered by a thermally insulating material or comprise a thermally insulating material. The pre-heater 20 is configured to support in use the pressure at which the water 201 to distill is introduced in the distillation chamber 2*d*.

In the embodiment shown in FIG. 1 and in FIG. 6 the upper wall 22 and the bottom wall 23 are orthogonal with respect to the lateral wall 21. The lateral wall and the upper wall are therefore parallel. In an embodiment, the bottom wall has a substantially conical shape with an apex of the cone pointing downwards. These specific geometries are not to be intended in a limiting manner. As is possible to observe for example from FIG. 6, a direction of main extension of the pre-heater 20 is substantially vertically oriented.

On the lateral wall 21 of the pre-heater 20 open an inlet duct 24 for the water to pre-heat and an outlet duct 25 for the water to pre-heat. Because of the pre-heating provided by the pre-heater 20, the outlet duct 25 can also be mentioned as an outlet duct for the pre-heated water.

In an alternative embodiment, the inlet duct 24 and the outlet duct 25 are respectively arranged on the upper wall and the bottom wall 22, 23. In any case, the inlet duct 24 and the outlet duct 25 are positioned at two different heights, in order to allow in use to the water to preheat a crossing of at least part, substantially all, of the wall of the pre-heater 20.

In the embodiment specifically shown the inlet duct 24 and the outlet duct 25 are oriented in a direction substantially orthogonal to the direction of maximum extension of the body of the pre-heater 20; this specific configuration is not to be intended in a limiting manner since in a further and not limiting embodiment at least one between the inlet duct 24 and the outlet duct 25 extend in a direction substantially parallel, or axial, to the direction of maximum extension of the body of the pre-heater 20.

The lateral wall 21, the upper wall 22 and the bottom wall 23 realize as a whole a containment vase 21, 22, 23, configured to contain a predefined volume of water and within which the water to preheat temporarily lies and flows.

A pre-heating element 18*p* extends within said cavity and is configured to transfer heat to water which is in use contained within the cavity. In particular, this pre-heating element 18*p* is an intermediate duct 18, within which fluids at a higher temperature with respect to the temperature at which the water contained within the cavity of the intermediate duct 18 lies are made to flow. This intermediate duct is specifically configured to prevent the contact between the water contained in the cavity of the pre-heater 20 and the fluid contained herein.

Regardless of the specific type of pre-heating element 18*p*, the introduction of water into the containment vase 21, 22, 23 causes the water to pre-heat to be in contact with the pre-heating element 18*p*, and preferably determines the bringing of the water to preheat into direct contact with the pre-heating element 18*p*. In this way, the heat exchange takes place with high thermal efficiency.

Therefore, a specific embodiment of the pre-heater 20 comprises an intermediate duct 18 extending within said containment vase 21, 22, 23, and is designed to transfer heat to the water which is in use contained within the containment vase 21, 22, 23 itself. In a preferred but not limiting embodiment, the intermediate duct extends in a direction substantially axial and parallel to the direction of maximum development of the pre-heater 20. Although schematically shown in a rectilinear shape, in FIG. 1 as well as in FIG. 6, the pre-heating element 18*p* can assume a coil shape, while extending along a substantially axial direction, in particular parallel to the substantially axial direction of development of the pre-heating element 18*p*. In the embodiment of FIG. 6, the intermediate duct 18 realizing the pre-heating element 18*p* passes through the upper wall 22 and the bottom wall 23 and therefore in use extends along a substantially vertical direction.

In correspondence of a first end thereof, the intermediate duct 18 is connected to the refrigerator condenser 15*c*, while in correspondence of an its second end is connected to an auxiliary connecting duct 19 that from the intermediate duct 18 departs towards the inlet of the refrigerator evaporator 15*e*.

It is observed that, in particular, the refrigerator condenser 15*c* comprises an inlet 15*c*' directly supplied by the refrigerator compressor 15 and comprises an outlet 15*c*' which supplies the intermediate duct 18, which is thus connected, in particular in a direct and seamless manner, and in correspondence of its first end, with said outlet 15*c*'. A pre-expansion vase 18*v* can possibly be present on the intermediate duct 18. Where present, this pre-expansion vase is positioned in substantial proximity to the first end of the intermediate duct 18.

In use, the gas which is compressed in the refrigerator condenser 15*c*, thus heated, outflows the refrigerator condenser 15*c* having not released all the heat possible to the water 201 to distill contained in the distillation chamber, and thus still has sufficient heat to heat the water contained in the pre-heater 20. This gas transits into the intermediate duct 18, and in this duct releases further heat to the water contained in the cavity of the pre-heater 20, slightly increasing its temperature. The partially cooled gas is pushed by the compressor into the connecting duct 19 and finally into the refrigerator evaporator 15*e*, where it expands by subtracting heat and thus causing a condensation of the water distillation steam.

In use, the water 201 to distill is introduced in the inlet duct 24 of the pre-heater 20 and is flowed towards the outlet duct 25 of the pre-heater 20 to be subsequently introduced into the inlet duct of the water to distill 7 which introduces the water into the distillation chamber, optionally by means of the inlet valve 8.

Although a pre-heater with a pre-heating element 18*p* of a refrigerator circuit has been described in the present description, the Applicant observes that such a pre-heating element can—alternatively or in combination—comprise an electric heater, in particular a resistance, configured to transfer heat to the water contained in the containment vase 21, 22, 23 by Joule effect or by thermal induction.

By means of the pre-heater described above, a water distillation method is therefore carried out which firstly comprises the introduction of an amount of water 201 to distill into the water distillation device 1. Subsequently, a step of heating of the water 201 to distill contained in the distillation chamber 2*d* takes place by means of a heat transfer from the heater element 15*c* to the water 201 to distill, said heat transfer being sufficient to cause a boiling of at least part of the water 201 to distill; the heating causes the production of the distillation steam.

Furthermore, there is a step of cooling of the steam distillation through the cooler 15*e*. This step of cooling can take place simultaneously with the above-mentioned step of heating or at a later time and, in any case, leads to the condensation of the distillation steam.

The pre-heater 20 allows to carry out a step of pre-heating of the water 201 to distill, which takes place before the step of heating; pre-heating is carried out outside of the cavity 2*c*, 2*d* defined by the body of the distillation device 1. The step of pre-heating comprises:

- an introduction of the water 201 to pre-heat in the inlet duct 24 of the pre-heater 20, to allow the introduction of water to pre-heat within the containment vase 21, 22, 23;
- an activation of the pre-heating element 18*p*, at least partially introduced in the containment vase 21, 22, 23 in order to provide heat to the water contained in the containment vase 21, 22, 23,
- an extraction of the pre-heated water from the outlet duct 25, to make the pre-heated water flow from the containment vase 21, 22, 23 towards the cavity 2*c*, 2*d*, in particular towards the distillation chamber 2*d* of the distillation device 1.

In particular, the method of distillation comprises the activation of the refrigerator compressor 15 connected to the refrigerator evaporator 15*e* and to the refrigerator condenser 15*c*. The activation takes place through the data processing unit 119.

More in particular, the step of heating of the water 201 to distill comprises, by effect of said activation of the refrigerator compressor 15, a compression of a gas towards the refrigerator condenser 15*c*, causing a heating of said gas in turn determining the heating of the water 201 to distill sufficient to cause a boiling of the water 201 to distill.

The step of cooling of the distillation steam comprises, by effect of the activation of the refrigerator compressor 15 the expansion of the gas in the refrigerator evaporator 15*e*, causing a cooling of said gas in turn determining the condensation of the distillation steam.

Between the step of heating and the step of cooling there is a step of transit of the distillation steam through the intermediate or separating element 100, in particular through the at least one through hole 105, and said transit determines the reaching, by said distillation steam, of the condensation chamber.

The step of activation of the pre-heating element 18*p* comprises a step of transit of the outflowing gas 15*c*" from the refrigerator condenser 15*c* towards a first end of an intermediate duct 18 of the pre-heating element 18*p* at least partially introduced within said containment vase 21, 22, 23, and from said first end towards a second end of the intermediate duct 18 of the pre-heating element 18*p*.

The step of activation of the pre-heating element 18*p* comprises a supply of an electric heater of the pre-heating element 18*p*, so that this electric heater causes, in use, a transfer of heat to the water 201 to pre-heat by Joule effect or by thermal induction.

The step of activation of the pre-heating element 18*p* determines a gas flow along a mainly axial direction within the pre-heating element 18*p*; it is observed in particular that the mainly axial direction is parallel to a substantially axial development direction of the pre-heater 20.

The Applicant observes that the water distillation device 1 described herein can operate in a substantially continuous cycle or in a discontinuous cycle.

In a continuous cycle, the water distillation device 1 is configured to supply water 201 to distill in the distillation chamber substantially uninterruptedly. In a continuous cycle, then, the distillation of the water also takes place substantially uninterruptedly, and, preferably, also the extraction of the water by the collection portion, via the through hole 2*f*, or outlet hole, and the outlet duct 10 of the distilled water takes place substantially uninterruptedly.

In a discontinuous cycle, the water distillation device 1 operates as follows.

In a first step, the water 201 to distill is supplied into the distillation chamber, for example by means of an opening of the inlet valve 8 for a predetermined period of time. The supply of the water 201 to distill in the distillation chamber is then interrupted.

A second and subsequent step involves the heating of the water 201 to distill in the distillation chamber by means of the heater 15*c*.

Upon completion of the distillation of the water 201 to distill in the distillation chamber, an extraction, in particular a complete extraction, of the water contained in the collection portion 109 is carried out.

The cycle can then resume with a new (first) step of water alimentation into the distillation chamber.

Depending on the embodiments, the water distillation device 1 can therefore comprise at least one between:

- an operating configuration of delivery of distilled water 300, in which the distilled water collected in the collection portion 109 is made to flow into the outlet duct 10,
- an operating configuration of loading the water 201 to distill, in which the water to distill is introduced through the inlet duct into the distillation chamber, and
- an operating configuration of water distillation, in which the water 201 to distill is heated in the distillation chamber as described above.

When the distillation device 1 operates in a continuous cycle, in the operating configuration of delivery of distilled water 300, this device is configured to maintain within the cavity 2*c*, 2*d* a predetermined vacuum level with respect to a determined threshold during the continuation of the operating configuration of distribution of the distilled water 300. This means that the absolute pressure within the cavity 2*c*, 2*d* must not exceed this determined threshold.

Preferably, also in the operating configuration of water loading 201 to distill the water distillation device 1 is configured to maintain within the cavity 2*c*, 2*d* a predetermined vacuum level with respect to a determined threshold during the continuation of the operating configuration of loading the water 201.

The use of the pre-heater 20 described herein is effective in increasing the energy efficiency of the distillation device 1 object of the present disclosure both in case it operates in a continuous cycle and, on the contrary, in case it operates in a discontinuous cycle.

In a preferred but non-limiting embodiment, the distillation device 1 described herein comprises a tank for the distilled water, identified by the reference number 11. The outlet duct 10 of the distilled water 300 is connected to the tank 11.

Preferably, but not limited thereto, the tank 11 is connected in such a way that the distilled water 300 that condenses in the collection portion 109 is conducted by gravity into the tank 11.

An outlet valve 12 is configured to adjust the outflow of the water by the collection portion 109 and is in particular located downstream of tank 11 and comprises at least an open configuration that allows the outflow of the distilled water from tank 11, and a closed configuration that prevents the outflow of the distilled water from the tank 11.

The outlet valve 12 can be a manually controlled valve or an electronically controlled valve (solenoid valve). In an embodiment, the outlet valve can be operatively coupled to an extraction pump which is described in detail below. The outlet of valve 12, which allows the actual outlet of the distilled water 300 from the water distillation device 1, is indicated by the reference number 124.

The water distillation device 1 herein also comprises a sterilizer configured to break down the bacterial load that can be present in the water. In a preferred but not limiting embodiment, this sterilizer is a UV sterilizer, in particular operating by emitting optical radiation substantially within the UV-C range, i.e. between 100 and 280 nm. Preferably, but not limited thereto, the sterilizer is placed on the outlet duct 10 of the distilled water 300, and is therefore configured to carry out a step of sterilization of the water when already distilled. Alternatively, in a non-limiting embodiment, the sterilizer is placed downstream of the tank 11, for example being placed downstream of the valve 12.

In a further and non-limiting embodiment, the sterilizer can also be placed in substantial correspondence of the inlet duct 7 for the water 201 to distill. In this way, it is possible to proceed with the execution of a step of sterilization of the water 201 to distill even before it is placed within the distillation chamber.

The following portion of the description describes the control electronics of the water distillation device 1.

In a preferred and not limiting embodiment, the water distillation device 1 described herein also comprises a data processing unit 119.

The data processing unit 119 is configured to supervise the functioning of the water distillation device 1, which can therefore operate according to a cycle of automatic distillation in a own specific configuration thereof. This allows to simplify the functioning of the distiller described herein, which for this reason can also be actuated by people who are not particularly experienced.

Preferably, but not limited thereto, the data processing unit 119 is connected to the outlet valve 12 placed downstream of the tank 11 and/or to the inlet valve 8 on the inlet duct 7 of the water 201 to distill.

In detail, the data processing unit 119 is configured to control the opening and closing of the outlet valve 12 and/or of the inlet valve 8 on the inlet duct 7 of the water 201 to distill so as to realize the discontinuous or continuous distillation cycle described above.

The Applicant observes in particular that in the continuous cycle, the operating configuration of delivering the distilled water 300, the operating configuration of loading the water 201 to distill, and the operating configuration of distilling the water take place substantially uninterruptedly and/or in substantial temporal overlap.

In an embodiment, the inlet valve 8 on the inlet duct 7 the water to distill and the outlet valve 12 can assume a plurality of partially open configurations, and this allows to precisely dose the flow of water passing through them; this can be particularly useful during the continuous cycle functioning, since the data processing unit 119—in a substantially automatic manner—adjusts the partial opening of the inlet valve 8 and of the outlet valve 12 so that within the cavity a predetermined vacuum value is always kept.

In a preferred embodiment, the data processing unit 119 is also operatively connected with the vacuum pump 13, and can be configured to continuously or discontinuously adjust and/or activate the vacuum pump so that within said cavity 2*c*, 2*d* a determined vacuum level is maintained higher than a first threshold value Thv1, or comprised between a first threshold value Thv1 and a second threshold value Thv2. It is observed in particular that the presence of two threshold values Thv1 and Thv2 allows a determined hysteresis which allows to avoid oscillation phenomena in the activation of the vacuum pump 13.

The water distillation device 1 can be then configured, through the firmware performed on the data processing unit 119, to cause a maintenance of the vacuum within said cavity 2*c*, 2*d* between a first and a second threshold value Thv1, Thv2.

In particular, by means of the firmware executed on the data processing unit 119, the data processing unit 119 becomes configured to perform a controlled opening of the inlet valve 8 where the vacuum present within the cavity 2*c*, 2*d*, in particular within the distillation chamber and the condensation chamber, is greater than the first threshold value Thv1 (absolute pressure lower than the first threshold value Thv1) so that the vacuum value falls again between the first and the second threshold value Thv1, Thv2, and/or can be configured, by means of the firmware executed on the data processing unit 119, to execute a controlled opening of the outlet valve 12, maintaining in this case the inlet valve 8 closed, or—alternatively or in combination—to activate the vacuum pump 13, where the vacuum present inside the cavity 2*c*, 2*d*, in particular inside the distillation chamber 2*d* and the condensation chamber 2*c*, is lower than the second threshold value Thv2 (absolute pressure lower than the second threshold value Thv2), so that the vacuum value falls again between the first and the second threshold value Thv1, Thv2. In a preferred and not limiting embodiment, then, the data processing unit 119 can be configured to control simultaneously the opening (or partial opening) of the inlet valve 8, the outlet valve 12 and the vacuum pump 13 in an integrated manner.

Alternatively or in combination with the above, via the above-mentioned firmware, the data processing unit 119 is configured to act by controlling the activation or deactivation or the speed of rotation of vacuum pump 13, so that the vacuum is automatically maintained between the first and second threshold values Thv1, Thv2.

Preferably, but not limited thereto, such first and second threshold values Thv1, Thv2 can be set at will by an operator by reprogramming the data processing unit 119.

Such a technical feature is particularly useful where the operational configuration of the supply of distilled water 300 is such that an absolute pressure level not exceeding a predetermined threshold value is maintained within the cavity 2*c*, 2*d*. In a preferred but not limiting embodiment, said predetermined threshold value corresponds to the second threshold value Thv2.

For this reason, the water distillation device 1 comprises at least a pressure sensor, configured to measure the pressure (in particular the vacuum) present within the cavity 2*c*, 2*d*. In principle, disregarding the pressure drop resulting from the different height between the distillation chamber 2*d* and the condensation chamber 2*c*, the pressure within the cavity 2*c*, 2*d* is the pressure within the distillation chamber 2*d* and in turn is the pressure within the condensation chamber 2*c*. This pressure sensor is operationally, in particular electrically, connected with the data processing unit 119.

Even more preferably the data processing unit 119 is operatively connected also to the refrigerator compressor 15. In particular, the data processing unit 119 can be electrically connected to the refrigerator compressor 15 and is configured to adjust the actuation speed of the refrigerator compressor 15 determining an increase or decrease in the compression of the gas transferred to the refrigeration condenser 15*c*.

More generally, it can be thus considered that the refrigerator compressor 15 is an adjustable compressor, configured to compress the gas in the refrigeration condenser 15*c* according to higher or lower compression values according to the specific operating needs.

The speed adjustment of the refrigerator compressor 15 is carried out according to the temperatures present in the distillation chamber and in the condensation chamber. For this reason, a specific embodiment of the water distillation device 1 described herein comprises at least a first temperature sensor positioned in substantial correspondence of the distillation chamber and a second temperature sensor positioned in substantial correspondence of the condensation chamber. Both the first and the second temperature sensor are operatively, preferably electrically, connected with the data processing unit 119.

The use of two temperature sensors advantageously allows to measure the absolute temperatures necessary for the correct operation of the water distillation device 1 and, also, allows to measure the temperature differential that exists in use between the distillation chamber and the condensation chamber.

This allows to vary the speed, and in particular for example to reduce or increase a time with which a determined amount of water 201 to distill is heated (equal to the amount of water 201 to distill) or, also to allows to heat a greater or lower amount of water 201 to distill from a first and lower temperature at a second and higher temperature.

In an preferred but not limiting embodiment, the data processing unit 119 is configured to control the operation of the refrigerator compressor 15, in particular to adjust the operation speed, in substantial simultaneity with the control of the vacuum pump 13 and/or of the inlet valve 8 and/or of the outlet valve 12.

Preferably, an auxiliary temperature sensor is positioned substantially in correspondence of the high pressure outlet of the refrigerator compressor 15. This auxiliary temperature sensor is operationally, preferably electrically, connected with the data processing unit 119. The use of the auxiliary temperature sensor advantageously allows to have a substantially direct feedback of the effect caused by the increase and/or decrease in the rotation speed of the refrigerator compressor 15. This variation of the rotation speed can for example and not limited thereto be carried out through a PWM type control.

The Applicant observes that the fact of being able to control the refrigerator compressor 15 and the vacuum pump 13 by means of a PWM control simplifies the programming and/or the hardware realization of the data processing unit 119, since the speed control and/or the power supplied by the vacuum pump 13 and from the refrigerator compressor 15 take place according to a single control criterion.

The water distillation device 1 herein described also comprises a level sensor operatively connected with the distillation chamber. Such level sensor is configured and specifically designed to detect the level of the water 201 to distill contained within the distillation chamber. In a preferred but not limiting embodiment, the water distillation device 1 is operatively connected, in particular electrically connected, with the data processing unit 119.

The level sensor transmits a fluid level signal to the data processing unit 119 and such data processing unit 119 can be advantageously configured to allow the execution and/or starting of distillation of the water 201 to distill only when the fluid level signal corresponds to a level of water 201 to distill within the distillation chamber 2*d* higher than a predetermined water level value.

The data processing unit 119 can be in particular configured to interrupt the distillation cycle, for example and not limited thereto removing power from the refrigerator compressor 15, when the level of the water 201 to distill measured by the level sensor is below a determined minimum threshold and/or is zero, and/or after a predetermined time from when the level of water 201 to distill measured by the level sensor is below a determined minimum threshold and/or is zero. This advantageously can prevent unnecessary consumption of electricity by the water distillation device 1 and/or can prevent overheating phenomena for the heater 15*c*.

The Applicant has developed an embodiment of the water distillation device 1 which is in particular configured to operate with a vacuum substantially equal to or lower than 150 mbar, or more preferably equal to or lower than 50 mbar, or more preferably equal to or lower than 30 mbar or even more preferably equal to or lower than a 15 mbar, and to cause a heating of the water 201 to distill at a temperature for example and not limited thereto equal to or lower than 55° C., more in particular equal to or lower than 50° C., even more preferably equal to or lower than 47° C., more preferably equal to or lower than a 45° C.

In an embodiment, that water distillation device 1 is capable of producing distilled water in a single distillation cycle with a conductivity substantially lower than 10 μS, preferably lower than 7 μS and more preferably lower or equal to a 5 μS, using a refrigerator compressor consuming 75 Wh, starting from mineralized water with conductivity equal to 1200-1300 μS, with a thermal differential ($\Delta T$), measured between the temperature of the distilled water 300 at the time of condensation and the temperature of the water 201 to distill when in the step of boiling, substantially comprised, in the interval 25° C.-45° C.

In a specific non-limiting embodiment, it has been observed that in correspondence of the cooler 15*e* the temperature can substantially be comprised in the interval between +12° C. and −4° C., optionally between +12° C. and −2° C., more preferably between +12° C. and 0° C., or also between +12° C. and +2° C.

The specific consumption for the water distillation device 1 according to the present disclosure can therefore be substantially equal to 75 Wh/l. The great efficiency achieved by the water distillation device 1 described here allows to produce distilled water at significantly lower costs than that traditionally produced. The Applicant observes that a specific embodiment of the device described here, particularly efficient, has a specific consumption of 50 Wh/l.

The Applicant in particular underlines that the performances described above are obtained for an embodiment of the water distillation device 1 which is devoid of filtering membrane.

The Applicant has conceived a particular embodiment of the water distillation device 1 object of the present disclosure which has a particular pre-cooling system for gases outflowing from the heater 15*c*, in particular from the refrigeration condenser 15*c*. In particular, said pre-cooling system is introduced into the refrigeration circuit of the water distillation device 1 comprising at least: the refrigerator compressor 15, the heater 15*c* (in particular in the form of the refrigeration condenser 15*c*) and the refrigerator evaporator 15*e* described above.

The pre-cooling system is configured to cool at least a portion of the intermediate duct 18, and in an general embodiment thereof comprises an active cooler configured to remove heat from said at least a portion of the intermediate duct 18. Although different types of active coolers can be used, the active cooler preferred by the Applicant is a fan 15*v*, in particular an electric fan.

The pre-cooling system for the gas comprises a fan 15*v* which is placed in substantial proximity to the intermediate duct 18 that leads the gas from the outlet of the refrigerant condenser 15*c* to the refrigerator evaporator 15*e*.

In detail, the 15*v* fan is an axial fan and is configured to convey an air flow over at least part of the intermediate duct 18.

In a preferred but not limited embodiment, the fan 15*v* is controlled by the data processing unit 119; the latter executes—preferably but not limited thereto automatically—a software routine that controls the activation or deactivation and, preferably, also the speed of rotation of the fan 15*v* so that it is possible to adjust the air flow conveyed on the at least part of the intermediate duct 18. This advantageously allows to adjust the pre-cooling effect of the gases that are conveyed to the refrigerator evaporator 15*e*.

In particular, the data processing unit 119 can be configured to execute a software control routine of the active cooler, in particular of the fan 15*v* in order to automatically adjust its activation, deactivation or intensity of cooling action (thus the speed of rotation) according to one or more of the following parameters: a temperature of the refrigerator compressor 15, a temperature of the refrigerator condenser 15*c* (in particular, a temperature assumed by the gas and/or fluid within the refrigerator condenser 15*c*), a temperature of the refrigerator evaporator 15*e* (in particular, a temperature assumed by the gas and/or fluid in the refrigerator compressor 15*e*), a temperature differential between the temperature of the refrigerator condenser 15*c* and the temperature of the refrigerator evaporator 15*e*, a temperature of the water 201 to distill within the distillation chamber 2*d*, a pressure present within said cavity 2*c*, 2*d*.

To this end, a specific and non-limiting embodiment of the device described herein comprises at least one of the following sensors, operatively connected to the data processing unit 119: a temperature sensor of the refrigerator compressor 15, a gas and/or fluid temperature sensor configured to measure the temperature of said gas and/or fluid in the refrigerator condenser 15*c*, a gas and/or fluid temperature sensor configured to measure the temperature of said gas and/or fluid in the refrigerator evaporator 15*e*, a temperature sensor configured to measure the temperature of the water 201 to distill in the distillation chamber 2*d*, a pressure sensor configured to measure the pressure within said cavity 2*c*, 2*d*.

The Applicant has conceived also a particular support 30 for the refrigerator compressor 15 that allows to improve the cooling of the refrigerator compressor 15. The support is configured to house the pre-cooling system and in particular is configured to house at least the fan 15*v*.

FIG. 4 and FIG. 5 show a first and non-limiting embodiment for such a support 30. In particular, FIG. 5 shows a cross-sectional view along line B-B of FIG. 4. The support 30 comprises a body configured substantially to house part of the refrigerator compressor 15 and, preferably, to support the refrigerator compressor 15 at a predetermined height with respect to a bottom of the water distillation device 1, and is configured to allow a cooling of at least part of the refrigerator compressor 15 by means of a ventilation actively provided by a fan.

In particular the support 30 presents at least a lateral wall of such a shape as to allow the housing of part of the refrigerator compressor 15 inside it by locating and/or defining a channel 31 for the passage of cooling air. In particular, the channel 31 is delimited internally by the refrigerator compressor 15 and externally is delimited at least partially by the lateral wall of the support 30.

In a preferred but non-limiting embodiment said channel is a channel 31 that develops substantially along the lateral surface of the refrigerator compressor 15, and/or substantially surrounds its perimeter.

The lateral wall of the support 30 has a substantially vertical development, which allows to have a passage of air along a substantially vertically aligned axial direction (arrow F, in FIG. 4).

The support 30 for the refrigerator compressor 15 comprises preferably said shock absorbing elements 33, for example and not limited thereto rubberized shock-absorbing pads, configured and specifically designed to reduce and/or absorb vibrations generated by the refrigerator compressor 15 during its operation.

In a preferred but non-limiting embodiment, the refrigerator compressor 15 has a substantially circular cross-section. For this reason, the specific and non-limiting embodiment of the support 30 shown in FIGS. 4 and 5 presents a lateral wall of substantially circular development.

A plurality of arms 30*b* connect the body of the refrigerator compressor 15 to the support 30.

Another specific embodiment of the support 30 for the refrigerator compressor is shown in FIGS. 4*a* and 5*a*. The support 30 is described with reference to a triplet of axes, wherein the axis K represents the vertical axis (moreover, preferably parallel to the main axis X), wherein the axis Y represents a first horizontal axis and the axis Z represents a second horizontal axis orthogonal to the first horizontal axis Y and the vertical axis K.

In detail, the lateral wall of the support 30 has a plurality of sectors 30*s* and has a substantially axial development parallel to the vertical axis K and is configured to at least partially surround the body of the refrigerator compressor 15.

The support 30 also has a flange 30*f* provided with a plurality of holes on the perimeter for the passage of screws 34 (or equivalent removable fastening elements) which allow the fastening of the refrigerator compressor 15 to the support 30.

The flange 30*f* is provided with a central opening for allowing the passage of cooling air along the channel 31 which departs from said central opening and surrounds in use the perimeter of the refrigerator compressor 15. The lateral wall of the support 30 is therefore fixed to the flange 30*f*.

Also this embodiment of the support 30 for the refrigerator compressor 15 preferably comprises said shock absorbing elements 33, for example and not limited thereto rubberized shock absorbing pads, configured and specifically designed to reduce and/or absorb vibrations generated by the refrigerator compressor 15 during its operation.

The shock absorbing elements 33, which are thus interposed between the body of the support 30 and the refrigerator compressor 15, are positioned substantially above the holes 30*h* and within each of said shock-absorbing elements 33 is introduced part of the shank of a respective screw 34 which thus removably fastens the refrigerator compressor 15 to the flange 30*f* passing through the shock absorbing elements 33 and thus introducing itself within the hole 30*h*.

In particular, the shock absorbing elements 33 are configured to absorb in use vibrations developing along a direction substantially axial to the vertical axis K and are also preferably but not limited thereto configured to support the weight of the refrigerator compressor 15.

The lateral wall of the support 30 comprises a plurality of notches, and is therefore a sector wall. In the preferred embodiment, shown in the attached figures, the lateral wall has three sectors, but this should not be intended in a limiting manner. Preferably, the notches are axially aligned with the holes 30*h*; this solution is well shown in particular in FIG. 4*a*.

The fan is positioned in substantial correspondence of the central opening of the flange 30*f*, and is preferably fixed rigidly to the support 30 in particular resulting fixed to the flange 30*f*. In particular the fan is preferably fixed below the refrigerator compressor 15.

In use, the fan pushes the air in a substantially axial direction along a direction substantially parallel to the vertical axis K. The air pushed by the fan meets the bottom of the compressor and is diverted along the channel 31 with a substantially "S" path and then continues its path again along a direction again parallel to the vertical axis K (see again arrow F) resulting confined between the body of the refrigerator compressor 15 and at least a sector 30*s* of the lateral wall.

In a particular embodiment, the fan which is positioned in correspondence of the support 30 is in particular the same fan of the precooling system mentioned in the previous portion of the description. This means that a specific embodiment of the water distillation device 1 described herein advantageously comprises an integrated active cooling system for a refrigerator compressor, configured to simultaneously cool the refrigerator compressor 15 and an intermediate duct 18 connecting the refrigerator condenser 15*c*, in particular an outlet of the refrigerator condenser 15*c*, with the refrigerator evaporator 15*e*, in particular the inlet of the refrigerator evaporator 15*e*.

The integrated system described herein is then configured to generate, through the fan, an air flow directed to invest and/or lap part of the intermediate duct 18 and to invest and/or lap part of the refrigerator compressor 15, removing heat from said intermediate duct 18 and from the refrigerator compressor 15. Preferably, the air flow F generated by the fan first invests part of the intermediate duct 18 and, subsequently, invests the refrigerator compressor 15.

Such an integrated system is therefore configured and specifically designed to generate an airflow that invests and/or laps part of the intermediate duct 18 and invests and/or laps part of the refrigerator compressor 15, resulting in an at least partial and substantially simultaneous cooling.

The integrated system described herein therefore comprises a support 30 for the refrigerator compressor 15, and by means of said support 30 a channel 31 is realized, interposed between the support 30 and the refrigerator compressor 15, said channel being intended to allow the passage of the air flow F generated by the fan 15*v*.

In a preferred but non-limiting embodiment, the air flow F generated by the fan 15*v* first hits part of the intermediate duct 18 and then also hits the refrigerator compressor 15.

As shown in the attached figures, preferably, such an integrated system comprises a 15*v* fan, preferably but not limited thereto an axial type fan 15*v*, and is configured to, and specifically intended to, generate an airflow that is directed along a direction F at least partially vertical and in particular is configured to, and specifically intended to, generate an airflow that is directed from the bottom to the top. This advantageously favours the thermal convection or chimney effect and allows—at the same power absorbed by the fan 15*v*—a higher cooling efficiency with respect to solutions where the air flow is directed in directions other than the vertical direction and/or is directed downwards.

Preferably, but not limited thereto, the support 30 is realized in plastic material. This allows to have a particularly light and also electrically insulated support with respect to the compressor.

The present disclosure therefore describes a particular method of realization of a refrigerator cycle, moreover applicable to a water distillation method and, even more particularly to a vacuum water distillation method such as the one described herein, which comprises a simultaneous cooling step of at least part of the refrigerator compressor 15 and of the gas flowing in an intermediate duct 18 which from the outlet of the refrigerator condenser 15*c* is directed towards the refrigerator evaporator 15*e*, and wherein said cooling step is carried out by means of the fan 15*v* which, in use, generates a flow of air directed to invest and/or lap part of the intermediate duct 18 and to invest and/or lap part of the refrigerator compressor 15, subtracting heat from said intermediate duct 18 and from the refrigerator compressor 15, wherein, in particular, the air flow F is at least partially channeled into a channel 31 realized between the support 30 and the refrigerator compressor 15. In particular, the method described herein comprises the fastening of the fan 15*v* to the support 30 for the refrigerator compressor 15, and can optionally comprise the regulation of the speed of the fan 15*v* according to the distillation configuration in use carried out.

The Applicant has actually observed that the fan, inserted in the context of the object of the disclosure as described herein advantageously does not require large electrical power to produce the benefits described above. In particular, for a water distillation device 1 with the performance described above, it is sufficient a small fan capable of generating an air flow of substantially comprised between 0.2 and 0.4 $m^3$/min, generable for example with a small axial fan of about 3 W power, for example and not limited thereto like the one produced by Orion, #OD4028-12HB.

As briefly mentioned earlier, a particular embodiment of the water distillation device 1, configured and specifically designed to allow the distillation of water without breaking the vacuum created within the cavity 2*c*, 2*d*. For the purposes of the present disclosure, "without breaking the vacuum" means without complete cancellation of the vacuum previously created by means of the vacuum pump 13, in particular by means of a maintenance of the vacuum between the first threshold value Thv1 and the second threshold value Thv2. The process of distillation of the water 201 therefore provides for a maintenance of the vacuum within the cavity 2*c*, 2*d* of the body, in particular within the distillation chamber 2*d* and the condensation chamber 2*c* upon the extraction of the distilled water 300 from the collection portion 109 realized in the condensation chamber 2*c*.

In order to allow this operation, the Applicant has conceived a particular configuration of the water distillation device 1 in which the extraction of the water from the collection portion 109 takes place by keeping both the condensation chamber and the distillation chamber substantially insulated from the external atmosphere. In particular during the process of extracting water from the collection portion at least the inlet conduit 7 for the water 201 to distill is kept closed, or equivalently, the inlet valve 8 is kept closed.

The water distillation device 1 comprises in particular an extraction pump 400 which is configured to extract the water from the collection portion 109 allowing a vacuum to be maintained within the cavity 2*c*, 2*d* and/or preventing the vacuum within the cavity 2*c*, 2*d* from exceeding a predetermined threshold value, and/or preventing—during its operation—the inlet of air which, coming from the outside, could introduce itself within the cavity 2*c*, 2*d*, in particular within the distillation chamber 2*d* and within the condensation chamber 2*c*, causing a reduction of the vacuum created herein by the vacuum pump 13. Therefore, in a preferred but not limiting embodiment, the extraction pump 400 used is an occlusive pump and/or a volumetric pump. This pump, due to a variation of volume within an its chamber, causes in use a suction or thrust on the distilled water 300, insulates therefore the cavity 2*c*, 2*d*, in particular the condensation chamber 2*c*, and therefore the collection portion, from the external environment during its operation and when stopped. The extraction pump 400 is configured to be activated at least during the operational configuration of supply of the distilled water 300.

Where the water distillation device 1 operates in a continuous cycle, the extraction pump 400 is configured to be activated also during the distillation operational configuration and during the water loading operational configuration.

The Applicant observes in particular that the extraction pump 400 described herein can be applied to different types of water distillation devices 1, not necessarily using a refrigerator circuit provided with a refrigerator compressor 15, a refrigerator condenser and a refrigerator evaporator to carry out the heating and condensation of the water. In particular, the extraction pump 400 can be applied to any water distillation device 1 which, in a general form, comprises:

- a body having a lateral wall 2 and defining a cavity 2*c*, 2*d* suitable for allowing the distillation of an amount of water 201 to distill, wherein in said cavity 2*c*, 2*d* are defined a distillation chamber 2*d* and a condensation chamber 2*c*, wherein the condensation chamber 2*c* comprises a collection portion 109 designed to collect at least temporarily distilled water 300,
- a heater, configured to heat the amount of water 201 to distill present, in use, in the distillation chamber 2*d*,
- a cooler, configured to cause a condensation of a distillation steam deriving from the heating of the water 201 to distill through the heater,
- wherein the condensation chamber 2*c* comprises an outlet or through hole 2*f* configured to allow an outflow of the distilled water 300 from the collection portion 109, wherein the water distillation device 1 is a vacuum distillation device configured to carry out the distillation of the water 201 to distill at a pressure lower with respect to the atmospheric pressure, and wherein the water distillation device 1 has an operating configuration of supply of distilled water 300, wherein the distilled water 300 collected in the collection portion 109 is made flown in an outlet duct 10. In particular, the device 1 is configured to maintain within said cavity 2*c*, 2*d* a predetermined vacuum level with respect to a predetermined threshold in the continuation of said operating configuration of supply of distilled water 300.

In particular, the Applicant observes that if the above mentioned water distillation device 1 is provided with the inlet valve 8, this inlet valve 8 is kept in closed configuration during the operational water delivery configuration.

Different types of pumps can be used to realize the extraction pump 400, and among these a particular type of pump is represented in FIG. 9 and described below.

The extraction pump 400 comprises a body 403 that defines an inlet 401 for the distilled water 300 to extract from the collection portion 109 and an outlet 404 from which the distilled water 300 outflows. The body 403 defines a cylinder for piston 402, configured to push the water from the inlet 401 to the outlet 404. The extraction pump 400 comprises at least a piston 402 of the axially movable type within said body 403. The piston 402 moves between a first stroke ending position and a second stroke ending position. At least in correspondence of the first stroke ending position, or preferably for a first portion of the stroke comprising the first stroke ending position, the inlet 401 is placed in direct communication with a compression chamber 411 which is substantially realized opposite to the piston 402. In detail, the compression chamber 411 is defined between piston 402 and the body 403 of the extraction pump 400.

At least in correspondence of the second end position, or preferably for a second portion of the stroke comprising the second stroke ending position, the inlet 401 is insulated from the compression chamber 411 by means of the piston 402. In a non-limiting embodiment, that piston 402 has a sky in the shape of a salami slice.

In use, therefore, during the sliding, between the first stroke ending position and the second stroke ending position, the piston 402—by means of its axial movement—first causes a partial occlusion of the inlet 401 and subsequently a total occlusion of the inlet 401. This means that, at this point, the compression chamber 411 contains a determined volume of distilled water 300 and is insulated from inlet 401.

The extraction pump 400 comprises a first unidirectional valve 405, positioned in substantial correspondence of the compression chamber 411 and configured to allow the outflow of the distilled water 300 from the compression chamber 411 towards the outlet 404. The unidirectional valve is configured to prevent the inlet of water or air from the outlet 404 toward the compression chamber 411. For this reason, a ball 407 is positioned in a seat of the body 403 in substantial correspondence of the compression chamber 411, preferably in an axial position with the sliding of the piston 402, and is pushed towards that seat by a spring 406. In a non-limiting embodiment, said spring is a coil spring.

If the compression chamber 411 is not subjected to a pressure induced by the piston 402, the external pressure (outlet 404) or atmospheric pressure is greater than the pressure which in use is present in the compression chamber 411 at least when this is in communication with the inlet 401—since in that compression chamber 411, in this case, a vacuum exists—the unidirectional valve 405 is forced into a closed configuration already only by the pressure difference existing between the respective outlet 404 and the inlet 401 of the extraction pump. The spring 406 acts as an additional element that forces the unidirectional valve into the abovementioned closed configuration.

Therefore, when the unidirectional valve 405 is in a closed configuration, the spring 406 is in a first axial extension configuration, which preferably, but not limited thereto, is a maximum axial extension configuration. When the unidirectional valve 405 is in an open configuration, the spring 406 is in a second axial configuration of lower extension than the first axial configuration.

The progressive movement of the piston 402 determines a progressive reduction of the volume of the first compression chamber 411, which causes an increase of the pressure present herein such as to allow the switching of the first unidirectional valve 405 into open configuration, in particular with a compression of the first spring 406 and a slight movement of the first ball 407 from its seat; in this way the distilled water contained in the first compression chamber 411 is pushed out of the latter towards the first outlet 404.

A return of the piston 402 to a position rearward with respect to the second end position determines an immediate release of the pressure in the compression chamber 411 and a new switching of the first unidirectional valve 405 to closed configuration.

FIG. 9 shows a particular embodiment of the extraction pump of the double-acting type, in particular that comprises two compression chambers 411, which are opposed.

The extraction pump 400 comprises a body 403 that defines:

- a first inlet 401 and a second inlet 401' for the distilled water 300 to extract from the collection portion 109 and
- a first outlet 404 and a second outlet 404' from which outflows the distilled water 300.

The body 403 defines a cylinder for piston 402, configured to push water from the first or second inlet 401, 401' to the first or second outlet 404, 404' respectively.

The extraction pump 400 comprises a piston 402 of the axially movable type within said body 403. The piston 402 moves between a first end position and a second end position.

At least in correspondence of the first end position, or preferably for a first portion of the stroke comprising the first stroke ending position, the first inlet 401 is placed in direct communication with a first compression chamber 411 which is substantially realized opposite to the piston 402, in particular opposite to a first head portion of the piston 402.

For the purpose of the present description, the first end position is the one wherein the piston 402 is aligned to the left in figure.

In that first end position, or preferably for a first portion of the stroke comprising the first end position, the second inlet 401' is insulated by a second compression chamber 411' which is substantially realized opposite to the piston 402, in particular opposite to a second head portion of the piston 402, opposite to the first head portion.

At least in correspondence of the second end position, or preferably for a second portion of the stroke comprising the second stroke ending position, the first inlet 401 is insulated from the first compression chamber 411 by means of the piston 402. In correspondence of the second stroke ending position, or preferably for a second portion of the stroke that comprises the second end position, the second inlet 401' is placed in direct communication with the second compression chamber 411'.

In a non-limiting embodiment, that piston 402 has the first and/or second head portion (or first and second sky) in the shape of a salami slice.

In that second end position, or preferably for a second portion of the stroke comprising the second stroke ending portion, the second inlet 401' is placed in direct communication with the second compression chamber 411' which is substantially realized opposite to the piston 402, in particular opposite to the second head portion of the piston 402.

During the sliding between the first stroke ending position and the second stroke ending position, the piston 402 first causes a partial occlusion of the first inlet 401 and subsequently a total occlusion of the first inlet 401. At the same time, the piston 402 first causes a partial opening and subsequently a total opening of the second inlet 401'. This means that, at this point, the first compression chamber 411 contains a determined volume of distilled water 300 and is insulated from inlet 401, whereas the second compression chamber 411' opens up from its insulating condition with respect to the second inlet 401' and can therefore be filled again with distilled water 300 to extract.

The extraction pump 400 comprises a first unidirectional valve 405 and a second unidirectional valve 405'; the first unidirectional valve 405 is installed in correspondence of the first compression chamber 411; the second unidirectional valve 405' is installed in correspondence of the second compression chamber 411'. Each of the first and second unidirectional valves 405', 405' is configured to allow the outlet of the distilled water 300 from the respective first or second compression chamber 411, 411' towards the first or second outlet respectively 404, 404'. Each unidirectional valve is configured to prevent the inlet of water or air from the respective first or second outlet 404, 404' toward the respective first or second compression chamber 411, 411'.

In each of the first and second unidirectional valves there is a ball 407, 407" which is positioned in a seat of the body 403 in substantial correspondence with the first compression chamber 411 (first unidirectional valve 405) and the second compression chamber 411' (second unidirectional valve 405'), preferably in an axial position with the sliding of the piston 402 and is pushed towards that seat by a respective spring 406, 406'.

If the first or second compression chamber 411, 411' is not subjected to a pressure induced by the piston 402, the external pressure or atmospheric pressure is greater than the pressure which in use is present in the first or second compression chamber 411, 411' at least when this is in communication with the inlet 401—since in that compression chamber 411, in this case, a vacuum exists—the unidirectional valve is forced into a closed configuration already by the pressure difference existing between the respective first or second outlet 404, 404' and the respective first or second inlet 401, 401' of the extraction pump. The spring 406, 406' acts as an additional element that forces the unidirectional valve into the above-mentioned closed configuration.

The progressive movement of the piston 402 determines a progressive reduction of the volume of the first compression chamber 411, or alternatively of the second compression chamber 411', which causes an increase of the pressure present herein such as to allow the switching of the first unidirectional valve 405, or alternatively of the second unidirectional valve 405', into open configuration, in particular with a compression of the first spring 406, or alternatively of the second spring 406', and a slight movement of the first ball 407, or alternatively of the second ball 407', from its seat; in this way the distilled water contained in the first compression chamber 411, or alternatively in the second compression chamber 411', is pushed out of the latter towards the first outlet 404, or alternatively towards the second outlet 404.

A return of the piston 402 to a position rearward with respect to the second end position determines an immediate release of the pressure in the respective compression chamber and a new switching of the first unidirectional valve 405 or, alternatively, of the second unidirectional valve 405' to closed configuration.

The Applicant has observed that the specific type of extraction pump 400 described herein is not intended to be limiting. Indeed, as an alternative to the above, the extraction pump 400 can be a peristaltic or gear or lobe type occlusive pump, or even a rotary vacuum pump.

In an embodiment preferred but not limited, the extraction pump 400 is positioned at a height equal to or lower than the minimum height reached by the collection portion 109. This facilitates the filling of the inlet of the extraction pump 400.

The specific type of extraction pump 400 can also cause an increase of the vacuum within the cavity 2*c*, 2*d*, thus within the distillation chamber 2*d* and within the condensation chamber 2*c*. This increase in vacuum is not harmful and can be in particular compensated for by a determined reintroduction of new water 201 to distill within the distillation chamber. In an embodiment, this new introduction of water 201 to distill is manually adjusted. In another embodiment, this new introduction of water 201 to distill is electronically adjusted by means of the data processing unit 119, by controlling the pressure values subsisting within the cavity 2*c*, 2*d* as previously described. Therefore, the data processing unit 119 can be configured to control at least an activation or deactivation of the extraction pump 400, and more preferably to control the actuation speed of the extraction pump 400, in order to maintain a vacuum level within the cavity 2*c*, 2*d* between the first threshold value Thv1 and the second threshold value Thv2.

Where an inlet valve 8 is present, the data processing unit 119 will advantageously be configured to switch the opening or closing of the inlet valve 8 in relation at least to the activation or deactivation (or even in relation to the activation speed) of the extraction pump 400 in order to maintain the vacuum level within the cavity 2*c*, 2*d* between the first threshold value Thv1 and the second threshold value Thv2.

Preferably, but not limited thereto, the movement of the piston 402 occurs by means of an electrical control, and therefore the extraction pump 400 described herein is an electro-actuated pump. A winding 410 is positioned around the portion of the body 403 in correspondence of which the piston 402 lies. In particular, that winding 410 is positioned so that it can always be aligned (in particular along an axis transversal to the axis of movement of the piston 402) so that, in use, it is possible to exert an electromagnetic coupling with the piston 402. Within the piston 402 there is a magnet 409.

The winding 410 is operatively connected to the data processing unit 119, such that the latter can send a control signal to the intended winding and configured to allow an attraction or repulsion of the magnet 409. Thus, in use, when an electrical signal is fed to the winding 410, such electrical signal determines an attraction of the magnet 409 or a repulsion of the magnet 409 which in turn determines the movement of the piston 402 between the first stroke ending position and the second stroke ending position.

Another embodiment of the body of the water distillation device 1 is shown in FIG. 8.

The body has a lateral wall 2' which defines a cavity 2*c*, 2*d* suitable for allowing an amount of water 201 to distill. In particular, the body defines a distillation chamber and a condensation chamber.

As it can be observed in the embodiment shown in FIG. 8, preferably the body of the water distillation device 1 has a first portion 2*u*, 2*r*, or main portion having a substantially tubular shape, which preferably, but not limited thereto, has a circular cross-section. The first portion 2*u*, 2*r* of the body of the water distillation device 1 develops substantially along a main axis X.

The body is delimited at the top by a head portion 3 and is at a bottom delimited by a bottom portion 4. Preferably, but not limited thereto, at least one between the head portion 3 and the bottom portion 4 comprises a removable closing element of the cavity 2*c*, 2*d*. This advantageously allows the lateral wall 2 and other elements herein to be cleaned after a determined period of use.

At least the bottom portion 4 is openable. Preferably, the head portion 3 is also openable. Thanks to this technical feature, it is possible to carry out a cleaning of the cavity 2*c*, 2*d* defined by the lateral wall, in particular to carry out a cleaning of the portion of said cavity 2*c*, 2*d* defining the distillation chamber. In this way, it is possible to remove solid residuals formed following the completion of the distillation of the water 201 to distill.

The Applicant observes that different types of materials can be used to realize the body, and in particular the lateral wall 2'. However, preferably, the lateral wall is to be realized from a material with low ionic release into the water, and this allows a high distillation purity of the distilled water 300 to be achieved. In a preferred but not limiting embodiment, such a material is a metallic material and preferably it is stainless steel.

In a particular embodiment, the inner face of the lateral wall 2' is gold-plated.

Furthermore, in case the water distillation device 1 described herein is configured to perform vacuum distillation, such lateral wall 2', and in particular also the head portion 3 and the bottom portion 4 must be configured to withstand a predetermined vacuum value. The use of metal is advantageous in this case, since the use of a suitable thickness for the lateral wall 2' and for the head portion 3 and for the bottom portion 4 allows to realize a robust body, and little subject to deformation.

The first portion 2*u*, 2*r*, or main portion, of the body of the water distillation device 1 realizes substantially a distillation chamber 2*f* which has, in an upper portion thereof, a tapered section 2*r* defining a substantially inverted funnel shape.

The head portion 3, which as shown in figures is angularly connected to the main portion, comprises a three ways element 2*t*, in particular a "T" shaped element, which is connected directly, optionally uninterruptedly, with the first portion 2*u*, 2*r*, or main portion, of the body of the water distillation device 1. The head portion 3 is the one wherein, in use, the condensation of distillation steam takes place.

In the attached figures, the three ways of the three ways element 2*t* are respectively indicated by the numerical references 2*t*', 2*t*'' e 2*t*'''.

A junction portion 2*k*, joins the first portion 2*u*, 2*r*, in particular the tapered section 2*r*, with the three ways element 2*t* of the head portion 3. In an embodiment the junction portion 2*k* is integral to the first portion 2*u*, 2*r*, or main portion. Alternatively, the junction portion 2*k* is integral to the three ways element 2*t*, and in another embodiment tale three ways element 2*t*, the first portion 2*u*, 2*r*, or main portion, and the junction portion 2*k* are all realized in a single piece, therefore completely integral.

In an embodiment, the first portion 2*u*, 2*r*, or main portion, of the body e the head portion 3, and in particular the three ways element 2*t*, are realized in a single piece, for example by casting or moulding. Alternatively, the first portion 2*u*, 2*r*, or main portion, of the body and the head portion 3, and in particular the three ways element 2*t* are realized as separate elements but are joined together inseparably (at least in use) for example by welding. Still alternatively, the first portion 2*u*, 2*r* of the body and the head portion 3, and in particular the three ways element 2*t* are joined together removably, by known means, not described herein.

In a preferred but non-limiting embodiment, which is shown in FIG. 8, the junction portion 2*k* is curved, and preferably has a bending angle substantially equal to 90° to connect with one of the ways of the three ways element 2*t*. Such a way is hereinafter referred to as "first way" 2*t*'. Therefore, the first way 2*t*' faces (or opens) on the junction portion 2*k*. Other embodiments of the junction portion 2*k*, not shown in the attached figures, have a bending angle higher than 45° or higher than 60°.

The function of the junction portion 2*k* is to divert the flow of distillation steam from a substantially axial direction (main axis X) with the distillation chamber to a position, and along a direction, axially misaligned from said distillation chamber.

The condensation chamber 2*c* is substantially realized within said three ways element 2*t*.

In an embodiment, in said three ways element 2*t*, at least two of the three ways are aligned along a same axis and, in particular, in the embodiment shown in FIG. 8, this same axis is substantially parallel to the main axis X. These two ways are hereafter referred to as second way 2*t*" and third way 2*t*'".

Therefore, one of said two ways, in particular the third way 2*t*'", is a way at a lower height, or lower way, and one of said two ways, in particular the second way 2*t*", is at a higher height, and is here called the upper way.

The condensation chamber 2*c* lies at an intermediate height between the minimum height at which the body lies, or equivalently at an intermediate height between the height at which the distillation chamber 2*f* lies and the maximum height reached by the body.

The condensation chamber 2*c* lies in substantial correspondence with one of said ways, and in particular with one of the two among the three ways of the three ways element 2*t* which are aligned along the same axis. In particular, the condensation chamber 2*c* lies in substantial correspondence with said third way 2*t*'".

In substantial correspondence with the condensation chamber 2*c* there is a cooler element 15*e*. Thus, in particular, the condensation of the distillation steam occurs substantially in correspondence with the third way 2*t*'".

The condensation chamber 2*c* comprises a collection portion 109 for the distilled water 300 which is realized in substantial correspondence with a lower end portion of the condensation chamber 2*c*; in particular, the collection portion 109 for the distilled water 300 lies, also due to gravity effects, in the lower portion of the condensation chamber 2*c*.

Preferably, but not limited thereto, in correspondence with the second way 2*t*" opens the air extraction duct 14 is connected with the vacuum pump 13.

In an embodiment, the cooler element 15*e* lies within the condensation chamber 2*c*. In an embodiment alternative to the previous one, the cooler element 15*e* lies outside of the condensation chamber 2*c*.

The cooler element 15*e* can be a refrigerator evaporator, and its operation described in relation to the refrigeration circuit is not completely repeated here, having already been described previously.

When the cooler element 15*e* lies within the condensation chamber 2*c*, there is no need to have a condensation chamber 2*c* having at least one wall, preferably the lateral wall, with a characteristic of high thermal conductivity. On the other hand, where the cooler element 15*e* is located outside the condensation chamber 2*c*, in particular outside the lateral wall of the condensation chamber 2*c*, there is a need to transfer a thermal energy from the cooler element 15*e* to the inside of the condensation chamber 2*c*, so that the steam of the distilled water 300 can be cooled. In such a case, the condensation chamber 2*c*, in particular at least a wall of the condensation chamber 2*c*, and in particular at least a lateral wall of the condensation chamber 2*c*, has characteristics of high thermal conductivity.

When the cooler element 15*e*, particularly but not limited thereto when in the form of the refrigerator evaporator 15*e*, is located outside the condensation chamber 2*c*, it can be realized according to the process described herein.

As shown in FIG. 10, the refrigerator evaporator 15*e* is first placed outside the lateral wall of the condensation chamber 2*c*, and in particular is wrapped in coil shape around the lateral wall of the condensation chamber 2*c*. Subsequently, the assembly formed by the refrigerator evaporator 15*e* and the body of the water distillation device 1, or if in a split form, the assembly formed by the refrigerator evaporator 15*e* and the three-way element 2*t*, is introduced into a form and in that form is poured thermal-conductive material 2*w*, preferably but not limited to metal, and in particular aluminum. The refrigerator evaporator 15*e* is then embedded within the thermal-conductive material 2*w*.

The assembly formed by the refrigerator compressor 15, the refrigerator evaporator 15*e*, the refrigerator condenser 15*c* and, at least, a condenser duct 16 connected between the refrigerator compressor 15 and the refrigerator condenser 15*c*, and an evaporator duct 17 connected between the refrigerator evaporator 15*e* and the refrigerator compressor 15, realizes a refrigerator system capable of heating water to a temperature sufficient to cause its boiling, and then to cause its condensation in the condensation chamber.

The body described in relation to this latter embodiment can comprise auxiliary heater 500. In an embodiment, this auxiliary heater 500 comprises an electrical resistor. This auxiliary heater 400 can be conveniently positioned in substantial correspondence with the distillation chamber, and in detail can be positioned at a height substantially equal to the height at which the heater 15*c* lies.

The Applicant observes that in the embodiment wherein the heater 15*c* is a condenser connected to the refrigerator compressor 15, the use of the auxiliary heater is conveniently useful in particular at the first start-up (so-called "cold start-up") of the water distillation device 1, as it promotes a thermal energy input into the distillation chamber that allows to speed up the first production of distilled water 300.

Should this heater 15*c* assume a spiral or coil shape, the auxiliary heater 500 can be located within said spiral or coil, in particular by delineating an inner circumference of circumscription having a diameter smaller than or equal to that of the spiral or coil, or assume itself a spiral and/or coil shape and have portions interposed, in particular substantially positioned, in correspondence with vertically present portions of space between one turn and the next turn of the spiral or coil, so as to be substantially vertically aligned therewith. In an embodiment, therefore, observing the assembly of the heater 15*c* and of the auxiliary heater 500 from above, a substantial vertical alignment would be observed, and the space within the spiral or coil identified by the heater 15*c* would not be compromised or otherwise limited by the presence of the auxiliary heater 500.

An outlet valve 12 is positioned in substantial correspondence with the lower or third way 2*t*'", and comprises at least an open configuration that allows the outflow of distilled water from the tank 11, and a closed configuration preventing the outflow of distilled water 300 from the collection portion.

The outlet valve 12 can be a manually controlled valve or an electronically controlled valve (solenoid valve).

Also in this embodiment of the body can be present a filtering membrane. This membrane is configured to allow the passage of water steam but is configured to retain solid residuals typical of the water distillation process and prevent the passage of significant amounts of water in liquid form, particularly in droplets or bubbles.

The filtering membrane can be positioned in various positions within the body between the distillation chamber and the condensation chamber, but preferably it can be positioned in substantial correspondence with the tapered section 2*r* or in substantial correspondence with the connection portion 2*k* or, again, in substantial correspondence with the third way 2*t*''' or lower way.

This filtering membrane acts substantially as a molecular sieve, being provided with holes or passages or pores capable of determining a passage of molecules smaller than a predetermined size and, also, of determining an impediment to the passage of molecules of a size greater than or equal to that predetermined size.

Optionally, this filtering membrane is removably connected to the body of the intermediate or separating element, and it can, for example, be installed on a support ring removably connected to the body of the intermediate or separating element. This allows it to be quickly replaced if necessary.

Various types of material can be used to realize the filtering membrane. However, preferably, this filtering membrane is realized in a non-hygroscopic material. In a non-limiting embodiment, this filtering membrane is a polymer filtering membrane, in particular perfluorocarbon (PFC), more particularly polytetrafluoroethylene (PTFE), even more particularly expanded polytetrafluoroethylene (ePTFE) or expanded polyethylene (ePE) such as Gore-Tex®.

In use, the distillation of the water 201 to distillate in the distillation chamber 2*d* causes an increase in the production of bubbles which may be pushed upwards coming into substantial contact with the intermediate or separating element 100. Some of the water bubbles and/or solid distillation residuals could pass through the through-holes 105, unduly coming into substantial correspondence with the collection portion 109. Thus, the filtration process concomitant to the distillation of the water 201 to distill, brought by the filtering membrane, allows the optimization of the distillation process, leading to a lower contamination of the distilled water 300, which is reflected in a lower electrical conductivity of the latter.

The Applicant has conceived a further embodiment of the water distillation device 1 which is represented in FIGS. 11 and 12. In this embodiment, the water distillation device 1 comprises a body having a lateral wall 2 which defines a cavity 2*c*, 2*d* suitable for allowing the distillation of an amount of water 201 to distill. The cavity 2*c*, 2*d* are defined as a distillation chamber 2*d* and a condensation chamber 2*c*. Such water distillation device 1 comprises at least a heater 15*c* configured to heat the amount of water to distill. For convenience of graphic representation, the heater 15*c* is omitted from the section of FIG. 12.

The body of the water distillation device 1 is divided between at least an upper first portion which integrates the head portion 3 and a lower portion integrating the base portion 4. In an embodiment, said first upper portion and said second lower portion are removably connectable to each other in a direct manner.

In the embodiment of FIG. 11 and of FIG. 12 the body of the water distillation device 1 comprises: a first upper portion integrating the head portion 3, a lower portion integrating the base portion 4 and an intermediate portion positioned between the first upper portion and the second lower portion. In use, the tightness of the cavity 2*c*, 2*d* is ensured by the presence of seals 3*g* and 4*g* respectively positioned between the first upper portion and the intermediate portion and between the second lower portion and the intermediate portion. Thus, the first upper portion, the second lower portion and the intermediate portion are removably connectable to each other.

In this embodiment, the intermediate or separating element 100 is always positioned in an intermediate position of the cavity 2*c*, 2*d* of the body globally defined through the first upper portion, the second lower portion and the intermediate portion, and has a portion of junction 103 with the lateral wall 2, which in this case represents the lateral wall of the first upper portion, the second lower portion and the intermediate portion. The intermediate or separating element 100 is configured to and specifically intended to divide the cavity 2*c*, 2*d* realizing the distillation chamber 2*d* and the condensation chamber 2*c*.

The intermediate or separating element 100 comprises at least a through hole 105 configured to allow the passage of at least a distillation steam from the distillation chamber to the condensation chamber and comprises at least a collection portion 109 of distilled water 300.

In the embodiment represented in FIGS. 11 e 12, the intermediate or separating element 100 is integral with the intermediate portion of the body of the water distillation device 1. This should not be intended in a limiting manner, since in an alternative embodiment, the intermediate or separating element 100 could be integral with the first upper portion or the second lower portion of the body. In particular, as it can be seen by looking at the section of FIG. 12, the intermediate or separating element 100 is such that the portion of junction 103 is an extension of the lateral wall 2 of the intermediate portion, in particular a seamless extension of said lateral wall 2 of the intermediate portion.

In the embodiment of FIG. 12, it is noted that the through hole 105 above mentioned is a central through hole axially opening on the main axis X, and is configured to allow the passage of distillation steam from bottom upwards in a direction substantially axial with the main axis X. The through hole 105 opens directly on the cavity 106 defined by the intermediate or separating element.

However, in order to prevent a risk of direct return of distillation steam from the condensation chamber 2*c* to the distillation chamber 2*d*, the Applicant has conceived an intermediate septum 110, which is introduced and lies in use in the cavity of the intermediate or separating element 100 at a lower height than the height at which the through hole 105 is present. Such intermediate septum 110 is configured to force the distillation steam into a curved path at least partially misaligned with respect to the main axis X between the distillation chamber 2*d* and the condensation chamber 2*c*. The intermediate septum 110 is therefore configured to prevent a substantially axial path (in particular, along the main axis X) of the distillation steam between the distillation chamber 2*d* and the condensation chamber 2*c*.

In a non-limiting embodiment, the intermediate septum 110 is realized in plastic material. This should not be intended in a limiting manner, as the intermediate septum 110 can also be realized in metallic or glassy material, for example and not limited thereto borosilicate glass.

In a preferred but non-limiting embodiment, the intermediate septum 110 is fixed on the lateral wall 2 of the intermediate portion of the body in correspondence of a recess 2*b* annularly realized on the inner face of the lateral wall 2.

The intermediate septum 110 presents a plurality of division planes 110*s* superimposed on each other each of which identifies (or comprises) at least one passage opening for the distillation steam. The passage openings identified by two contiguous division planes 110*s* are misaligned with each other so as to cause such curved path 200 for the distillation steam. As represented in FIG. 12, the division planes 110*s* are parallel to each other and are substantially orthogonal to the main axis X. This specific configuration is not intended to be limiting.

The Applicant underlines that the expression "defines (or comprises)" is used because a specific embodiment of the division plane 110*s* could comprise a sealing ring on the lateral wall defining the cavity 106, wherein said sealing ring is partially occluded by the wall of the division plane 110*s*, and for this reason strictly speaking the opening would actually be comprised within the division plane 110*s* itself.

In the specific embodiment of FIG. 11 and FIG. 12, the cavity 106 of the intermediate or separating element 100 presents a cross-section of circular shape that progressively tapers along the main axis X between the lower portion of the intermediate or separating element 100 towards the upper portion of the intermediate or separating element 100. With such a shape of the cross-section, conveniently the division planes 110*s* also have a partially circular perimeter profile, which in particular identifies an incomplete circumferential sector. The perimeter profile of each of the division planes 110*s* is such that it causes a contact between the division plane 110*s* and the inner face of the lateral wall of the cavity 106. In the specific embodiment represented in FIG. 12, the lateral wall of the cavity 106 corresponds substantially to the collection wall 102.

The division planes 110*s* can be joined together integrally by realizing a single piece, or can be divided and held in a reciprocal joint configuration by means of a fastener 110*f*. Such fastener 110*f* is preferably a screw, and is positioned in correspondence of a hole in each of the division planes 110*s*. Such a hole is centered on the axis X.

Since the specific embodiment represented in FIG. 11 and FIG. 13 has the intermediate or separating element 100 in substantial correspondence of the intermediate portion of the body, in such a case the through-hole 2*f* will be drilled on the lateral wall 2 in substantial correspondence of the intermediate portion. Clearly, this configuration is not to be considered as limiting, since if the intermediate or separating element 100 is realized in substantial correspondence of the first upper portion or of the second lower portion of the body, such through-hole 2*f* will be made in the corresponding portion of the body.

Finally, it is clear that additions, modifications or variants, which are obvious to a person skilled in the art, may be applied to the object of the present disclosure without departing from the scope provided by the annexed claims.

The invention claimed is:

1. A water distillation device, comprising:

a body having a lateral wall and defining a cavity suitable for permitting the distillation of an amount of water to distill, wherein in the cavity are defined a distillation chamber and a condensation chamber, at least a heater, configured to heat the amount of water to distill, an intermediate or separating element, positioned in an intermediate position of the cavity of the body, and having a junction portion, joining the intermediate or separating element with the lateral wall, said intermediate or separating element being configured to divide said cavity realizing the distillation chamber and the condensation chamber, said intermediate or separating element comprising at least a through hole configured to permit the passage of at least a distillation steam from the distillation chamber to the condensation chamber, said intermediate or separating element comprising at least a collection portion of distilled water;

the water distillation device comprising an intermediate septum configured to force the distillation steam in a curved path, at least partially misaligned with respect to a main axis, between the distillation chamber and the condensation chamber, and configured to prevent an axial path of the distillation steam between the distillation chamber and the condensation chamber, wherein the intermediate septum is configured to be installed in correspondence of the intermediate or separating element, in a cavity of the intermediate or separating element;

said cavity having a cross section of variable area, progressively tapered along said main axis between a lower portion of the intermediate or separate element and an upper portion of said intermediate or separating element.

2. The device according to claim 1, further comprising a cooler configured to cause a condensation of the distillation steam and configured to cause a collection of the condensed distillation steam in correspondence of the collection portion, wherein the intermediate or separating element comprises a head portion comprising an upper wall orthogonal with respect to the main axis and a lateral wall, the lateral wall having an upper ending portion joined with the upper wall;

wherein the lateral wall of the head portion is aligned to the main axis and/or extends itself along a direction parallel to the direction along which the portion of junction extends, wherein the at least a through hole is positioned on said lateral wall, and/or wherein the at least a through hole has an axis inclined with respect to the main axis, optionally presenting an axis orthogonal with respect to the main axis, and wherein the collection portion of distilled water lies at a height lower with respect to said head portion.

3. The device according to claim 2, wherein:

the water distillation device is a vacuum distillation device, configured to carry out the distillation of the water to distill at a pressure lower with respect to the atmospheric pressure;

the cooler is a refrigerator evaporator, the heater is a refrigerator condenser;

the water distillation device comprising a cooling compressor connected to the refrigerator evaporator and to the refrigerator condenser, said cooling compressor being configured to compress a gas directed into said refrigerator condenser, in use determining a heating of said refrigerator condenser sufficient to cause a boiling of the water, said refrigerator evaporator being configured to permit an expansion of the gases previously compressed by the cooling compressor, in use determining a cooling of the distillation steam sufficient to cause a condensation of the distilled water in the collection portion.

4. The device according to claim 3, wherein:

the refrigerator condenser is arranged into the distillation chamber, and is arranged at a bottom portion of the distillation chamber and/or is positioned outside of the distillation chamber, the refrigerator evaporator is positioned in correspondence of the condensation chamber, and lies at a height at least partially corresponding to the height at which lies the intermediate or separating element, lying in correspondence of a portion of the condensation chamber annularly defined between the intermediate or separating element and the lateral wall and/or lies outside of the head portion of the intermediate or separating element and/or is at least partially in axial alignment with said through hole.

5. The device according to claim 3, further comprising a vacuum pump connected with said cavity and configured to create, in use, a predetermined vacuum within said cavity, said vacuum causing a reduction of the boiling temperature of the water to distill, wherein the device comprises a pressure sensor, configured to measure the pressure and/or the vacuum existing within said cavity, said pressure sensor being configured to transmit, in use, a pressure signal designed to cause an activation or a deactivation of said vacuum pump, and wherein the device has an operating configuration of supply of distilled water, in said operating configuration the distilled water collected in the collection portion flowing in an output duct;

in said operating configuration of supply of distilled water, said device being configured to maintain within said cavity a predetermined vacuum level with respect to a predetermined threshold.

6. The device according to claim 2, wherein the body comprises at least a first upper portion integrating said head portion and a second lower portion integrating a base portion, wherein the body comprises an intermediate portion, interposed between the first upper portion and the second lower portion and wherein the lateral wall is defined at least on the first upper portion and on the second lower portion of the body of the device for water distillation and is defined at least on the intermediate portion of the body of the water distillation device.

7. The device according to claim 6, wherein the intermediate or separating element is integral and/or is realized as a piece on the first upper portion or is integral and/or is realized as a piece on the second lower portion or is integral and/or is realized as a piece on the intermediate portion, and/or is integral and/or is realized as a piece on the lateral wall.

8. The device according to claim 7, wherein the at least a through hole configured to permit the passage of at least a distillation steam from the distillation chamber to the condensation chamber has an axis parallel to the main axis, and optionally is centered on the main axis.

9. The device according to claim 2, wherein the intermediate or separating element is positioned in a predefined and/or fixed position with respect to the lateral wall and/or within said cavity, and/or wherein the head portion is at a higher height with respect to the height at which the portion of junction lies.

10. The device according to claim 2, wherein:

the head portion is positioned in a central position of the intermediate or separating element and defines a cross-sectional area smaller than the cross-sectional area of the portion of junction, the head portion is joined to said portion of junction, optionally being joined seamlessly to said portion of junction.

11. The device according to claim 1, wherein the lateral wall is tubular and develops along said main axis, wherein said cavity develops along said main axis and wherein the condensation chamber is at a height higher with respect to the height at which said distillation chamber lies;

in use, said main axis being vertical.

12. The device according to claim 1, wherein:

the intermediate or separating element comprises a lateral wall of collection joined or confining with said portion of junction, the portion of junction comprises, optionally is, a sealing wall in contact with the lateral wall of the body, the lateral wall of collection is inclined with respect to said portion of junction and lies, in use, at least partially, optionally integrally, at a height higher with respect to the portion of junction; said collection portion of distilled water having an annular shape or lying in a radially central position of said intermediate or separating element.

13. The device according to claim 12, wherein the lateral wall comprises an output through hole, configured to allow an outflow of the distilled water from the collection portion and wherein the output through hole is positioned at a height corresponding with the collection portion, and/or corresponding with an upper edge of the sealing wall.

14. The device according to claim 1, wherein the intermediate or separating element comprises a filtering membrane, configured to allow the passage of water steam and configured to retain solid residuals deriving from the process of water distillation and to prevent the passage of water in liquid form, or in drops or bubbles;

the filtering membrane being made of a non-hygroscopic material.

15. The device of claim 14, wherein said non-hygroscopic material is a polymeric material comprising perfluorocarbon.

16. The device according to claim 1, further comprising:

an input duct for the water to distill, said input duct being configured to supply water to distill within the distillation chamber, an input valve connected with the input duct and configured to control the inflow of the water to distill within said distillation chamber, an output valve configured to adjust the water outflow from the collection portion, a data processing unit configured at least to cause a vacuum maintenance within said cavity between a first and a second threshold value, wherein the data processing unit is configured at least to store a first and a second vacuum threshold value, and is configured at least to carry out a controlled opening of the input valve where the vacuum present in the distillation chamber and in the condensation chamber, is higher than a first threshold value, so that the vacuum value returns between the first and the second threshold value, and/or configured to carry out a controlled opening of the output valve, where the vacuum present in the distillation chamber and the condensation chamber, is lower with respect to the second threshold value, so that the vacuum value returns between the first and the second threshold value, and/or wherein the water distillation device further comprises a vacuum pump connected with said cavity and configured to create, in use, a predetermined vacuum within said cavity, and the data processing unit is configured to activate the vacuum pump connected with said cavity in such a way said vacuum is automatically maintained between said first and said second threshold value.

17. The device according to claim 1, wherein at least part of the body and/or of said lateral wall is made of a metallic material or wherein at least part of the body and/or of said lateral wall is made of a thermally insulating material, optionally glass, and/or plastic material.

18. The device according to claim 1, wherein the intermediate septum comprises a plurality of division planes; said plurality of division planes being configured to force the curved path assumed by the distillation steam between the distillation chamber and the condensation chamber and/or to prevent a axial path of the distillation steam between the distillation chamber and the condensation chamber, wherein the at least one division plane has a perimeter portion in contact with a lateral wall of the intermediate or separating element delimiting said cavity and wherein the at least one division plane comprises at least an opening suitable for permitting the passage at least of the distillation steam.

19. The device according to claim 1, wherein the intermediate or separating element is integral and/or is made in a single piece.

* * * * *